United States Patent
Spinella et al.

(10) Patent No.: US 10,384,296 B2
(45) Date of Patent: Aug. 20, 2019

(54) RESISTANCE WELDING FASTENER, APPARATUS AND METHODS FOR JOINING SIMILAR AND DISSIMILAR MATERIALS

(71) Applicant: Alcoa Inc., Pittsburgh, PA (US)

(72) Inventors: Donald J. Spinella, Greensburg, PA (US); Daniel Bergstrom, Sarver, PA (US)

(73) Assignee: Arconic Inc., Pittsburgh, PA (US)

( * ) Notice: Subject to any disclaimer, the term of this patent is extended or adjusted under 35 U.S.C. 154(b) by 602 days.

(21) Appl. No.: 14/967,777

(22) Filed: Dec. 14, 2015

(65) Prior Publication Data

US 2016/0167158 A1    Jun. 16, 2016

Related U.S. Application Data

(60) Provisional application No. 62/091,980, filed on Dec. 15, 2014.

(51) Int. Cl.
*B23K 11/30* (2006.01)
*B23K 11/18* (2006.01)
(Continued)

(52) U.S. Cl.
CPC ...... *B23K 11/3009* (2013.01); *B23K 11/0053* (2013.01); *B23K 11/0066* (2013.01);
(Continued)

(58) Field of Classification Search
CPC ............ B23K 11/3009; B23K 11/0066; B23K 11/0053; B23K 35/0288; B23K 11/20; B32K 11/185; F16B 5/08
See application file for complete search history.

(56) References Cited

U.S. PATENT DOCUMENTS 1,333,414 A    3/1920    Havener
2,302,772 A    11/1942    Huck
(Continued)

FOREIGN PATENT DOCUMENTS

CN    101375066 A    2/2009
CN    101590598        12/2009
(Continued)

OTHER PUBLICATIONS

First Office Action issued in regard to Chinese Patent Application for Invention No. 201410299463.2, dated Dec. 7, 2015 {with English translation).
(Continued)

*Primary Examiner* — Geoffrey S Evans
(74) *Attorney, Agent, or Firm* — Greenberg Traurig, LLP

(57) ABSTRACT

An apparatus and method for fastening layers of non-ferrous alloys, like aluminum, magnesium and copper utilizes a steel fastener and a spot welding machine. The fastener and metals are stacked and the heat from the welder's electric current softens the lower melting point aluminum allowing the fastener to penetrate the aluminum. A weld zone between the fastener and the various layers creates an internal weld. The fastener has a rough shaft that is coated by the molten weld zone and is hard to withdraw on solidification. Layers of non-conductive materials like plastics and ceramics may also be affixed to a conductive layer using a fastener made from a compatible material that extends through a pilot hole and welds to or penetrates a conductive layer. The fastener may have projections that initially reduce contact area with the stack.

19 Claims, 47 Drawing Sheets

(51) Int. Cl.
  *B23K 11/20* (2006.01)
  *F16B 5/08* (2006.01)
  *B23K 11/00* (2006.01)
  *B23K 35/02* (2006.01)
  *B23K 101/38* (2006.01)
  *B23K 103/10* (2006.01)
  *B23K 103/12* (2006.01)
  *B23K 103/08* (2006.01)
  *B23K 103/18* (2006.01)

(52) U.S. Cl.
  CPC ............ *B23K 11/18* (2013.01); *B23K 11/185* (2013.01); *B23K 11/20* (2013.01); *B23K 35/0288* (2013.01); *F16B 5/08* (2013.01); *B23K 2101/38* (2018.08); *B23K 2103/10* (2018.08); *B23K 2103/12* (2018.08); *B23K 2103/15* (2018.08); *B23K 2103/18* (2018.08)

(56) References Cited

U.S. PATENT DOCUMENTS

| | | |
|---|---|---|
| 2,319,455 A | 5/1943 | Hardman et al. |
| 2,563,107 A | 8/1951 | Fanger |
| 2,569,059 A | 9/1951 | Huff et al. |
| 3,095,951 A | 7/1963 | Rood et al. |
| 3,104,312 A | 9/1963 | Gentry |
| 3,400,509 A | 9/1968 | Setzer |
| 3,576,964 A | 5/1971 | Williams |
| 3,774,009 A | 11/1973 | Hodges |
| 3,858,024 A | 12/1974 | Hinden |
| 4,119,827 A | 10/1978 | Lenox |
| 4,650,951 A | 3/1987 | Koga et al. |
| 4,736,861 A | 4/1988 | Basili |
| 5,030,814 A | 7/1991 | Tange et al. |
| 5,273,386 A | 12/1993 | Luhm |
| 5,473,134 A | 12/1995 | Susgin |
| 5,697,521 A | 12/1997 | Dixon |
| 5,739,498 A | 4/1998 | Sunamoto et al. |
| 5,939,498 A | 8/1999 | Sutton, Jr. et al. |
| 6,037,559 A | 3/2000 | Okabe et al. |
| 6,054,668 A | 4/2000 | Van Otteren et al. |
| 6,291,792 B1 | 9/2001 | Fussnegger et al. |
| 6,515,251 B1 | 2/2003 | Wind |
| 6,796,454 B1 | 9/2004 | Matthews et al. |
| 7,030,333 B2 | 4/2006 | Bradley |
| 7,176,401 B2 | 2/2007 | Sakoda |
| 7,267,736 B2 | 9/2007 | Hou et al. |
| 7,645,105 B2 | 1/2010 | Hengel et al. |
| 7,870,656 B2 | 1/2011 | Eberlein |
| 7,880,112 B2 | 2/2011 | Hengel et al. |
| 8,424,961 B2 | 4/2013 | Carsley et al. |
| 8,461,484 B2 | 6/2013 | Tetzlaff et al. |
| 8,466,386 B2 | 6/2013 | Wang |
| 8,552,332 B2 | 10/2013 | Aoyama |
| 8,595,914 B2 | 12/2013 | Koppitz et al. |
| 8,920,095 B2 | 12/2014 | Baugh, Sr. |
| 8,973,248 B2 | 3/2015 | Honnikoppa |
| 9,012,029 B2 | 4/2015 | Lang et al. |
| 9,021,688 B2 | 5/2015 | Krejci |
| 9,067,276 B2 | 6/2015 | Koppitz et al. |
| 9,174,298 B2 | 11/2015 | Kasukawa et al. |
| 2004/0022603 A1 | 2/2004 | Litwinski et al. |
| 2004/0169017 A1 | 9/2004 | Sakoda |
| 2005/0133483 A1* | 6/2005 | Hou ............... B23K 11/0066 219/118 |
| 2005/0161442 A1 | 7/2005 | Bradley |
| 2006/0213954 A1 | 9/2006 | Ruther et al. |
| 2007/0295698 A1 | 12/2007 | Hengel et al. |
| 2008/0085568 A1 | 4/2008 | Wang et al. |
| 2008/0193255 A1 | 8/2008 | Hengel et al. |
| 2008/0229570 A1 | 9/2008 | Koppitz et al. |
| 2008/0296267 A1 | 12/2008 | Hill |
| 2009/0139821 A1 | 6/2009 | Koppitz et al. |
| 2009/0260413 A1 | 10/2009 | Tomchick |
| 2009/0261075 A1 | 10/2009 | Aoyama |
| 2009/0294410 A1 | 12/2009 | Iwase et al. |
| 2010/0084380 A1 | 4/2010 | Tetzlaff et al. |
| 2010/0140243 A1 | 6/2010 | Roddy et al. |
| 2010/0183897 A1 | 7/2010 | Nobuhiro et al. |
| 2011/0097142 A1 | 4/2011 | Bassler |
| 2011/0159313 A1 | 6/2011 | Kasukawa et al. |
| 2012/0241216 A1 | 9/2012 | Coppeta et al. |
| 2013/0122327 A1 | 5/2013 | Sheu et al. |
| 2013/0189023 A1 | 7/2013 | Spinella |
| 2013/0270229 A1 | 10/2013 | Pedersen et al. |
| 2013/0309520 A1 | 11/2013 | Lang et al. |
| 2014/0096366 A1 | 4/2014 | Honnikoppa |
| 2015/0000956 A1 | 1/2015 | Spinella |
| 2015/0001187 A1 | 1/2015 | Spinella |
| 2015/0001189 A1 | 1/2015 | Spinella et al. |
| 2015/0144602 A1* | 5/2015 | Draht ............... B23K 9/20 219/91.23 |
| 2015/0165544 A1 | 6/2015 | Mesa et al. |
| 2015/0184689 A1 | 7/2015 | Godfrey |
| 2015/0217395 A1* | 8/2015 | Spinella ........... B23K 11/11 219/86.22 |
| 2015/0258624 A1* | 9/2015 | Draht ............... B23K 11/0053 403/267 |
| 2015/0317786 A1 | 11/2015 | Spinella et al. |
| 2015/0330884 A1 | 11/2015 | Spinella et al. |
| 2016/0158873 A1 | 6/2016 | Amedick et al. |
| 2016/0167158 A1 | 6/2016 | Spinella et al. |
| 2017/0023038 A1 | 1/2017 | Izuhara |
| 2017/0316556 A1 | 11/2017 | Spinella et al. |

FOREIGN PATENT DOCUMENTS

| | | |
|---|---|---|
| CN | 101653861 A | 2/2010 |
| CN | 101890564 | 11/2010 |
| CN | 102133682 A | 7/2011 |
| CN | 204221184 | 3/2015 |
| CN | 205629649 U | 10/2016 |
| DE | 42 40 823 | 10/1993 |
| DE | 4237361 | 9/1996 |
| DE | 100 59 659 | 6/2002 |
| DE | 10 2004 025 493 A1 | 12/2005 |
| DE | 102004025493 | 12/2005 |
| DE | 102005006253 | 3/2007 |
| DE | 10-2007-036416 | 2/2009 |
| DE | 102007036416 | 2/2009 |
| DE | 102004025492 | 8/2009 |
| DE | 102009055608 A1 | 5/2011 |
| DE | 102009044888 | 6/2011 |
| DE | 102010006670 | 8/2011 |
| DE | 102010026040 | 1/2012 |
| DE | 102010034183 | 2/2012 |
| DE | 10060390 | 4/2012 |
| DE | 102011055044 | 5/2013 |
| DE | 10 2012 010 870 A1 | 12/2013 |
| DE | 102012013589 | 1/2014 |
| DE | 10 2012 018 866 A1 | 3/2014 |
| DE | 102012013325 | 10/2014 |
| DE | 102014211222 | 12/2015 |
| EP | 0865860 | 9/1998 |
| EP | 1090745 A1 | 4/2001 |
| EP | 2671662 | 12/2013 |
| EP | 2722124 | 4/2014 |
| EP | 3031564 | 6/2016 |
| EP | 3023650 B1 | 9/2017 |
| GB | 964117 | 7/1964 |
| GB | 1528730 | 10/1979 |
| JP | 7-214338 | 8/1995 |
| JP | 8-132252 | 5/1996 |
| JP | 09085454 | 3/1997 |
| JP | 09174249 | 7/1997 |
| JP | 09201679 | 8/1997 |
| JP | H10265881 A | 10/1998 |
| JP | H11-13395 | 1/1999 |
| JP | H11209827 A | 8/1999 |
| JP | 11-315335 | 11/1999 |
| JP | 2000-87164 | 3/2000 |
| JP | 2000087162 A | 3/2000 |
| JP | 200-117458 | 4/2000 |

(56) References Cited

FOREIGN PATENT DOCUMENTS

| | | |
|---|---|---|
| JP | 2000-144290 | 5/2000 |
| JP | 2003293060 A | 10/2003 |
| JP | 2005-161352 | 6/2005 |
| JP | 2009-183975 | 8/2009 |
| JP | 2009-285678 A | 12/2009 |
| JP | 2010-168622 | 8/2010 |
| JP | 2010207898 | 9/2010 |
| JP | 2011-086933 | 7/2011 |
| JP | 2012-197176 A | 10/2012 |
| JP | 2015-62916 | 4/2015 |
| JP | 2016-183217 | 10/2016 |
| KR | 10-2014-0030644 | 6/2014 |
| WO | 2006/084609 | 8/2006 |
| WO | 2006084609 | 8/2006 |
| WO | 2009135553 | 11/2009 |
| WO | 2011095191 | 8/2011 |
| WO | 2012041515 | 4/2012 |
| WO | 2012041516 | 4/2012 |
| WO | 2013064618 | 5/2013 |
| WO | 2013/096669 A2 | 6/2013 |
| WO | 2013/178542 A1 | 12/2013 |
| WO | 2014/048885 A2 | 4/2014 |
| WO | 2014/167566 | 10/2014 |
| WO | 2014210266 | 12/2014 |
| WO | 2014210278 | 12/2014 |
| WO | 2015117059 | 8/2015 |
| WO | 2016100179 | 6/2016 |

OTHER PUBLICATIONS

Second Office Action issued in regard to Chinese Patent Application for Invention No. 201410299463.2, dated Sep. 12, 2016 {with English translation}.

U.S. Appl. No. 15/469,161, filed Mar. 24, 2017.

Non-Final Office Action regarding U.S. Appl. No. 14/315,698, dated Dec. 22, 2016.

Main Alloys Cast and Chemical Composition, downloaded from http://www.sssmile.com.tw on Dec. 15, 2016.

International Search Report and Written Opinion of the International Searching Authority dated Dec. 21, 2016 in reference to International Patent Application No. PCT/US2016/051870.

International Search Report and Written Opinion dated Nov. 15, 2017, issued by the European Patent Office in International Application No. PCT/US2017/024093 (22 pages).

Written Opinion of the International Searching Authority dated Apr. 19, 2016, issued in International Application No. PCT/US2015/055287.

Third Party Observation received by the International Bureau dated May 11, 2016 in International Patent Application No. PCT/US2015/055287.

International Search Report and Written Opinion of the International Searching Authority dated Feb. 16, 2016 regarding International Patent Application No. PCT/US2015/065491.

International Search Report and Written Opinion of the International Searching Authority dated Jun. 10, 2015 in reference to International Patent Application No. PCT/US2015/014062.

International Search Report and Written Opinion of the International Searching Authority dated Oct. 30 2014 in reference to International Patent Application No. PCT/US2014/044267.

International Search Report and Written Opinion of the International Searching Authority dated Oct. 30 2014 in reference to International Patent Application No. PCT/US2014/044286.

PCT Application No. PCT/US15/65491 filed Dec. 14, 2015.

Weickum, B., Friction Bit Joining of 5754 Aluminum to DP980 Ultra-High-Strength Steel: A Feasibility Study, All Theses and Dissertations, (2011), Paper 2789.

* cited by examiner

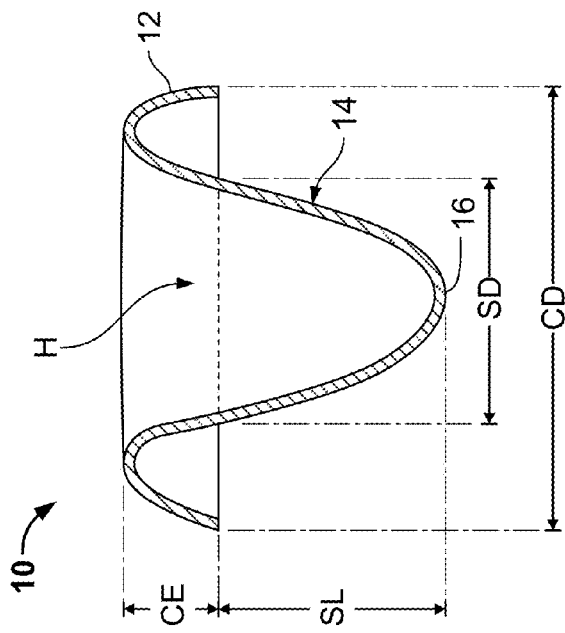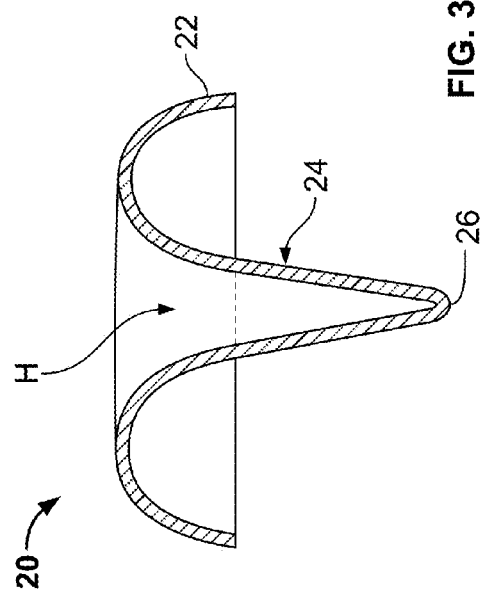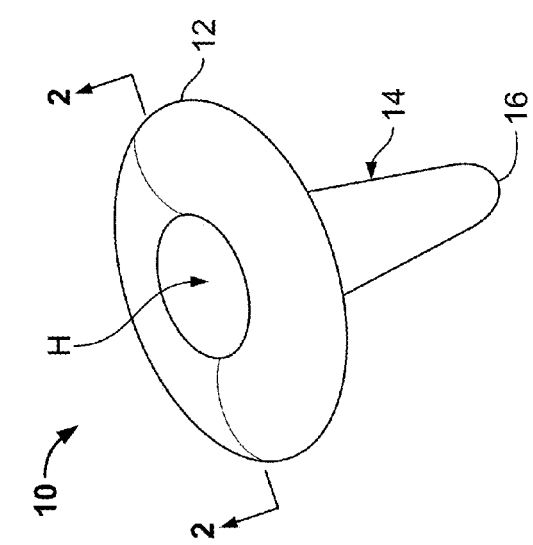

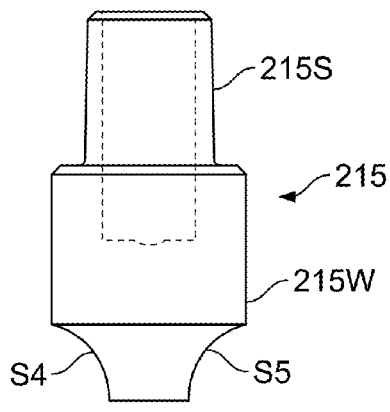
FIG. 12
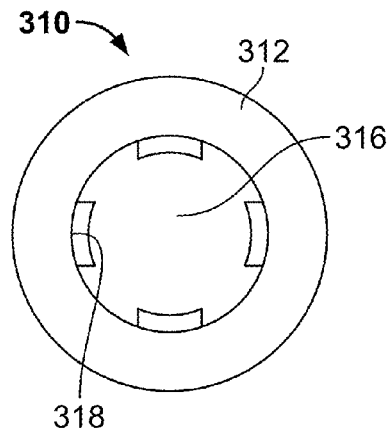
FIG. 13A
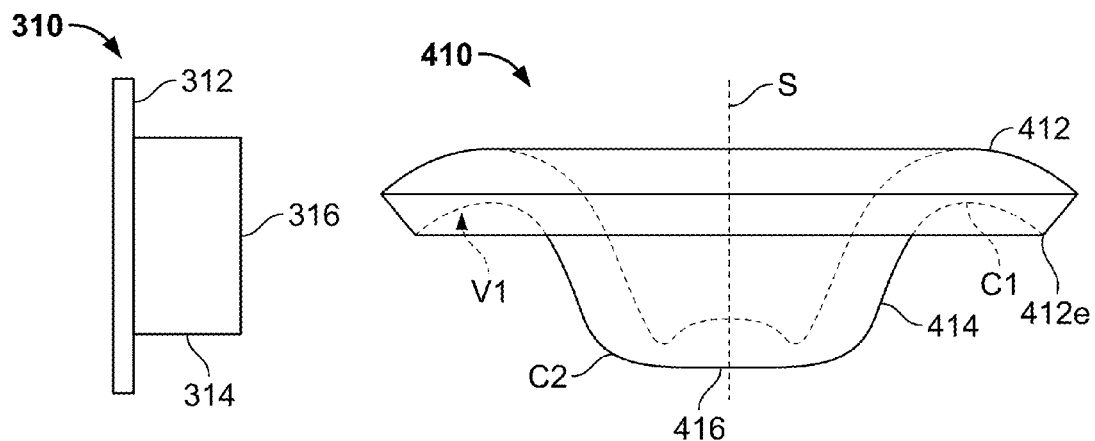
FIG. 13B
FIG. 14A

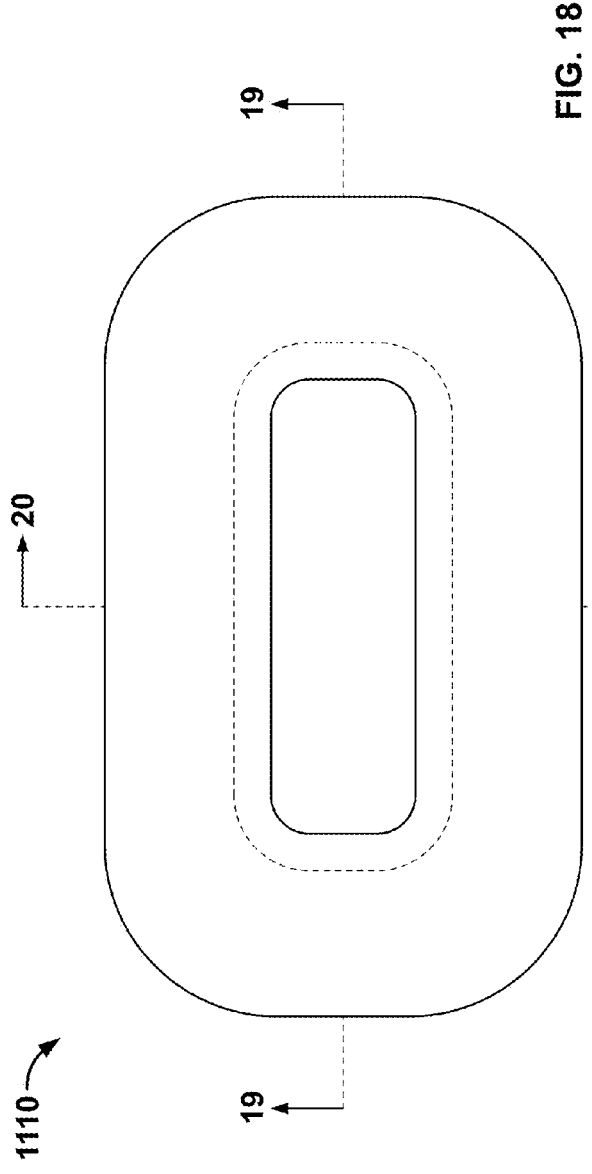
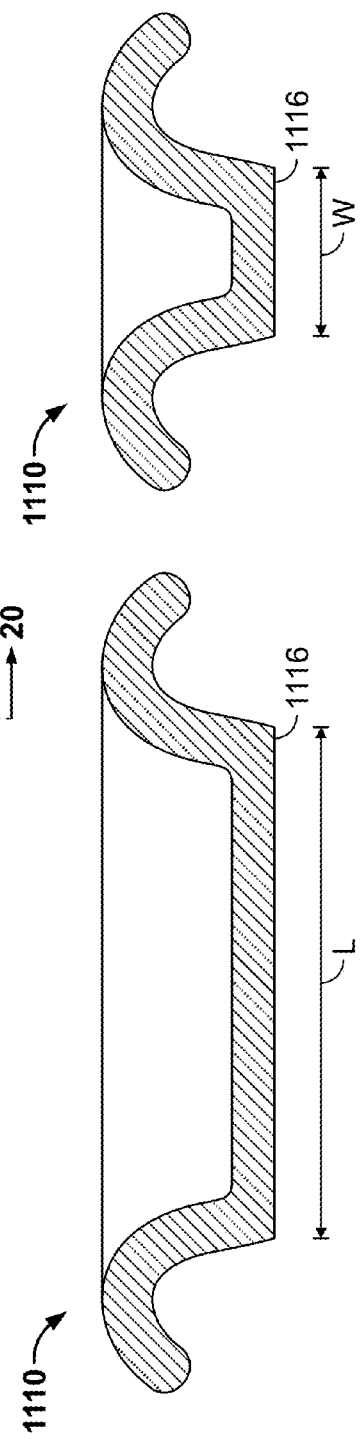
FIG. 18
FIG. 19
FIG. 20

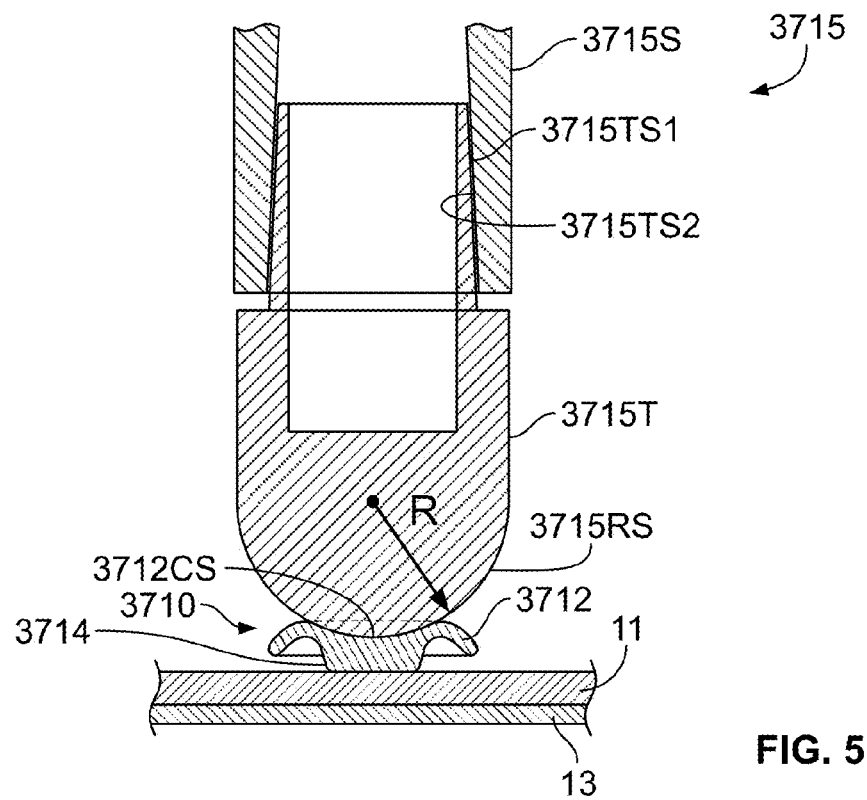
FIG. 51
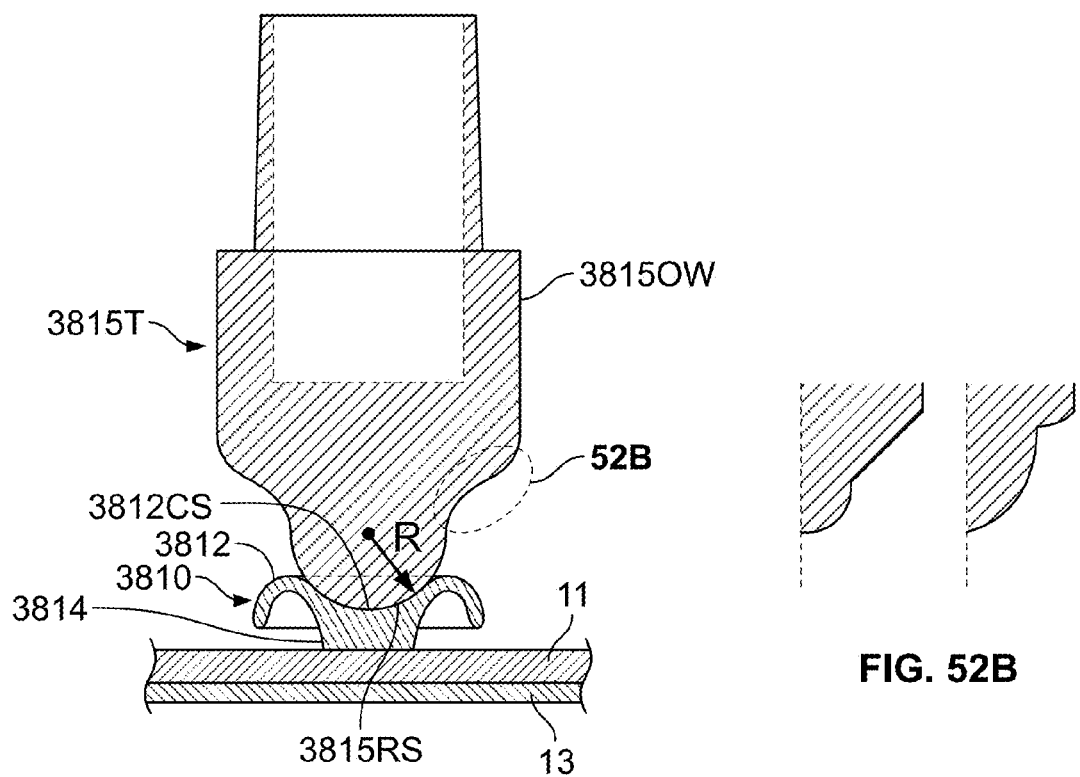
FIG. 52A
FIG. 52B

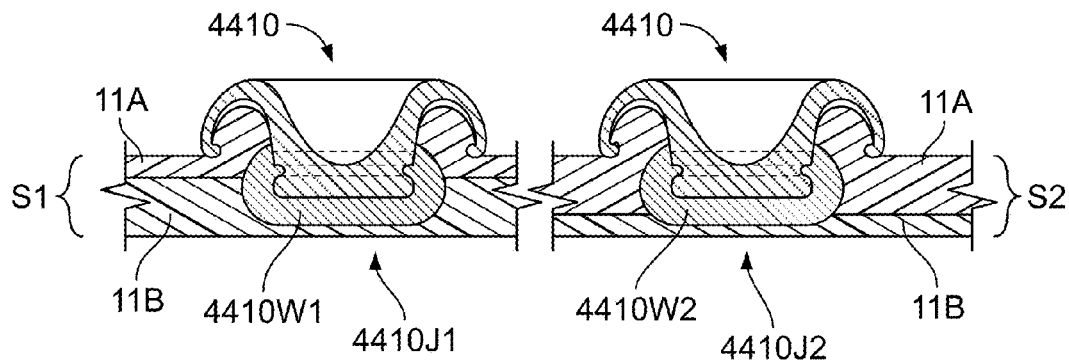
FIG. 61A
FIG. 61B
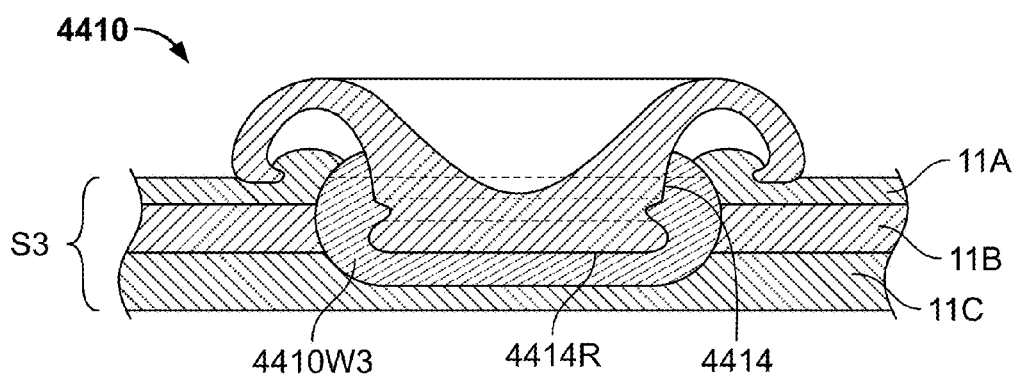
FIG. 62
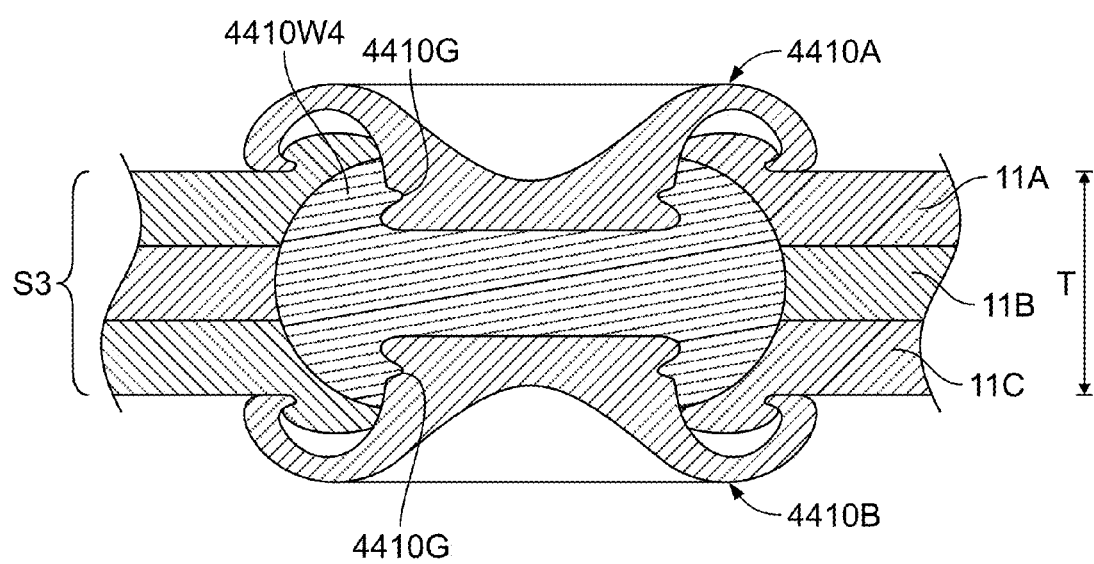
FIG. 63

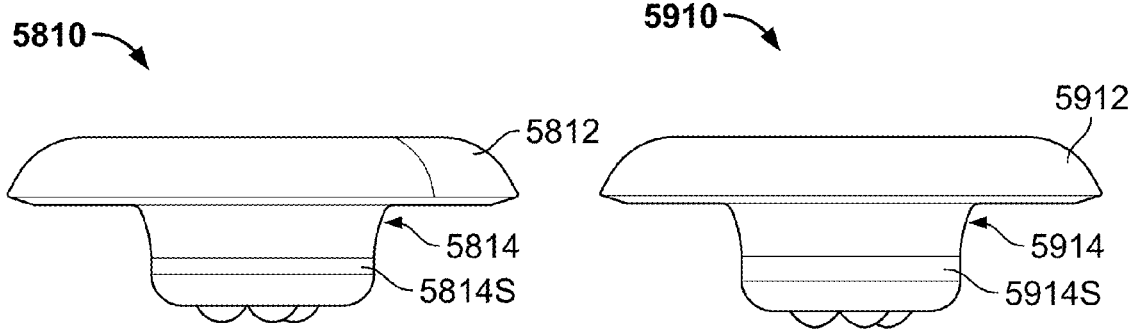
FIG. 85  FIG. 86
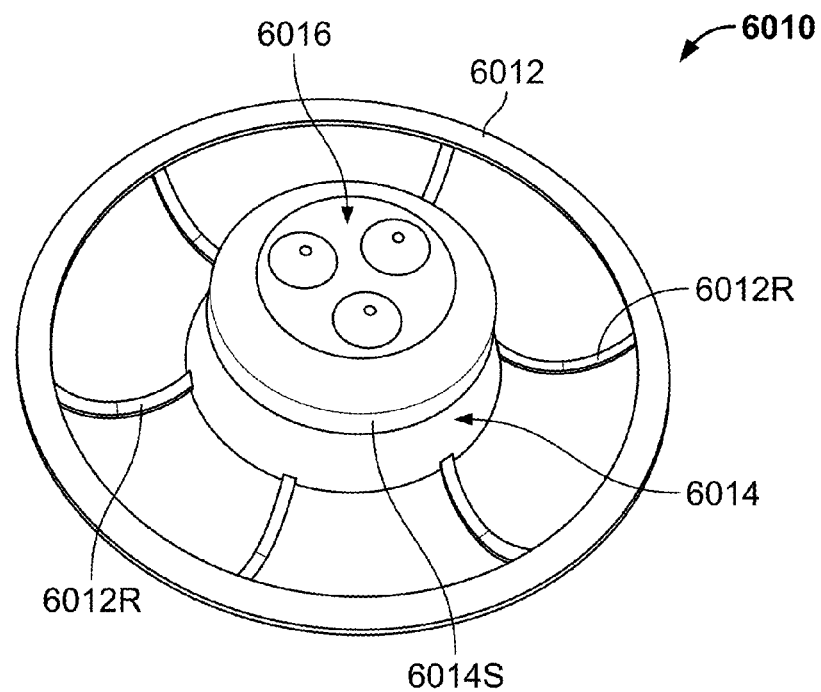
FIG. 87

RESISTANCE WELDING FASTENER, APPARATUS AND METHODS FOR JOINING SIMILAR AND DISSIMILAR MATERIALS

CROSS REFERENCE TO RELATED APPLICATIONS

The present application claims the benefit of U.S. provisional patent application No. 62/091,980, filed Dec. 15, 2014 and entitled, Resistance Welding Fastener, Apparatus and Methods For Joining Similar and Dissimilar Materials, which is incorporated by reference herein in its entirety.

FIELD

The present invention relates to fasteners, fastening apparatus and methods for fastening parts and more particularly, for fastening metals, including dissimilar metals.

BACKGROUND

Various fasteners, apparatus and methods for joining and assembling parts or subunits are known, such as welding, riveting, threaded fasteners, etc. In some instances, there is a need to cost effectively join aluminum parts, subunits, layers, etc., to other parts, subunits, layers, etc. made from other materials, such as steel (bare, coated, low carbon, high strength, ultra high strength, stainless), titanium alloys, copper alloys, magnesium, plastics, etc. and/or to another part, subunit, layer made from aluminum. Solutions for these fastening problems include mechanical fastener/rivets in combination with an adhesive and/or a barrier layer to maintain adequate joint strength while minimizing corrosion, e.g., due to the galvanic effect present at a junction of dissimilar metals. Direct welding between aluminum and other materials is not commonly employed due to intermetallics generated by the aluminum and the other materials, which negatively affect mechanical strength and corrosion resistance. In cases where direct welding is employed, it is typically some type of solid-state welding (friction, upset, ultrasonic, etc.) or brazing/soldering technology in order to minimize the intermetallics, but the mechanical performance of such joints is sometimes poor or only applicable to unique joint geometries.

In the automotive industry, the incumbent technology for joining steel to steel is resistance spot welding (RSW), due to cost and cycle time considerations (less than 3 seconds per individual joint, which may be performed robotically). In certain instances, metal structures are fabricated by joining subparts made from similar metals other than steel.

Known fasteners and methods for joining aluminum to steel, and for joining similar or the same non-ferrous metals include: through-hole riveting/fasteners, self-pierce riveting (SPR), flow drill screws (FDS or by trade name of EJOTS), friction stir spot welding/joining (FSJ), friction bit joining (FBJ), and use of adhesives. Each of these processes may be more challenging than steel-to-steel resistance spot welding (RSW). For example, when high strength aluminum (above 240 MPa) is coupled to steel using SPR or another sheet of aluminum, the aluminum can crack during the riveting process. FSJ is not widely employed in the automotive industry since joint properties (primarily peel and cross tension) are low compared to SPR. In addition, FSJ requires very precise alignment and fit-up. Similar considerations pertain to FBJ and FDS, e.g., FDS is typically applied from a single side and requires alignment with a pilot hole in the sheet to be fastened, complicating assembly and adding cost.

Alternative fasteners, apparatus and methods for joining and assembling parts or subunits therefore remain desirable.

SUMMARY

The disclosed subject matter relates to a method for fastening a first electrically conductive layer to a second electrically conductive layer using electrical resistance welding, including:
placing the first and second layers together in physical and electrical contact;
placing an electrically conductive fastener which has a higher melting point than the first layer in physical and electrical contact with the first layer to form an electrically conductive stack inclusive of the fastener, the first layer and the second layer;
applying an electrical potential across the stack, inducing a current to flow through the stack and causing resistive heating, the resistive heating causing a softening of the first layer;
urging the fastener into the softened first layer toward the second layer forming a molten weld zone that extends to and includes at least a portion of the second layer;
allowing the weld zone to cool and solidify, joining the first layer and the second layer.

In accordance with another aspect of the present disclosure, the fastener is retained in the weld zone after the step of allowing the weld zone to cool and solidify.

In accordance with another aspect of the present disclosure, the fastener has a shaft with a projection extending from the surface of the shaft, the projection extending into the weld zone during the steps of urging and cooling, the projection increasing the resistance of the fastener from being withdrawn from the weld zone after the step of cooling.

In accordance with another aspect of the present disclosure, the fastener has a shaft with a depression extending into the surface of the shaft, the depression allowing molten metal of the weld zone to extend therein during the steps of urging and cooling, the depression increasing the resistance of the fastener from being withdrawn from the weld zone.

In accordance with another aspect of the present disclosure, the fastener has a cap with a downwardly depending lip capable of receiving material upwelled from the first layer during the steps of urging, the upwelled material engaging the lip during the step of cooling, providing a mechanical connection between the cap and the first layer.

In accordance with another aspect of the present disclosure, the cap is capable of receiving material extruded from the weld zone during said step of urging.

In accordance with another aspect of the present disclosure, the first layer and the second layer are formed from at least one of aluminum, magnesium, copper or alloys thereof.

In accordance with another aspect of the present disclosure, the first layer and the second layer are formed from aluminum alloy.

In accordance with another aspect of the present disclosure, the fastener is made from at least one of a steel or titanium alloy.

In accordance with another aspect of the present disclosure, the fastener is made from an aluminum alloy.

In accordance with another aspect of the present disclosure, a third layer of steel alloy is placed in contact with the second layer distal to the first layer during the step of placing and wherein the fastener is urged through the first layer and the second layer during the step of urging, and further including the step of welding the fastener to the third layer.

In accordance with another aspect of the present disclosure, further including placing at least one additional layer of a non-ferrous alloy in electrical contact with the second layer distal to the first layer, the weld zone extending into the additional layer during the step of urging and cooling to join the additional layer to the first and second layers.

In accordance with another aspect of the present disclosure, the layers are sheet metal.

In accordance with another aspect of the present disclosure, the second layer is a portion of a structural member.

In accordance with another aspect of the present disclosure, further comprising the step of placing a second fastener opposite to the first fastener in the stack prior to the steps of applying and urging, such that at least one weld zone is formed in the stack intermediate the first and second fasteners and the second fastener is urged into the softened second layer during the step of applying.

In accordance with another aspect of the present disclosure, the weld zone extends through the first layer and the second layer between the first and second fasteners.

In accordance with another aspect of the present disclosure, further including the step of inserting a third layer between the first and second layers during the step of placing, the at least one weld zone extending through the first and second layers to a portion of the third layer.

In accordance with another aspect of the present disclosure, the weld zone extends through the third layer.

In accordance with another aspect of the present disclosure, a fastener for fastening a first electrically conductive layer to a second electrically conductive layer using electrical resistance welding, includes: a cap and a shaft extending from the cap and having an end distal to the cap. The fastener, when placed in a stack including first and second electrically conductive layers positioned in electrical contact, and subjected to an electrical potential applied across the stack, is capable of conducting an electrical current that passes through the stack. The fastener has a higher melting point than the first and second layers, the current causing resistive heating, softening the first layer, the shaft capable of penetrating into the first layer and establishing a weld zone extending between the fastener and the second layer.

In accordance with another aspect of the present disclosure, the shaft has a projection extending from the surface of the shaft, the projection capable of extending into the weld zone and increasing the resistance of the fastener from being withdrawn from the weld zone after solidification.

In accordance with another aspect of the present disclosure, the shaft has a depression extending into the shaft, the depression capable of allowing molten metal of the weld zone to extend therein, increasing the resistance of the fastener from being withdrawn from the weld zone when cool.

In accordance with another aspect of the present disclosure, the shaft has a depression extending into the shaft, the depression capable of allowing molten metal of the weld zone to extend therein, increasing the resistance of the fastener from being withdrawn from the weld zone when cool.

In accordance with another aspect of the present disclosure, the shaft has a plurality of projections, the depression on the shaft positioned between at least two of the plurality of projections.

In accordance with another aspect of the present disclosure, the fastener has a cap with a downwardly depending lip capable of receiving material upwelled from the first layer and material extruded from the weld zone.

In accordance with another aspect of the present disclosure, the fastener is symmetric about a rotational axis and has a hollow shaft with a U-shaped cross section, the cap extending from the shaft at the open end of the U-shape forming the peripheral lip, the peripheral lip being reversely curved and capable of engaging the material upwelled from the first layer to connect the cap and the first layer when the upwelled material is solid.

In accordance with another aspect of the present disclosure, the fastener is capable of joining different stacks of layers having different thicknesses.

In accordance with another aspect of the present disclosure, the projection is formed on the shaft as a consequence of deformation during welding.

In accordance with another aspect of the present disclosure, a structure includes a plurality of layers of non-ferrous metal, a ferrous, electrically conductive fastener having a melting point higher than a first layer of the plurality of layers and capable of being pressed into at least the first layer of the plurality of layers when the first layer is softened by electrical resistance heating forming a molten weld zone that extends to and includes at least a portion of the second layer. The fastener has a shaft with a surface roughness that inter-digitates with the weld zone to resist removal of the fastener from the weld zone after solidification of the weld zone.

In accordance with another aspect of the present disclosure, the fastener has a cap capable of pressing against the first layer and covering a portion of the first layer, the cap capable of receiving upwelled material from the first layer and material extruded from the weld zone.

In accordance with another aspect of the present disclosure, a method for fastening a first material to a second electrically conductive material using electrical resistance welding, includes: forming a pilot hole in the first material; placing the first and second materials together in physical contact; placing an electrically conductive fastener that is weldable to the second material in electrical contact with the second material by extending the fastener through the pilot hole; applying an electrical potential across the fastener and the second material, inducing a current to flow through the fastener and the second material causing resistive heating, the resistive heating causing the fastener to weld to the second material.

In accordance with another aspect of the present disclosure, the fastener and the second material are at least one of steel, aluminum, magnesium, titanium, and alloys thereof and the first material is at least one of plastic, plastic composite, metal-plastic laminate, ceramic and metal coated with a non-conductive coating.

In accordance with another aspect of the present disclosure, the non-conductive coating is paint.

In accordance with another aspect of the present disclosure, the non-conductive coating is an anodized layer.

In accordance with another aspect of the present disclosure, the metal coated with the non-conductive coating is at least one of aluminum, steel, titanium, magnesium, alloys thereof and Inconel.

In accordance with another aspect of the present disclosure, the step of forming a pilot hole includes forming a countersunk portion of the pilot hole.

In accordance with another aspect of the present disclosure, a fastener for fastening a first electrically non-conductive material having a pilot hole therein to a second electrically conductive material using electrical resistance welding, has a cap, a shaft extending from the cap and having an end distal to the cap, the fastener capable of inserting through the pilot hole when the first and second materials are placed in a stack. The fastener is formed from electrically conductive material and capable, when subjected to an electrical potential applied across the fastener and the stack, of conducting an electrical current that passes through the stack, the current causing resistive heating, welding the fastener to the second material at the end distal to the cap and capturing the first material between the cap and the second material after the end is welded to the second material.

In accordance with another aspect of the present disclosure, a method for fastening a first material to a second electrically conductive material using electrical resistance welding, features: forming a pilot hole in the first material; placing the first and second materials together in physical contact; placing an electrically conductive fastener which has a higher melting point than the second material in electrical contact with the second material by extending the fastener through the pilot hole; applying an electrical potential across the fastener and the second material, inducing a current to flow through the fastener and the second material causing resistive heating, the resistive heating causing a softening of the second material; urging the fastener into the softened second material forming a molten zone in the second material proximate the fastener and into which the fastener extends; allowing the molten zone to cool and solidify, retaining the fastener in the solidified molten zone.

In accordance with another aspect of the present disclosure, a fastener for fastening a first layer to a second electrically conductive layer using electrical resistance welding features a cap, a shaft extending from the cap and having an end distal to the cap with at least one projection extending therefrom having a terminal end with a surface area less than a surface area of the distal end of the shaft, the fastener, when placed in a stack including first and second electrically conductive layers and subjected to an electrical potential applied across the stack, capable of conducting an electrical current that passes through the stack, the current causing resistive heating, the shaft capable of penetrating into the first layer and establishing a weld zone extending between the fastener and the second layer.

In accordance with another aspect of the present disclosure, the fastener has a plurality of projections.

In accordance with another aspect of the present disclosure, the fastener projection is in the form of a hemisphere.

In accordance with another aspect of the present disclosure, the fastener projection is in the form of a cone.

In accordance with another aspect of the present disclosure, the fastener projection is in the form of a ring.

In accordance with another aspect of the present disclosure, the fastener projection is in the form of a pad having a diameter less than the diameter of the distal end of the shaft.

In accordance with another aspect of the present disclosure, the fastener projection is capable of reducing the contact area of the fastener with the stack relative to the contact area of the distal end.

In accordance with another aspect of the present disclosure, the fastener projection is capable of piercing a non-conductive coating applied to at least one of the first and second layers.

In accordance with another aspect of the present disclosure, the fastener projection is capable of disrupting a non-conductive coating applied to at least one of the first and second layers via localized heating of the non-conductive coating.

In accordance with another aspect of the present disclosure, a welding apparatus for welding a first member to a second member, features a first welder with a first pair of electrodes capable of presenting an electrical potential there between, the first pair of electrodes placed in contact with two spaced areas of the first member, whereby electricity flows through the first member between the first pair of electrodes; a second welder with a second pair of electrodes capable of presenting an electrical potential there between, the second pair of electrodes placed in contact with two spaced areas of the second member, whereby electricity flows through the second member between the second pair of electrodes, the two spaced areas of the first member aligned with the two spaced areas of the second member.

In accordance with another aspect of the present disclosure, the flow of electricity between at least one of the first pair of electrodes or the second pair of electrodes is capable of disturbing a non-conductive coating on at least one of the first member or the second member.

In accordance with another aspect of the present disclosure, the cap has at least one rib increasing the resistance of the cap to deformation.

In accordance with another aspect of the present disclosure, the shaft has a portion of the length thereof that is substantially cylindrical and a portion that is non-cylindrical.

In accordance with another aspect of the present disclosure, the electrical potential is applied by welding electrodes and further including the step of inserting a material having greater electrical resistance than the electrodes between at least one of the electrodes and the stack.

BRIEF DESCRIPTION OF THE DRAWINGS

For a more complete understanding of the present disclosure, reference is made to the following detailed description of exemplary embodiments considered in conjunction with the accompanying drawings.

FIG. 1 is a perspective view of a fastener in accordance with an embodiment of the present disclosure.

FIG. 2 is a cross-sectional view of the fastener of FIG. 1 taken along section line 2-2 and looking in the direction of the arrows.

FIG. 3 is a cross sectional view of a fastener like that shown in FIG. 2, but having different dimensions.

FIG. 12 is a side view of a spot welding cap in accordance with an embodiment of the present disclosure.

FIGS. 13A and 13B are plan and side views, respectively, of a fastener in accordance with another embodiment of the present disclosure.

FIGS. 14A and 14B are side and plan views, respectively, of a fastener in accordance with another embodiment of the present disclosure.

FIGS. 18, 19 and 20 are plan, and cross-sectional views, respectively, of a fastener in accordance with an alternative embodiment of the present disclosure.

FIG. 51 is a diagrammatic, cross-sectional view of a welding electrode and a fastener in accordance with an alternative embodiment of the present disclosure, positioned on a pair of layers.

FIG. 52A is a diagrammatic, cross-sectional view of a welding electrode tip and a fastener in accordance with an alternative embodiment of the present disclosure, positioned on a pair of layers.

FIG. 52B is an enlarged segment of the electrode tip of FIG. 53A in accordance with alternative embodiments of the present disclosure.

FIGS. 61A and 61B are diagrammatic, cross-sectional views showing the insertion of a fastener in accordance with the fastener of FIG. 60 inserted to different degrees into a stack-up of layers of different thicknesses.

FIG. 62 is a diagrammatic, cross-sectional view of the fastener of FIG. 60 inserted into a tri-layer stack-up.

FIG. 63 is a diagrammatic, cross-sectional view of a pair of the fasteners of FIG. 60, inserted in a converging direction through the opposing sides of a tri-layer stack-up communicating with a common weld zone.

FIG. 85 is a side view of a fastener in accordance with another embodiment of the present disclosure.

FIG. 86 is a side view of a fastener in accordance with another embodiment of the present disclosure.

FIG. 87 is a perspective view of a fastener in accordance with another embodiment of the present disclosure.

DETAILED DESCRIPTION OF EXEMPLARY EMBODIMENTS

Figure 4:
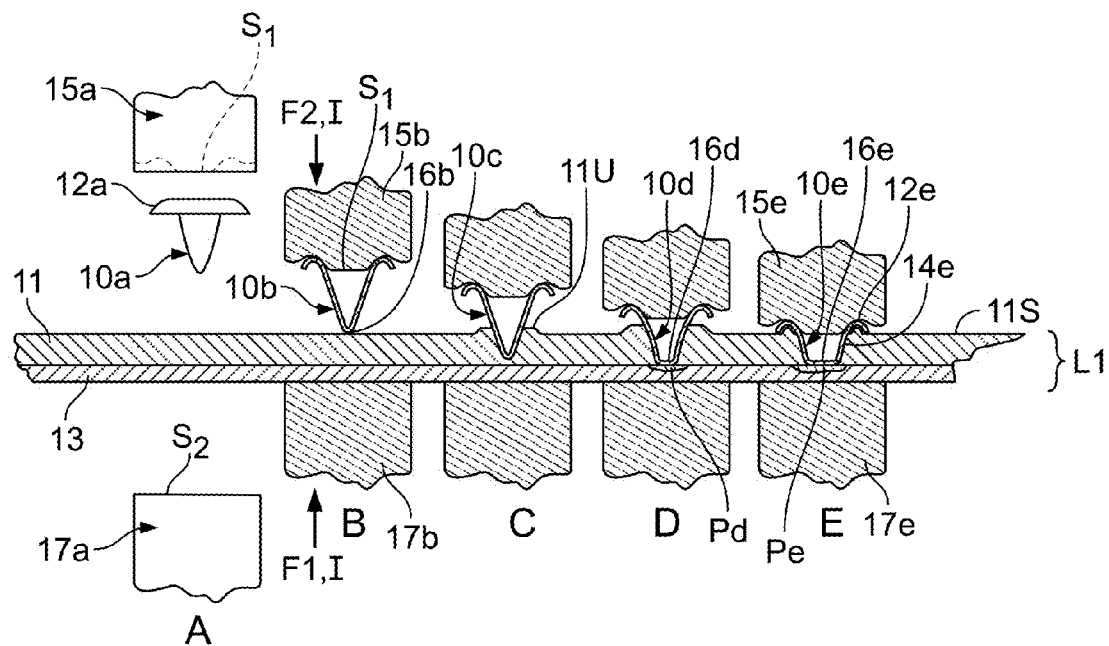
FIG. 4 is a diagrammatic view sequentially showing the insertion of a fastener in accordance with an embodiment of the present disclosure through a first layer and being welded to a second layer.

The present application incorporates U.S. Provisional Application No. 61/839,478, entitled, Apparatus and Method For Joining Dissimilar Materials, filed Jun. 26, 2013, U.S. application Ser. No. 14/315,598, entitled, Apparatus and Method For Joining Dissimilar Materials, filed Jun. 26, 2014, U.S. Provisional Application No. 61/839,473, entitled, Resistance Welding Fastener, Apparatus and Methods, filed Jun. 26, 2013, U.S. application Ser. No. 14/315,698, entitled, Resistance Welding Fastener, Apparatus and Methods, filed Jun. 26, 2014 and U.S. Provisional Application No. 61/934,951, entitled, Resistance Welding Fastener, Apparatus and Methods, filed Feb. 3, 2014, by reference in their entirety herein.

FIGS. 1 and 2 show a fastener 10 having a peripheral cap 12 and a tapered shaft 14 that has a bluntly pointed end 16 opposite to the cap 12. An internal hollow H extends through the cap 12 and into the shaft 14. The fastener 10 may be made from a conductive metal, e.g., steel or titanium, that is capable of supporting a resistance spot welding process. The cap 12 has an edge-to-top dimension CE, and diameter CD. The stem has diameter SD and length from cap 12 to end 16 of SL. As described below, these dimensions may be varied depending upon the use to which the fastener 10 is put, e.g., the thickness and type of parts that the fastener 10 is used to join. In one example, the diameter CD may be in the range of about 4 mm to 16 mm, the length SL in the range of about 3 mm to 10 mm, CE in the range of about 0.5 to 3.0 mm and SD in the range of about 2 to 12 mm. FIG. 3 shows a fastener 20, like that of FIG. 1, but having different dimensions, i.e., having a thinner shaft 24 with a more severely pointed end 26.

FIG. 4 shows the insertion of a fastener 10a in accordance with an embodiment of the present disclosure through a first layer of metal 11, e.g., an aluminum alloy, and being welded to a second layer of metal 13, e.g., a steel alloy, to form a laminate structure L1. This is shown in sequential stages labeled A-E. As shown at stage A, this process may be conducted at a conventional spot welding station having opposing electrodes, the tips 15a and 17a of which are shown spaced apart from the metal sheets/layers 11, 13, allowing the fastener 10a to be inserted between the tip 15a and the layer 11. The tip 15a may have a surface S1 with a shape that accommodates, supports, shapes and/or retains the fastener 10a through the welding process. At stage B, opposing forces F1, F2 exerted by the conventional welding machine (not shown) to move the tips 15b, 17b towards one another, capture the fastener 10b and the layers 11, 13 there between and an electric current I is applied through the conjunction of these elements. The forces F1, F2 and current I are applied throughout the stages B-E and the magnitude and duration of each may be varied depending upon the requirements at each stage. For example, the current I required to heat/plasticize the aluminum in stage B may be less than that required to weld steel to steel as occurs in stages D and E. Similarly, the forces F1 and F2 may be varied to accommodate changing processing requirements.

The current I heats each of the fastener 10b, and the layers 11, 13 to a temperature at which the aluminum layer 11 plasticizes and can be displaced/pierced by the fastener 10b. The aluminum layer 11 is heated resistively by current I and also through conduction from both the fastener 10b and the layer 13. The fastener 10b and the layer 13 have lower heat and electrical conductivity than the aluminum layer 11, such that a low current typically achieved with a resistance spot welder suitable for making resistance spot welds in steel can be used to generate the heat required to plasticize the aluminum layer, as well as make the weld to layer 13, as described below. Since aluminum has a lower melting point than the steel layer 13 or the fastener 10b, which in this example is also steel, the aluminum layer 11 reaches a plastic state permitting displacement by the fastener 10b and allowing the end 16b of the fastener 10b to penetrate the aluminum layer 11. As shown at stage C, the insertion of the fastener 10c into the aluminum layer 11 causes an upwelling 11U of displaced plasticized aluminum rising above the original upper surface 11S of the layer 11. As shown at stage D, the fastener 10d penetrates the layer 11 completely and comes into contact with the steel layer 13 whereupon the end 16d of the fastener 10d begins to melt and flatten and a zone Pd of molten metal begins to form at the interface of the layer 13 and the end 16d of the fastener. The zone Pd is the weld material or "nugget" where the metal of the fastener 10d and the layer 13 liquify and commingle. As shown at stage E, the continued application of converging forces F1, F2 and current I result in a further blunting and melting of the end 16e and a portion of the length of the stem 14e, along with the enlargement of the molten zone Pe. Stage E also shows the cap 12e has descended down to the level of the upper surface 11S, covering and sealing the upwelling 11U attributable to the insertion of the fastener 10e fully into the layer 11 of aluminum.

After having accomplished stage E, the forces F1, F2 and current I can be removed and the tips 15e and 17e, withdrawn. The foregoing process can be conducted with barrier layers, e.g., an adhesive layer of surface pre-treatment or paint/primer (not shown) applied to the surface 11S and/or between the layers 11, 13, so long as the barrier layer does not prevent the current I from flowing to create electrical resistance heating. In this manner, the contact between dissimilar metals of layers 11,13 can be reduced, along with unwanted galvanic interaction and corrosion. The partial melting of the fastener 10 during the penetration and welding phases of the process allows the fastener 10a to accommodate a range of thicknesses of layer 11.

The cap 12a of the fastener 10a defines an annular recess that can receive, capture and seal off aluminum and intermetallics generated from the penetration (stages B and C) and welding (stages D and E) as the cap 12a "bottoms out" on the surface 11S of the aluminum layer 11. This containment of the aluminum and intermetallics may significantly improve the corrosion performance and joint strength attributable to the fastener 10a. The cap 12a can be formed in the fastener 10a prior to the welding process or can be formed in-situ during welding. As described more fully below in reference to FIG. 8, the geometry of the fastener 10a and its interaction with/retention by tip 15a and surface S1 enables single-sided welding (welding from one side without an electrode contacting member 13 directly in opposition to the electrode tip 15a to provide a counter force). The tip 15a, may be shaped to be grasped by the fastener 10a via a resilience or spring loading of the fastener 10a which retains the fastener 10a on the tip 15a during welding, but detach once the weld has been completed. For example, the tip 15 may have a peripheral ledge or concavity that an upper edge of the fastener 10a resiliently and removable grasps.

The fastener 10 may be formed from thin sheet steel, e.g., about 1 mm to 4 mm in thickness, but can be made in any given thickness as determined by the thickness of the layers 11, 13, with greater thickness in the layers requiring greater thickness of the fastener. Alternatively, the shaft 14 of the fastener 10 may be solid or semi-solid. Regardless of the thickness/hollowness of the fastener (density for a given surface area) the shaft 14 may be proportioned to collapse when the end 16 is welded to the sheet 13, such that the cap contacts the upper surface 11S of sheet 11 and/or seals off any intermetallics and upwelled areas 11U when welding is completed (stage E).

The final dimensions of the weld zone Pe will depend upon the starting and final dimensions of the fastener shaft 14e, i.e., diameter, length and the thickness of the shaft walls. The greater the dimensions of the fastener shaft 14e, the greater the dimensions of the weld zone Pe. In one example, attaching sheet 11 composed of aluminum of thickness 0.5 mm to 4.0 mm to sheet 13 composed of steel of 0.5 mm to 3.0 mm thickness, a weld diameter in the range from 2 mm to 8 mm would exhibit beneficial shear and peel strength properties.

Figure 5:
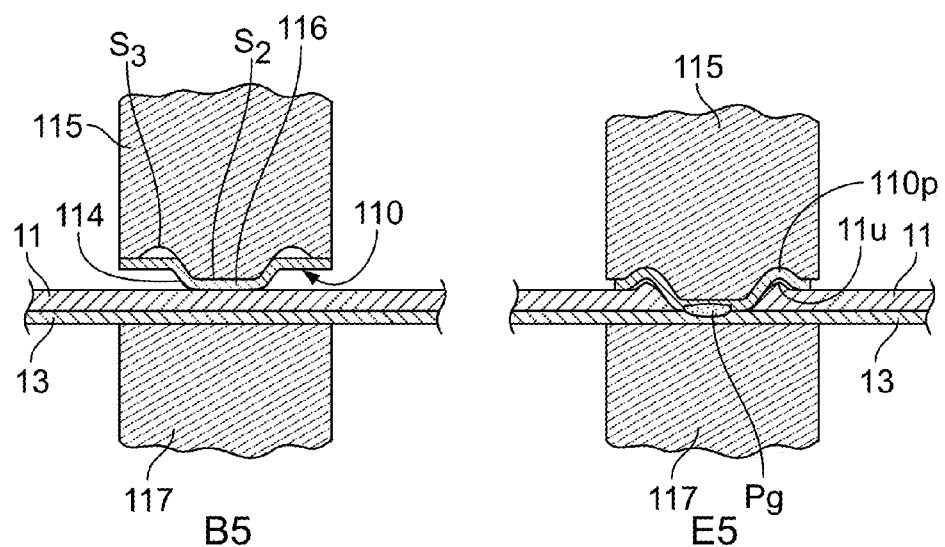
FIG. 5 is a diagrammatic view sequentially showing the insertion of a fastener in accordance with another embodiment of the present disclosure through a first layer and being welded to a second layer.

In order to minimize weight in a finished welded product made with the fasteners 10 of the present disclosure, the gauge of the sheet employed for making the fastener 10 may be reduced. As a result, the reduced sidewall strength of the fastener shaft 14 may cause it to prematurely collapse during the welding process. In order to support the shaft 14, the electrode 15a can be formed to extend into the hollow H to partially or fully engage the inner surface of the shaft 14 within the hollow H. FIG. 5 shows an alternative fastener 110 in two phases in the welding process, viz., phase B5 prior to extruding through the layer 11 and phase E5—after welding. An electrode tip 115 having a surface S2 that supports the end 116 of the fastener 110, allows the end 116 to be pushed through the layer 11 without the end 116 or shaft (sidewall) 114 deforming. The tip 115 has a concave annular surface S3 that can receive and form/shape a corresponding area of the fastener periphery 110p in response to the fastener 110 being pressed against the upwelling 11U when the fastener is pressed fully through layer 11 to form the weld zone Pg as shown in phase E5.

Figure 6:
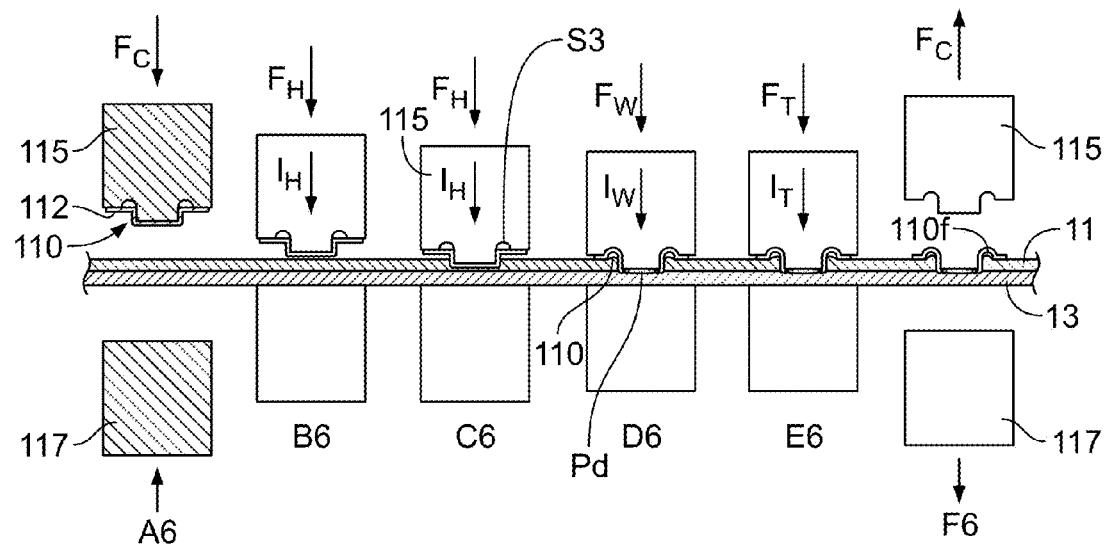
FIG. 6 is a diagrammatic view sequentially showing the insertion of a fastener in accordance with another embodiment of the present disclosure through a first layer and being welded to a second layer.

FIG. 6 shows a more comprehensive sequence of steps A6-F6 in use of the fastener 110 to perform spot welding through an upper layer 11, e.g., an aluminum sheet, to fasten the upper layer 11 to a lower layer 13, e.g., a steel sheet. As can be appreciated, this process could also be called "resistance spot fastening" or "resistance spot riveting," in that the fastener 110 could be described as a rivet that is plunged through the layer 11, making a hole in the layer 11 and joining to the layer 13 by welding, the cap 112 of the fastener clamping the layer 11 against the layer 13. As the fastener 110 penetrates the top layer 11 and engages the bottom layer 13, the concave annular surface S3 in the electrode tip 115 encapsulates and seals against the layer 11, in particular, the upwelling 11U. In one example, stage B6 and C6 may have an associated force $F_H$ of a magnitude of, e.g., from 100 to 2000 pounds and a current level $I_H$ of a magnitude of, e.g., from 2,500 to 24,000 amperes, that is appropriate for plasticizing the first layer 11 of aluminum having a thickness of 2 mm and welding to a second layer 13 of 780 MPa galvanized coated steel with a thickness of 1.0 mm, by a fastener of low-carbon steel with a 16 mm overall diameter, a total height of 3 mm and average wall thickness of 1.0 mm. These magnitudes of force and current are just exemplary and are dependent upon the dimensions and compositions of the fastener 110 and the layers 11 and 13. The duration of time to transition from stage B6 to C6 may be in the order of 0.2 to 6.0 secs. In one example, a force of e.g., 100 lbs, a current of 2,500 A and a cycle time of 6 seconds may be used. Increases in the force and current may result in shorter cycle times. Pursuing this example further and using the same dimensions and properties of the fastener 110 and layers 11, 13, stage D6 may utilize an associated force $F_W$ of a magnitude of, e.g., from 400 to 800 pounds and a current level $I_W$ of a magnitude of, e.g., from 6,000 to 18,000 amperes, that is appropriate for initiating the melting of the fastener 110 and the lower level 13 to form a molten weld zone Pd. The magnitude of force $F_W$ may be changed to a force $F_T$ of a magnitude of, e.g., from 400 to 1,000 pounds and a current level $I_T$ of a magnitude of, e.g., from 3,000 to 12,000 amperes at stage E6 to form an expanded weld zone to temper the weld and to render it with an average cross-sectional diameter of 4 mm to 6 mm. The completion of stage D6 may take, e.g., 0.1 to 0.5 secs. At stage F6, the first and second electrode tips 115, 117 may be withdrawn. As can be appreciated, since the upwelling 11U forces the cap 112 to conform to the surface S3, establishing a close relative fit, there may be some resistance to withdrawing the first tip 115 from the fastener 110f at stage F6. In some applications, it may also be preferred to utilize a pre-formed fastener to reduce withdrawal force, cycle time and to reduce the amount of welding force $F_W$ needed to shape the cap 112 to conform to the surface S3 and the upwelling 11U.

Figure 7:
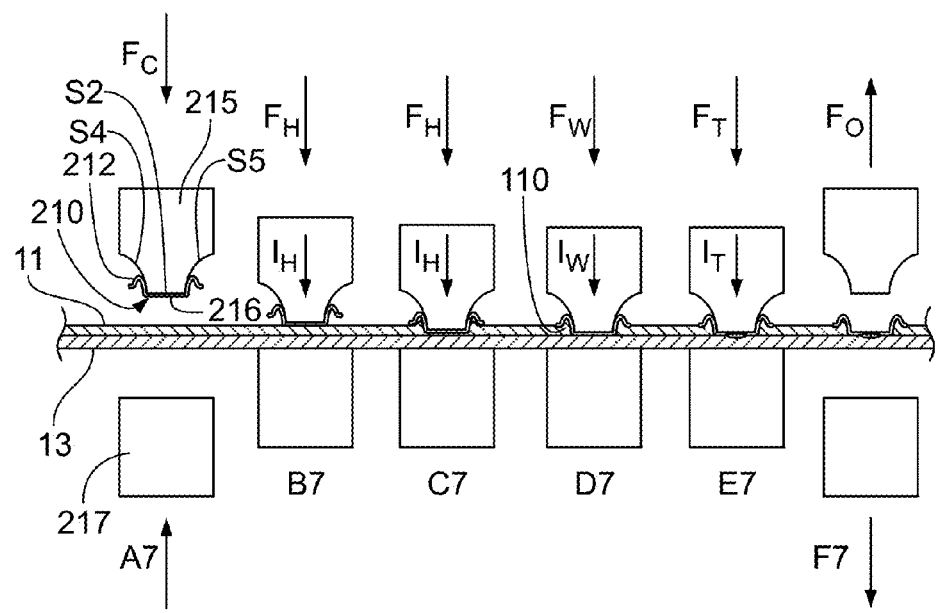
FIG. 7 is a diagrammatic view sequentially showing the insertion of a fastener in accordance with another embodiment of the present disclosure through a first layer and being welded to a second layer.

FIG. 7 shows a sequence of steps A7-F7 in use of a fastener 210 to perform spot welding through an upper layer 11, e.g., an aluminum sheet, to fasten the upper layer 11 to a lower layer 13, e.g., a steel sheet. The fastener 210 is preformed to have a shape similar to the fastener 110 after it has been formed by the welding force shown in stages D6 and E6 of FIG. 6, such that the upper section can encapsulate and seal the top surface without the need to be formed by the electrode during the welding process. Since the fastener 210 is preformed, the electrode tip 215 does not require the concave annular surface S3 to shape the cap 212 to accommodate and seal against upwelling 11U of the first layer 11 proximate where it is penetrated by the fastener 210. As a result, the electrode tip 215 can taper (be radiused at surfaces S4, S5 to the surface S2 supporting the end 216 of the fastener 210. This allows the concentration of heating, welding, and tempering forces $F_H$, $F_W$, $F_T$ as well as the heating, welding, and tempering currents $I_H$, $I_W$, $I_T$ over a smaller area, allowing reduced force and current to accomplish the tasks of penetration, welding and tempering.

Figure 8:
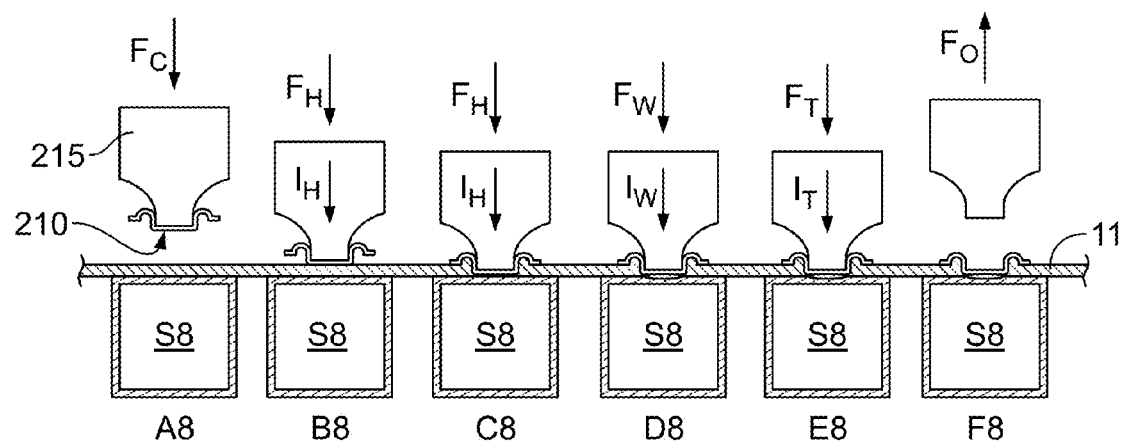
FIG. 8 is a diagrammatic view sequentially showing the insertion of a fastener like that shown in FIG. 7 through a first layer and being welded to a tubular member via single sided access.

FIGS. 4-7 depict direct access welding wherein the resistance welding electrodes, e.g., 15a, 17a, clamp the work pieces/welding stack 10a, 11, 13 from opposing sides. As shown in FIG. 8, spot welding using a fastener 10, 20, 110, 210, in accordance with the present disclosure can be conducted from one side using indirect welding. A structure S8, such as a steel beam or any other type of structure may be connected to one pole of a source of electrical potential for conducting welding. The other pole provides electrical power to welding tip 215 to supply electrical power for heating at stages B8 and C8, welding at D8 and tempering at E8. Indirect welding is commonly done on steel, but is difficult to conduct on aluminum to aluminum joints. Since the present disclosure permits welding with a fastener made from materials other than aluminum, it facilitates the conjunction of an aluminum layer 11, e.g., an aluminum sheet, to a steel structure S8, such as a steel tube.

Figure 9:
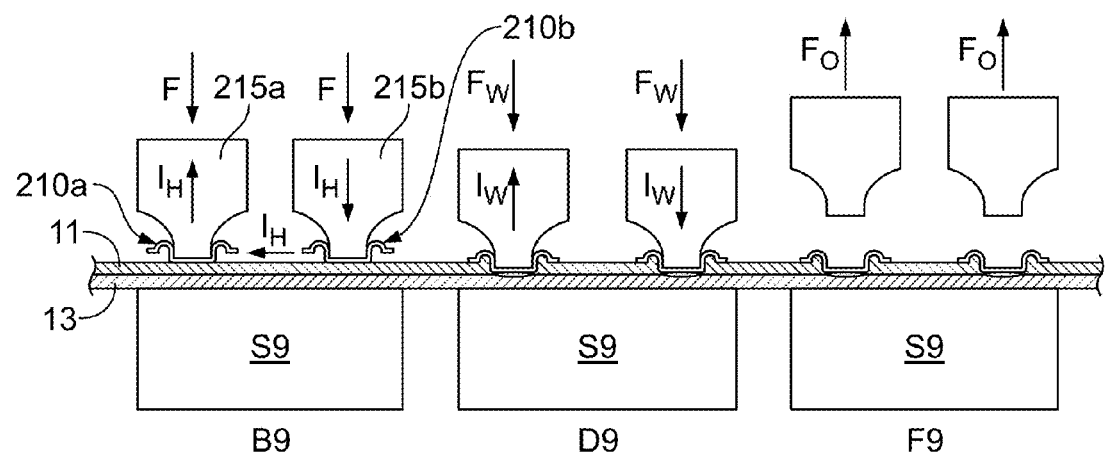
FIG. 9 is a diagrammatic view sequentially showing the insertion of a fastener like that shown in FIG. 7 through a first layer and being welded to a second layer in series weld formation.

In series welding, two or more electrodes approach from a single side. Multiple welds are then produced as the welding current flows between multiple guns in a series fashion. FIG. 9 shows that the welding process and apparatus of the present disclosure can be utilized in conducting series welding fasteners 210a and 210b to join layers/members 11, 13 in a single welding operation. Current $I_H$ passes through electrode 215a, layers 11, 13, through a conductive backer bar S9, then back through layers 11, 13 to electrode 215b. As before, the current $I_H$ heats layer 11 allowing penetration by fasteners 210a, 210b, the fasteners welding on contact with layer 13. The overall process is similar to that explained above, but only stages B9, D9 and F9 are shown. Series welding is not typically conducted on aluminum but is commonly done using steel materials. Since the present disclosure permits welding with a fastener made from materials other than aluminum, it facilitates the conjunction of an aluminum layer 11, e.g., an aluminum sheet, to a steel layer/sheet 13 or structure, such as a steel tube or box structure via series welding.

While the foregoing examples refer to a fastener 10, 20, 110, 210 made from steel, the fastener 10, 20, 110, 210 may be made from other materials, such as titanium, magnesium, coated steel, electroplated steel or stainless steel, as long as the layer, e.g., 13, to which it is welded to is compatible for welding. The first layer 11 and succeeding (second) layer(s) 13 may also be varied in composition and number. For example, the first layer may be aluminum, magnesium, copper or alloys thereof. The first layer 11 may also be a plurality of layers of any of the foregoing, e.g., two layers of aluminum, two layers of magnesium or three or more layers of magnesium, copper or aluminum. Optionally, more than one type of material may be used in the plurality of layers. In order to penetrate an intervening layer like layer 11, the fastener 10 . . . 210 should be made of a material with a higher melting point than the intervening layer(s) 11 penetrated during the heating/penetrating phase, e.g., B6, C6 (FIG. 6). In order to conduct the welding phase, e.g., D6, the fastener 110 material must be compatible with the layer to which it is to be resistance welded, e.g., layer 13. For example, if the layer 13 is made from high strength (>590 MPa) galvanized steel, then the fastener 110 may be made, e.g., from standard, low-carbon steels, high strength steels (>590 MPa) or stainless steel grades.

Figure 10:
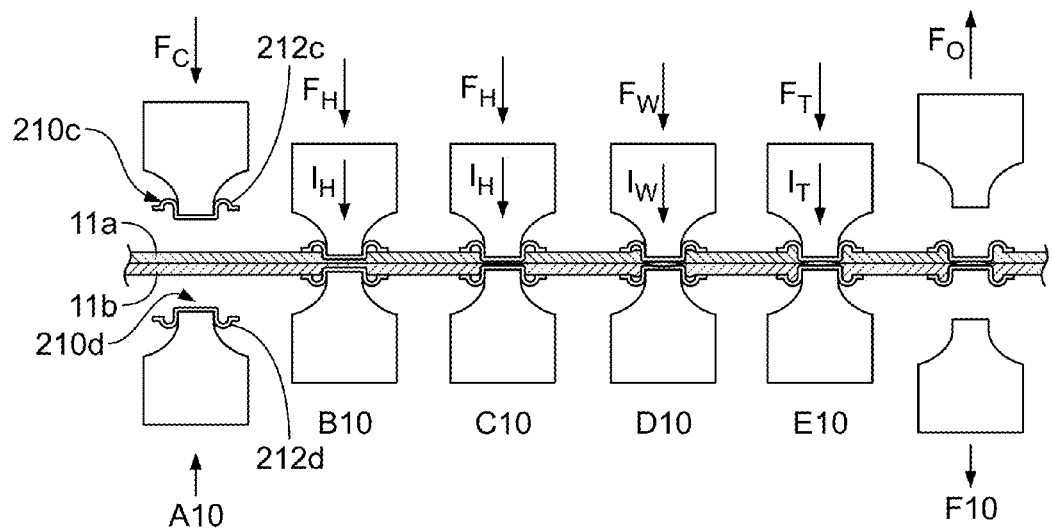
FIG. 10 is a diagrammatic view sequentially showing the insertion of opposed fasteners like those shown in FIG. 7 through first and second layers and being welded to each other.

FIG. 10 shows that a fastener 210c may be used with an opposing fastener 210d to conjoin a pair of layers 11a, 11b, e.g., made from aluminum or magnesium, by spot welding to one another, such that the caps 212c, 212d capture the layers 11a, 11b there between. The procedure shown in stages A10 to F10 mimics the above-described procedure, e.g., as described in reference to FIGS. 4-7, in that electrical resistance is used in heating, penetration of the layers and welding, but instead of the fasteners 210c, 210d reaching a layer 13 to which they are welded, they each penetrate the intervening layers 11a, 11b in opposite directions, meet and weld to each other.

Figure 11:
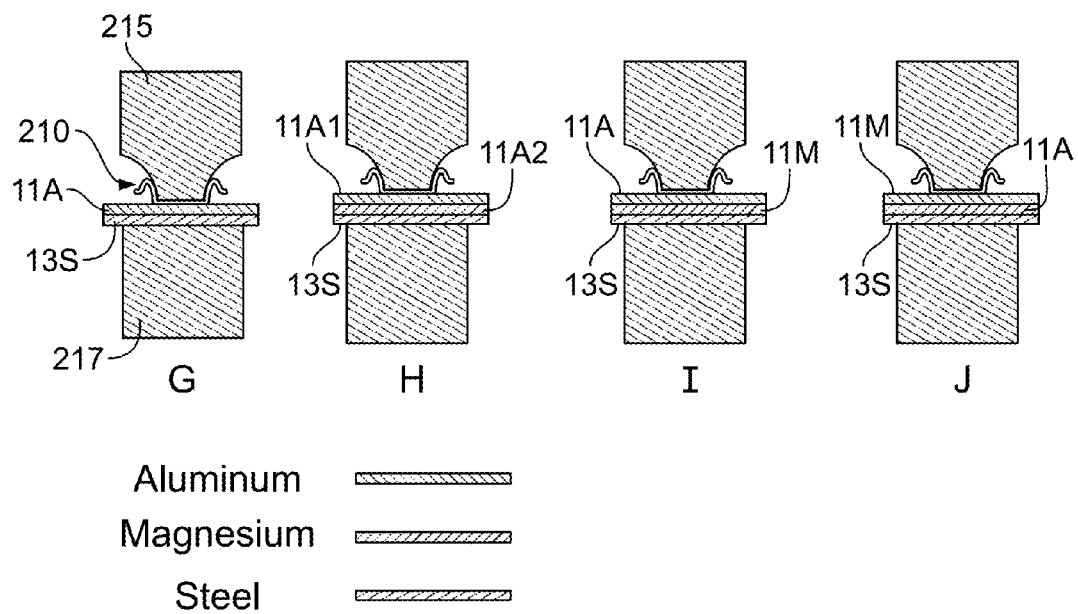
FIG. 11 is a diagrammatic view showing fasteners like those shown in FIG. 7 positioned next to different stacks of material layers to be fastened and prior to insertion or welding.

FIG. 11 shows that various combinations of layers may be joined in accordance with an embodiment of the present disclosure. As shown in combination G, the stack-up of materials may be aluminum 11A and steel 13S like the stack-up shown and described above in relation to FIG. 7 at stage B7. As described above, the fastener 210 can be pushed through the aluminum layer 11A and welded to the steel layer 13S. In one alternative, one or both of the layers 11A1, 11A2 may be magnesium/magnesium alloy. Combination H shows a stack-up of two layers of aluminum 11A1 and 11A2 with a steel layer 13S. As before, the fastener 210 can be pushed through the aluminum layers 11A1 and 11A2 and then welded to the steel layer 13S. Combination I shows a stack-up of a layer of aluminum 11A and a layer of magnesium 11M with a steel layer 13S. The fastener 210 can be pushed through the aluminum layer 11A and the magnesium layer 11M and then welded to the steel layer 13S. Combination J shows a stack-up of an outer layer of magnesium 11M an intermediate layer of aluminum 11A and a steel layer 13S. The fastener 210 can be pushed through the magnesium layer 11M and the aluminum layer 11A and then welded to the steel layer 13S. In each of the stack-ups shown in G, H, I and J, the fastener 210 may be used to secure the laminate structure shown. Other combinations of material, thicknesses and numbers of layers are possible to be secured by the fastener 210, 110, 20, 10 of the present disclosure.

FIG. 12 shows a welding electrode tip 215 with a connector sleeve portion 215S and a welding portion 215W with radiused tapered surfaces S4 and S5. A tip like this is available from CMW Contacts Metal Welding www.cmwinc.com and is called a G-cap.

FIGS. 13A and 13B shows a cap nut repurposed to function as a fastener 310 in accordance with the present disclosure. The fastener 310 has a cap 312, a shaft 314 and an end 316. Lugs 318 for interacting with a mating tool 318 may be used to retain the fastener 310 on an electrode tip like tip 115 and may also be used to twist the fastener as it is pushed through an intermediate layer 11 and/or when it is welded to a layer 13.

Figure 14B:
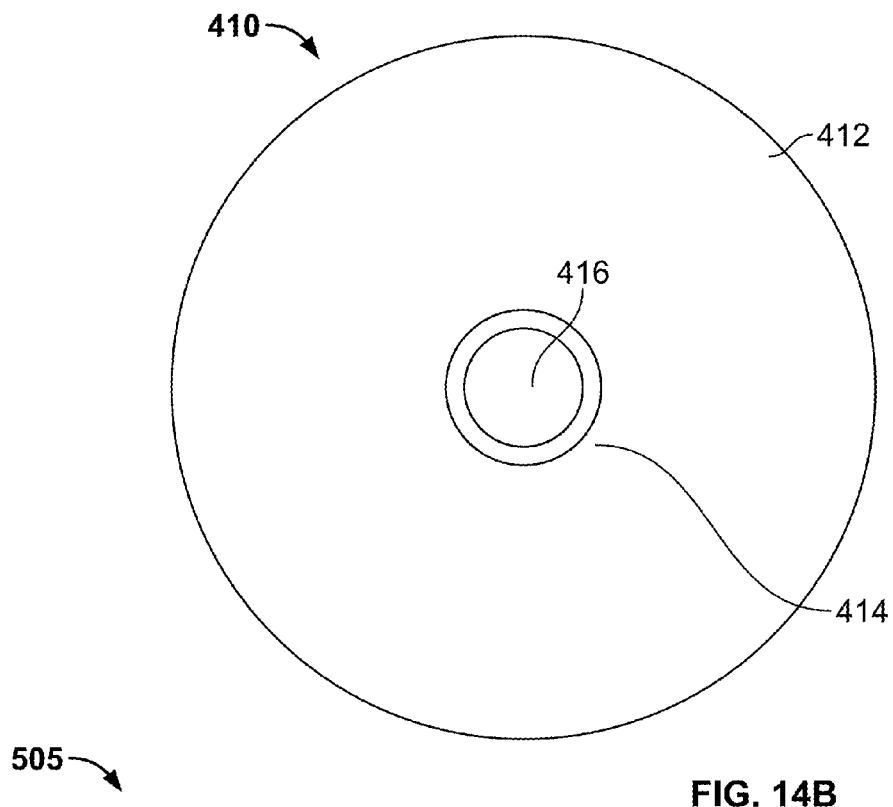
Figure 15:
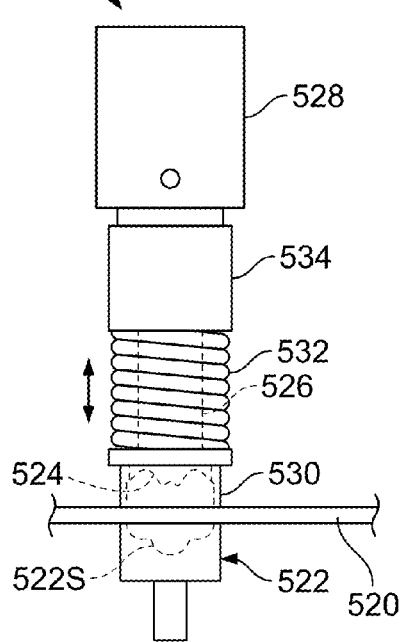
FIG. 15 is a side view of a fastener stamping tool in accordance with an embodiment of the present disclosure.

FIGS. 14A and 14B are side and plan views, respectively, of a fastener 410 in accordance with another embodiment of the present disclosure. The fastener 410 can be made as a stamping using a stamping tool and back-up die as shown in FIG. 15. The cap 412 transitions into the shaft 414 at curve C1 and the shaft 414 transitions into the end 416 at curve C2. The curve C1, when rotated about the axis of symmetry S of the fastener 410 and delimited by edge 412e and its projection on the shaft 414, circumscribes a volume V1 that can contain and seal off upwelling of the penetrated layer, e.g., as shown as 11U in FIG. 5.

FIG. 15 shows a fastener stamping tool 505 in accordance with an embodiment of the present disclosure. The stamping tool may be used to form fasteners like fastener 410 from stock material 520, e.g., a sheet of steel. The fastener stamping tool 505 has an upset die 522 with a forming surface 522S (shown in dotted lines). A shaping tool 524 (in dotted lines) driven by a punch 526 (shaft shown in dotted lines), which acts in conjunction with the upset die 522 to form a fastener 410 (FIG. 14A, 14B) from the stock 520. In the embodiment shown, the shaping tool 524 both cuts the fastener 410 from the stock 520 and shapes it as it is driven down through the stock 520 by the punch 526. Alternatively, disk-shaped blanks (not shown) having the dimensions required to form a fastener 410 may be cut from the stock by a separate punch and loaded into a blank holder 530 before the punch 526 is driven down against the upset die 522 to shape the blank into the fastener 410. A spring 532 may be inserted between a retainer cap 534 and the blank holder 530 to return the punch 526 to a neutral position after a fastener 410 has been stamped out by the fastener stamping tool 505. The punch 526 may be coupled to a punch holder 528 that is driven mechanically, hydraulically or pneumatically in a conventional manner for actuating punches and presses.

Figure 16:
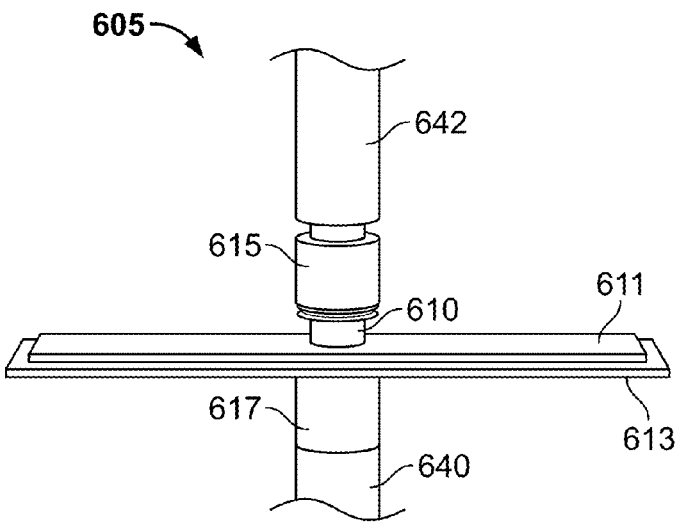
FIG. 16 is a perspective view of two metal sheets in a spot welding apparatus prior to applying a fastener in accordance with an embodiment of the present disclosure.

FIG. 16 shows welding stack-up 605 wherein a fastener 610 is positioned against first and second layers 611, 613 prior to penetration or welding. The first layer 611 may be an aluminum, magnesium or copper sheet and the second layer may be a steel, titanium or inconnel sheet. The layers 611, 613 and fastener 610 are clamped between first and second tips 615, 617 that are in electrical continuity with lower and upper electrodes 640, 642 of a commercially available electric spot welding machine, such as a 250 kVA welding station available from Centerline Welding, Ltd.

In one example of a welding operation conducted in accordance with the present disclosure, a commercially available 250 kVA AC resistance spot welding pedestal machine was employed to heat and plunge a fastener/rivet through an aluminum sheet and weld to a steel backing sheet. The upper electrode tip 615 was a commercially available electrode called a G-cap (similar to the tip 215 of FIG. 12) and the lower electrode tip 617 was a standard, flat faced (16 mm diameter, RWMA type C-Nose). A standard cap nut 610 as shown in FIGS. 13A and 13B was used for the rivet. The parts to join were 1.5 mm 7075-T6 aluminum alloy and 0.7 mm 270 MPa galvanized steel. The cap nut 610 was placed on the G-cap electrode 615 and then against the aluminum sheet 611 in the stackup as shown in FIG. 16. Current pulses about 1.5 secs. in duration at 9,000 amps were generated to cause the cap nut 610 to penetrate the aluminum sheet 611. After penetration, the cap nut 610 was welded to the steel with a current impulse around 15 kA for 0.166. A weld button, approximately 5 mm in diameter, between the steel cap nut and the 0.7 mm 270 MPa steel sheet was obtained.

Aspects of the present disclosure include low part distortion, since the layers to be fastened, e.g., 11, 13, are held in compression during the weld and the heat affected zone is primarily restricted to the footprint of the cap, e.g., 12 of the fastener 10. The fasteners, e.g., 10, 20, 110, 210, 310, 410, 610 form a volume relative to the first layer 11 to trap intermetallics or materials displaced by penetration of the fastener through the first layer 11. The fasteners, e.g., 10 . . . 610 can be used to fasten a range of layer thicknesses and number of layers of different kinds of materials, viz., by selecting a fastener of the appropriate dimensions and material composition. In addition, a given fastener 10 . . . 610 may be operable over a range of thicknesses due to the elasticity of the materials of which it is formed, as well as the shape of the fastener. For example, the cap 412 may elastically bend relative to the shaft 414 when the fastener 410 is used to accommodate various thicknesses and to resiliently press upon the layer(s), e.g., 11 when welded to layer 13. The resilient pressing of the cap 412 against a layer, e.g., 11 may contribute to establishing and maintaining a seal around the perimeter of the fastener 10 . . . 610 when it is in place.

The fastener 10 . . . 610 of the present disclosure may be applied through adhesives and/or other coatings applied between layers, e.g., 11, 13 and/or through coating applied to the top layer 11. The weld formed by use of the fastener, e.g., Pe in FIG. 4, does not penetrate the layer 13 nor disturb the surface of 13 opposite to the weld, preserving appearance, corrosion resistance and being water-tight. During fastener penetration, e.g., at stage C of FIG. 4 and the welding phase, stage D, the fastener 10c, 10d, 10e will continually collapse and expand along the weld zone Pd, Pe, pushing out intermetallics from the weld zone. The methodology and apparatus of the present disclosure is compatible with conventional RSW equipment developed for steel sheet resistance welding and the fastener, 10 . . . 610 can be made out of a variety of materials, such as, various steel grades (low carbon, high strength, ultra high strength, stainless), titanium, aluminum, magnesium, and copper. The fastener of the present disclosure may optionally be coated (galvanized, galvaneal, hot-dipped, aluminized, electroplated) to improve corrosion resistance.

As noted above, the fastener 10 . . . 610 of the present disclosure may be used via single-sided or two-side access welding. The fastener 10 . . . 610 does not require a pilot hole in the top sheet(s) made from aluminum and other conductors, but can also be used with a pilot hole in the aluminum or top sheet, allowing the fastener to extend through the top sheet(s) to reach the bottom sheet 13 prior to welding. Pilot holes may also be used to allow electrical flow through dielectric/non-conductive layers, such as adhesive layers or anti-corrosive coatings/layers. In addition, dielectric/insulator materials, such as plastics and plastic composites, including carbon fiber reinforced plastics, metal-to plastic laminates, e.g., of aluminum, magnesium or steel and plastic, such as Reynobond® available from Alcoa Architectural Products of Eastman, Ga., fiberglass, SMC, thermoset, thermoplastics and ceramics, which would include glass, may be attached to steels via a steel fastener 10 . . . 610 that passed through a pilot hole in a layer of these types of materials and welded by electrical resistance welding to the steel layer. Plastics, plastic composites and ceramics may also be joined to an aluminum layer 13 via a fastener 10 . . . 610 made in whole or part from a compatible material, e.g., aluminum alloy. Plastics, plastic composites and ceramics may also be joined to a magnesium layer 13 via a fastener 10 . . . 610 made in whole or part from a compatible material, e.g., aluminum or magnesium alloy. Similarly, plastics, plastic composites and ceramics may also be joined to a titanium layer 13 via a fastener 10 . . . 610 made in whole or part from a compatible material, e.g., a titanium alloy. top layer(s) 11 that are coated with a non-conductive coating, such as primers, rust-proofing coatings, paint, and anodized layers, may also be joined to a weldable layer made from steel, aluminum, magnesium or titanium by extending a fastener 10 . . . 610 of the present disclosure through a pilot hole in the coated, non-conductive layer to extend to and weld to the weldable layer 13. This approach may be applied for joining a painted/coated, electrically non-conductive layer 11 of aluminum, steel, magnesium or titanium to a layer 13 of steel, magnesium, aluminum or titanium, in any combination, so long as the fastener 10 . . . 610 is made from a material compatible with welding to the layer 13. This approach is applicable to those industries, processes and manufactures where the layer (s) 11 to be joined to the weldable layer 13 is pre-painted. Pre-painting is common when joining dissimilar materials, such as aluminum and steel, to prevent galvanic corrosion. Allowing one of the two sheets 11, 13 to be coated prior to assembly would increase corrosion protection as compared to both sheets being uncoated or bare sheets.

The weld quality resulting from use of the fastener 10 . . . 610 can be tested in accordance with quality assurance measurements applied to the cavity left by the weld, i.e., by measuring the dimensions of the cavity. Ultrasonic NDE techniques may also be utilized on the backside, e.g., of layer 13 (steel side) to monitor the weld quality.

Compared to FDS (EJOTS), SPR, and SFJ, the apparatus used to apply the fastener 10 . . . 610 of the present disclosure has a smaller footprint, allowing access to tighter spaces. The apparatus and method of the present disclosure uses lower insertion forces as compared to SPR since the first layer 11 is heated/softened during the fastener insertion phase, e.g., see stage C of FIG. 4. The methods and apparatus of the present disclosure provide the ability to join high strength aluminums (which are sensitive to cracking during SPR operations) and to join to high and ultra high strength steels, since there is no need to pierce the steel metal with the fastener but rather the fastener is welded to it.

The apparatus and method of the present disclosure does not require rotating parts and is conducive to resolving part fit-up issues since the overall process is similar to conventional resistance spot welding (RSW) with respect to how the component layers/parts are fixtured. In addition, the application of the fastener 10 . . . 610 can be conducted quickly providing fast processing speeds similar to conventional RSW. The apparatus and methods of the present disclosure can be applied to use on both wrought and cast aluminum products and may be used to produce a compatible metal joint rather than a bimetallic weld as when welding aluminum to steel, which may have low joint strength. As noted above, the apparatus and methods of the present disclosure may be used to conjoin multiple layers of different materials, e.g., two or more layers of aluminum or magnesium to one layer of steel; one layer of aluminum to two layers of steel (FIGS. 22-27); or one layer of aluminum or magnesium to one layer of steel.

Figure 17A:
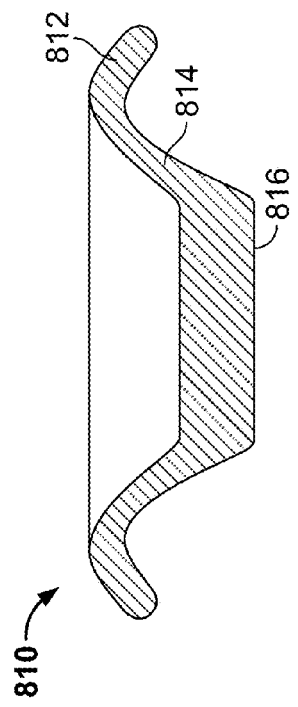
FIGS. 17A, 17B, 17C and 17D are cross-sectional views of fasteners in accordance with alternative embodiment of the present disclosure.

FIG. 17A shows a cross-sectional view of a fastener 710 like fastener 410 of FIG. 14a, wherein the thickness of the cap 712, shaft 714 and end 716 are substantially of constant thickness. The end 716 is flat.

Figure 17B:
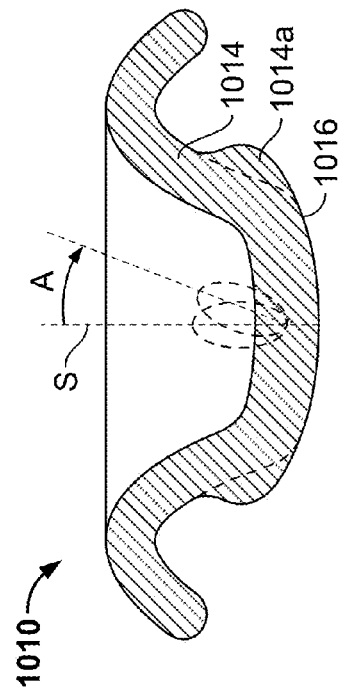

FIG. 17B shows a fastener 810 wherein the end 816 is flat and has a greater thickness than the shaft 814 of cap 812.

Figure 17C:
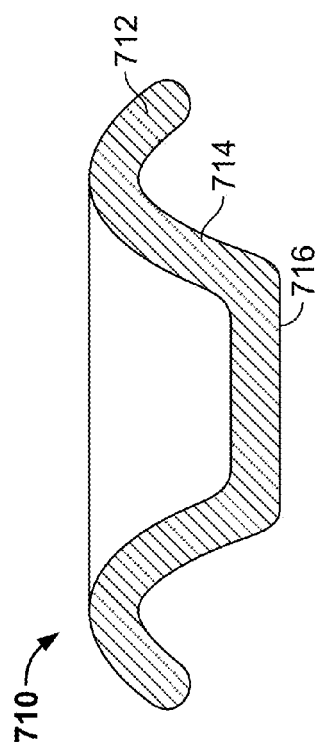

FIG. 17C shows a fastener 910 with a radiused end 916 having a constant thickness. In one example, the radius R is in the range of 1 to 6 inches.

Figure 17D:
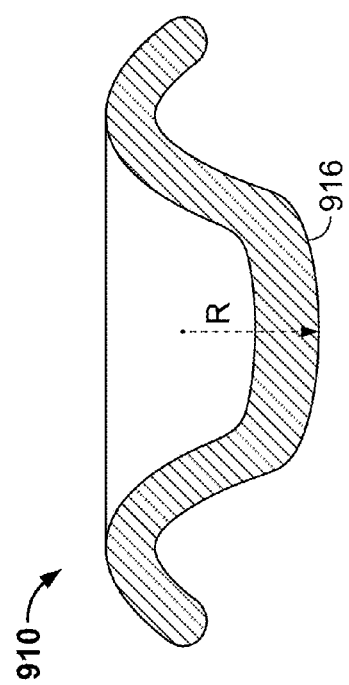

FIG. 17D shows a fastener 1010 having a radiused end 1016 and splines 1014s at the conjunction of the end 1016 and the shaft 1014. The splines 1014s may be aligned with the axis of symmetry/rotation S or disposed at an angle A relative thereto. The splines may be utilized to either guide the fastener in a particular direction, e.g., straight or in a spiral when the fastener is pressed through the layer 11 and/or may be used as an anti-rotation feature that prevent rotation of layer 11 relative to installed fastener 1010.

FIGS. 18, 19 and 20 show a fastener 1110 having a length L greater than the width W thereof. In one example, the length L may be in the range 8 mm to 25 mm and the width in the range 4 mm to 8 mm.

Figure 21:
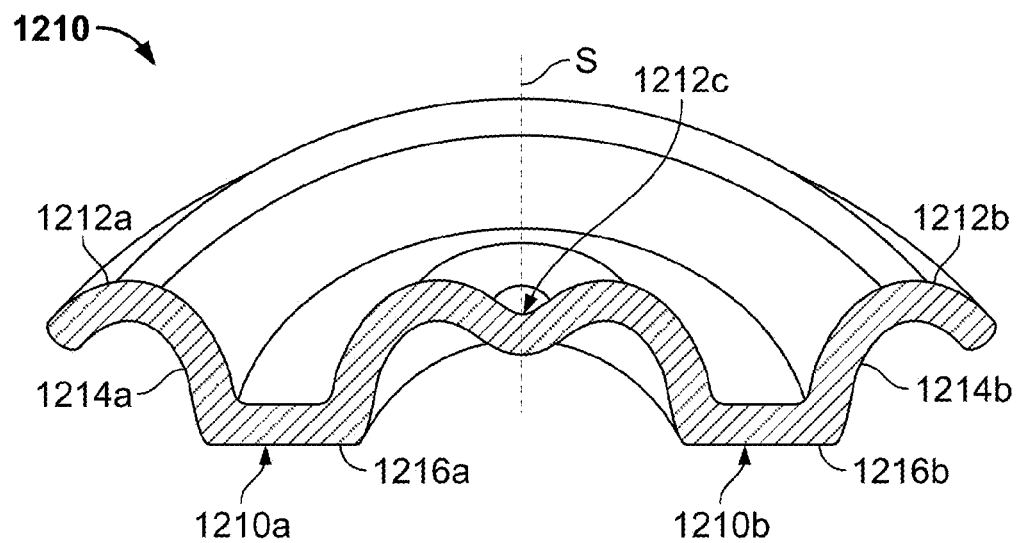
FIG. 21 is a cross-sectional view of a fastener in accordance with an alternative embodiment of the present disclosure.

FIG. 21 shows a fastener 1210 that in cross-section has left and right portions 1210a, 1210b that converge at 1212c. Fastener 1210 is a solid of rotation about line of symmetry/rotation S, such that the ends 1216a, 1216b form a continuous ring surface that may be welded to a substrate as further illustrated below.

Figure 22:
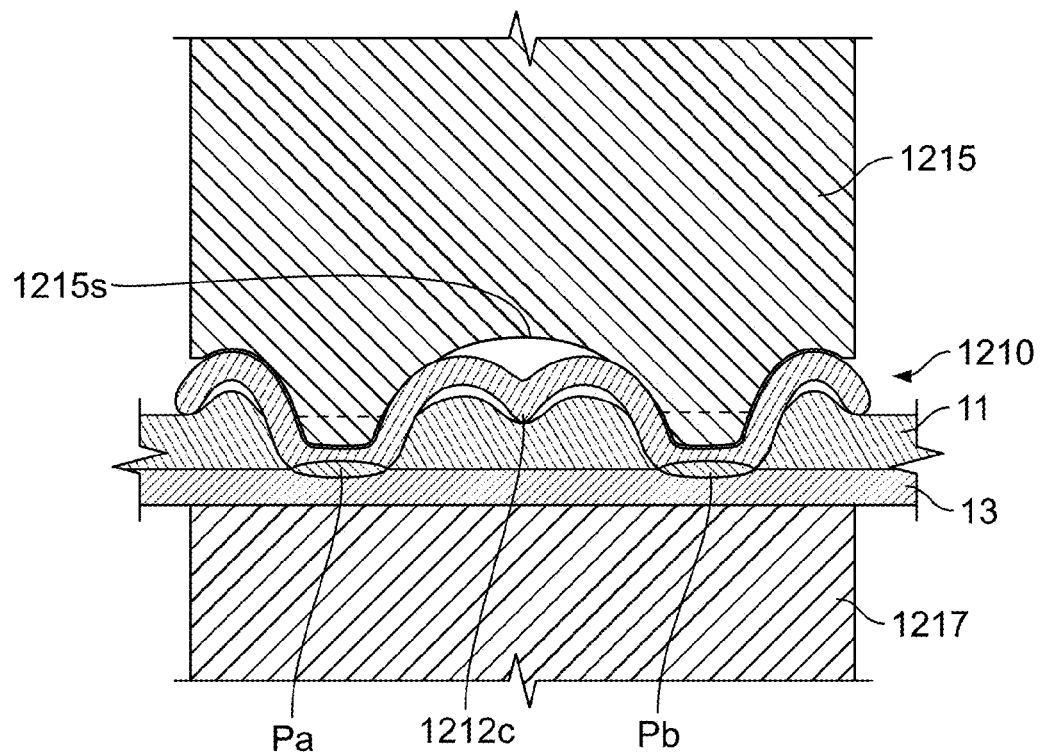
FIG. 22 is a diagrammatic, cross-sectional view of the fastener of FIG. 21 inserted through a first layer and being welded to a second layer.

FIG. 22 shows fastener 1210 inserted through first layer 11, e.g., made from aluminum and welded to layer 13, e.g., made from steel at weld zones Pa, Pb, which would have a continuous ring shape. The ring shaped weld would be distributed over a larger surface area then a disc shaped weld, as would be produced, e.g., by the use of a fastener like 410 as shown in FIG. 14a. Tip 1215 has a surface 1215s accommodating and supporting the fastener 1210 as it is heated and pressed toward tip 1217.

Figure 23:
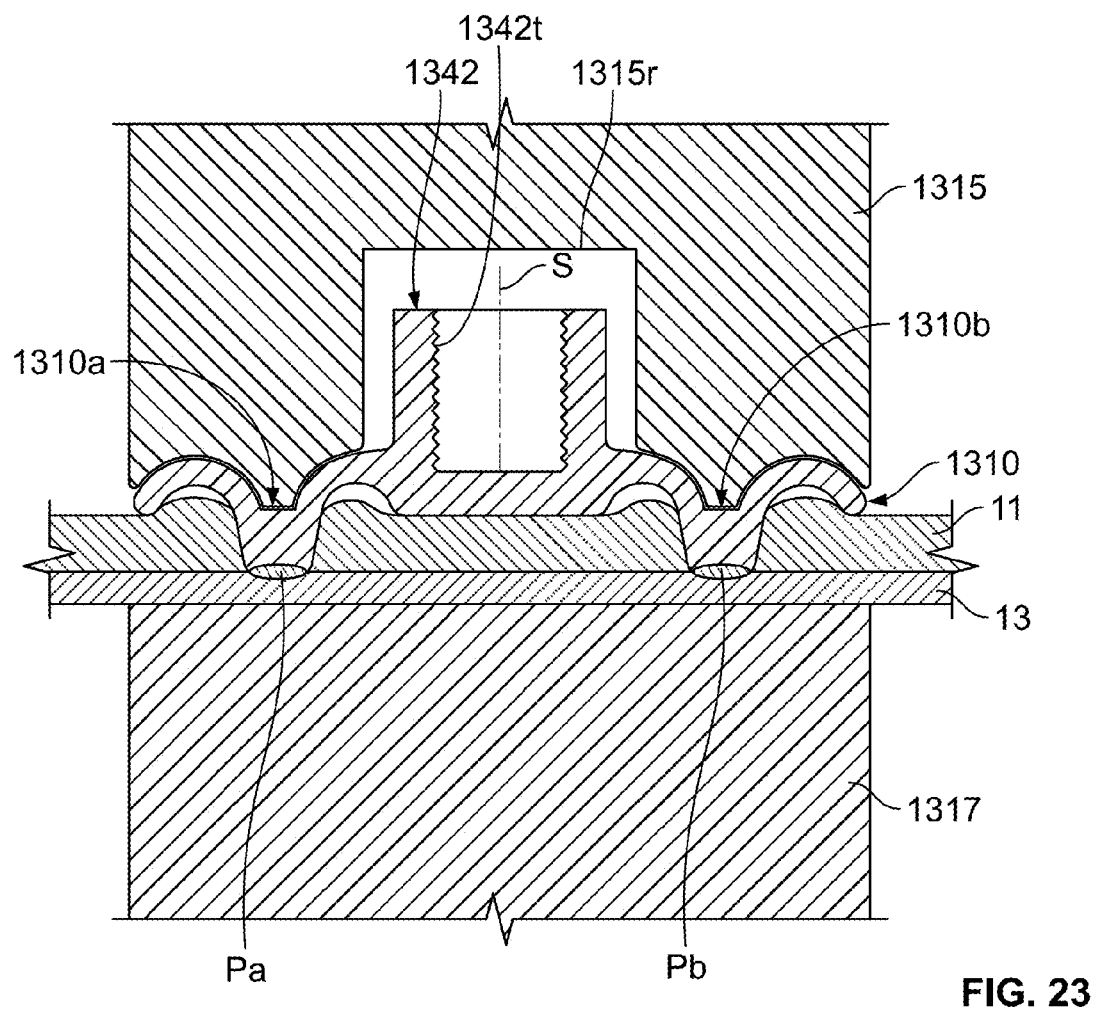
FIG. 23 is a diagrammatic, cross-sectional view of a fastener in accordance with an alternative embodiment of the present disclosure inserted through a first layer and welded to a second layer.

FIG. 23 shows a fastener 1310 in cross-section inserted through a first layer 11 and welded to a second layer 13 at weld zones Pa, Pb. As in FIG. 21, fastener 1310 is a solid of rotation about line of symmetry/rotation S, such that weld zones Pa and Pb are part of a continuous ring-shaped weld to layer 13. Fastener 1310 features a threaded, central socket 1342 having threads 1342t suitable to receive a mating threaded fastener, such as a bolt (not shown). In this manner, fastener 1310 can perform two functions, viz., retain layer 11 to 13 and provide a threaded socket permitting assembly to another member or structure (not shown) via a mating threaded fastener (not shown). Tip 1315 has a recess 1315r for accommodating the socket 1342 while welding.

Figure 24:
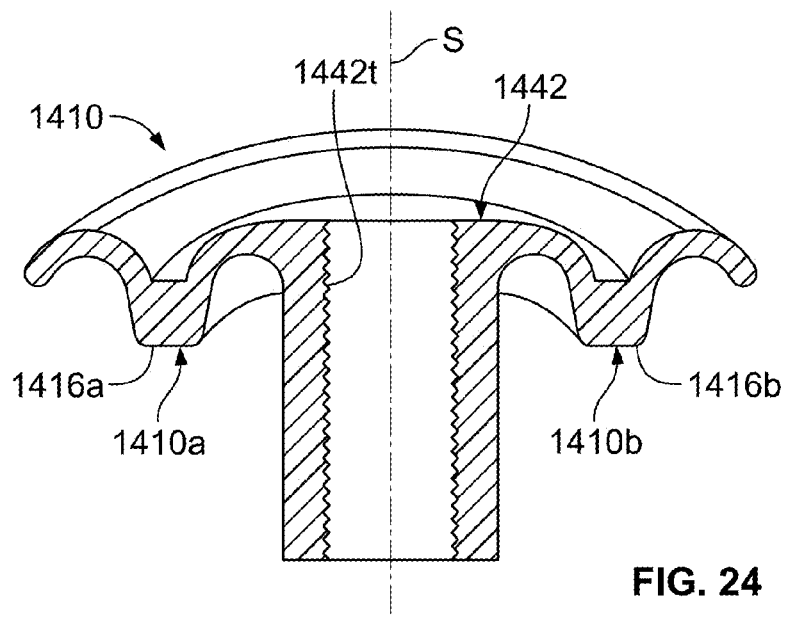
FIG. 24 is a cross-sectional view of a fastener in accordance with an alternative embodiment of the present disclosure.
Figure 25:
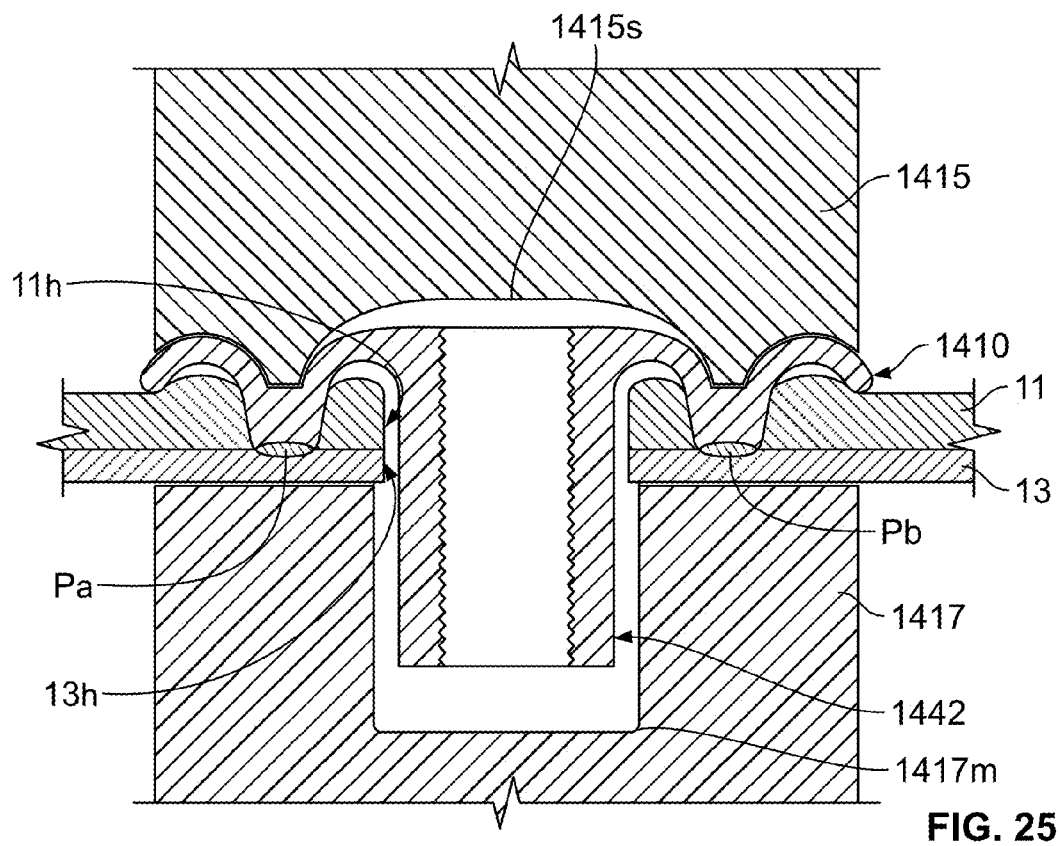
FIG. 25 is a diagrammatic, cross-sectional view of the fastener of FIG. 24 inserted through a first layer and being welded to a second layer.

FIGS. 24 and 25 show a fastener 1410 like fastener 1310, but having a socket portion 1442 with threads 1442t that is open ended, allowing a mating threaded fastener (not shown) to pass through the socket portion 1442. As shown in FIG. 25, in preparation for installation of the fastener 1410, the layers 11 and 13 are preferably drilled or otherwise provided with mating holes 11h, 13h through which the socket portion 1442 can be inserted. The penetration of the layer 11 and the welding to layer 11 can then be performed by resistance welding, as explained above. Tip 1415 has a surface 1415s for supporting the fastener 1410 as it is pressed through layer 11 and welded to layer 13. Tip 1417 has a recess 1417r accommodating the socket portion 1442 that extends through the layers 11, 13 during the welding process.

Figure 26:
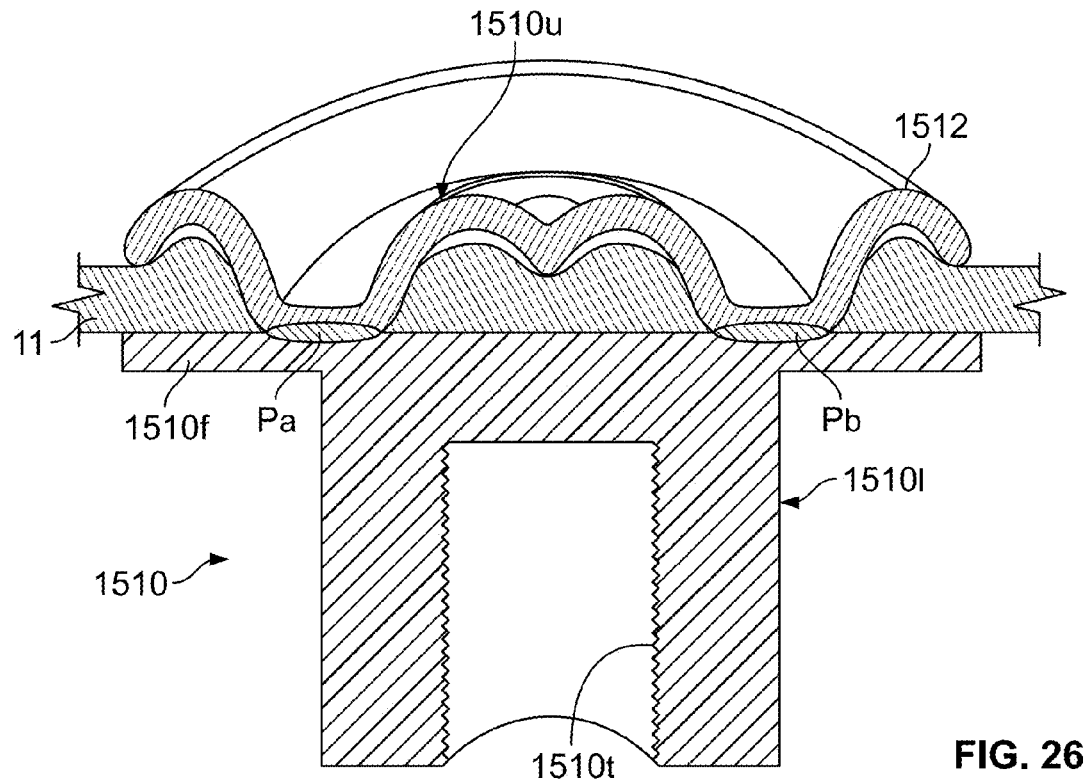
FIG. 26 is a diagrammatic, cross-sectional view of a two-part fastener in accordance with an alternative embodiment of the present disclosure, the first part inserted through a supporting layer and welded to the second part.

FIG. 26 shows a fastener 1510 having an upper part 1510u and a lower part 1510l which may be welded together to attach the fastener to a layer 11, e.g., of aluminum. The lower portion 1510l features a threaded socket 1510t. The fastener 1510 may be made from steel or titanium. The welding process is conducted as before only instead of welding to a second layer 13, the upper part 1510u is welded to the lower part 1510l after the upper part is pushed through the aluminum layer 11. As before, the weld zones Pa, Pb are a part of a ring shaped weld because the fastener 1510 is a solid of rotation. The layer 11 is captured between flange portion 1510f and cap 1512. The fastener 1510 permits a threaded socket 1510t, made from a first material, e.g., steel or titanium, to be attached to a layer 11 of dissimilar metal, e.g., aluminum or magnesium.

Figure 27:
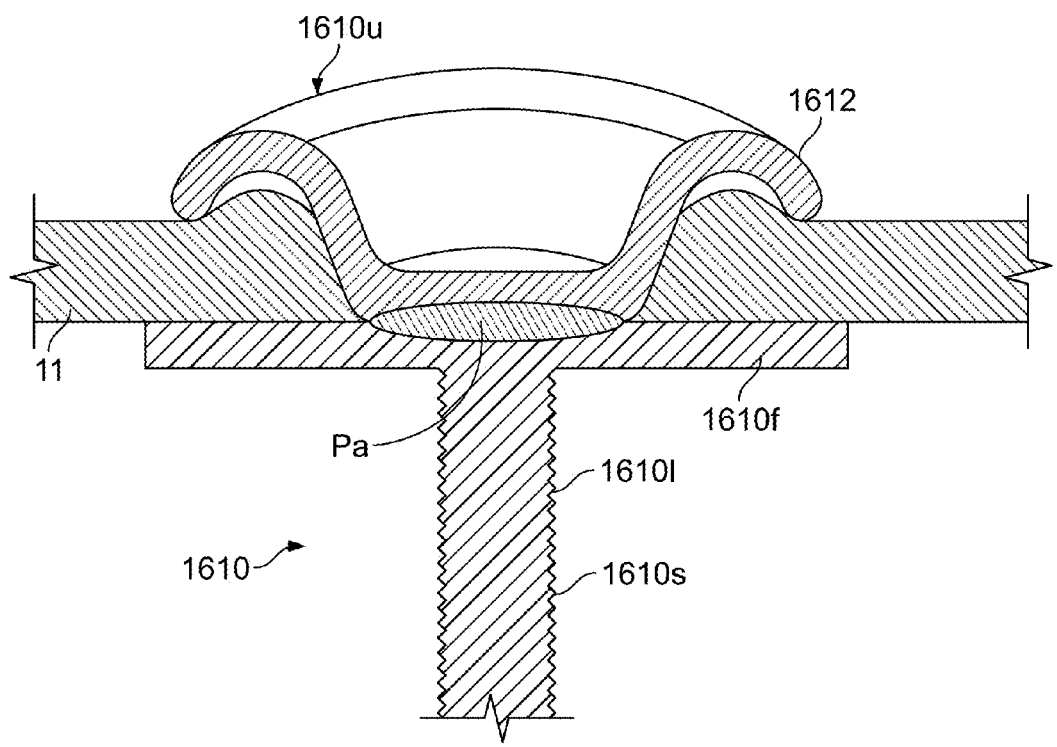
FIG. 27 is a diagrammatic, cross-sectional view of a two-part fastener in accordance with an alternative embodiment of the present disclosure, the first part inserted through a supporting layer and welded to the second part.

FIG. 27 shows a fastener 1610 having an upper part 1610u and a lower part 1610l which may be welded together to attach the fastener to a layer 11, e.g., of aluminum. The lower part 1610l features a threaded stud 1610s. The fastener 1610 may be made from steel or titanium. The welding process is conducted as before only instead of welding to a second layer 13, the upper part 1610u is welded to the lower part 1610l after the upper part is pushed through the aluminum layer 11. The weld zone Pa is approximately disk-shaped and the fastener 1610 is a solid of rotation. The layer 11 is captured between flange portion 1610f and cap 1612. The fastener 1610 permits a threaded stud 1610s, made from a first material, e.g., steel or titanium, to be attached to a layer 11 of dissimilar metal, e.g., aluminum or magnesium.

Figure 28:
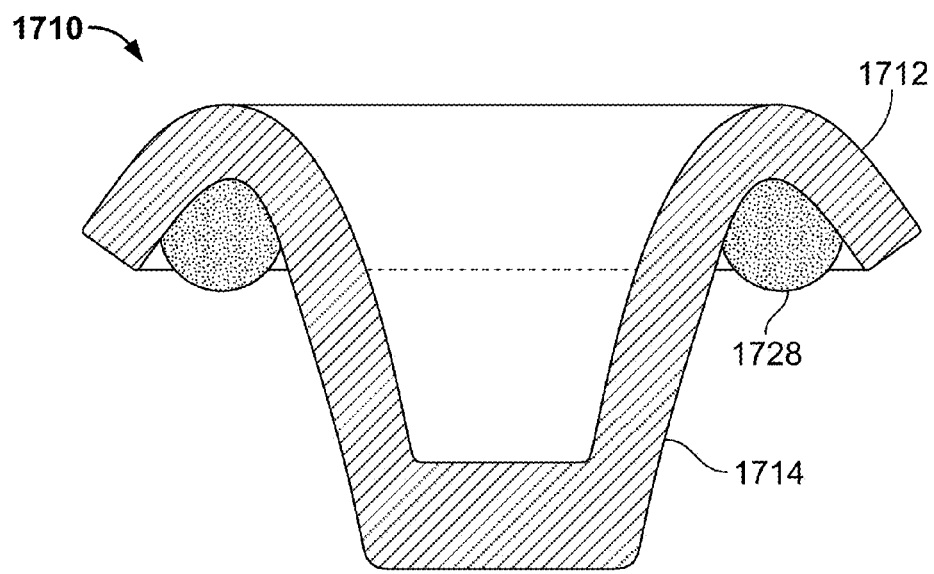
FIG. 28 is a cross-sectional view of a fastener with a sealant in accordance with an alternative embodiment of the present disclosure.
Figure 29:
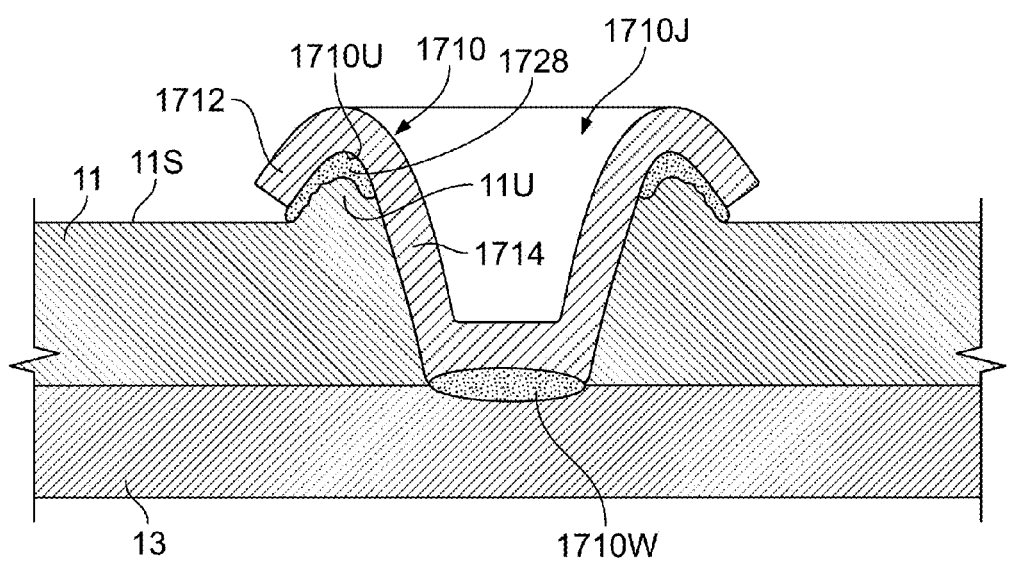
FIG. 29 is a diagrammatic, cross-sectional view of the fastener of FIG. 28 inserted through a first layer and being welded to a second layer.

FIGS. 28 and 29 shows a self-sealing fastener 1710 with a bead of sealant 1728 applied to the underside proximate the conjunction of the cap 1712 and shaft 1714. The sealant may be an adhesive or polymer and may be applied as a liquid, gel or paste and may cure to a solid or semi-solid or may remain in a soft or liquid state prior to use of the fastener 1710. When the fastener 1710 is used to couple layers 11 (aluminum), 13 (steel) of material together by the welding of the fastener 1710 to the base sheet 13 or to another fastener 1710, e.g., as described above for fasteners 210 (FIG. 10), the sealant may undergo a change of state, e.g., if solid, it may melt due to the heat generated by insertion of the fastener 1710 through an intermediate layer 11 by melting from electrical resistance or during the welding phase to form weld 1710W. After the fastener 1710 and the metal to which it has welded cools, the sealant 1728 may return to a solid after conforming to the surfaces of the top layer 11 and to any upwelling therein 11U, thereby providing sealed joint 1710J, with a seal between the top layer 11 and the fastener 1710. The sealant 1728 prevents infiltration by elements present in the environment, e.g., oxygen or moisture, which can lead to corrosion of the fastener 1710, the sheets 11, 13 and/or the weld 1710W. In the alternative, the sealant 1728 may remain a semi-solid or gel after the weld 1710W is completed. The sealant 1728 may be applied in several different ways, including: (i) application to the fastener 1710 as a step in fastener manufacture; (ii) application to the fastener 1710 just prior to use in forming a welded joint; e.g., by applying: a bead (ejected by a nozzle under pressure), a ring preformed in solid or semi-solid form (and placed on the fastener 1710), or a band of sealant (provided in the form of a severable strip or painted on by a contact applicator or sprayed on under pressure) to the fastener 1710 prior to contacting the outer sheet 11. In the alternative, the sealant 1728 may be applied to the surface of the sheet 11, e.g., in the form of an adhesive dot placed on the top surface 11S where the fastener 1710 will be inserted or around the periphery of a pilot hole in the sheet 11 prior to the joining process. The sealant 1728 may be applied to the fastener 1710 through the use of 'compound liner' equipment currently used in the beverage can end lining process. The technology disclosed in U.S. Pat. No. 6,887,030 can be utilized to stop rotation of the fastener 1710 during sealant 1728 application, reducing damage to the protective coating of sealant 1728 applied to the fastener 1710. The sealant 1728 can be utilized with any of the fasteners 10, 110, 210, etc. and layers 11, 13, 11M, etc., described above. FIG. 29 shows the sealant 1728 after the fastener 1710 has been welded to layer 13. The sealant 1728 can partially or fully fill the cavity between the underside 1710U of the fastener 1710 and upper surface 11S of the sheet 11. The sealant 1728 can provide corrosion protection, increase the joint strength between the fastener 1710 and the top surface 11S, and/or eliminate water/moisture from entering the joint J.

Figure 30:
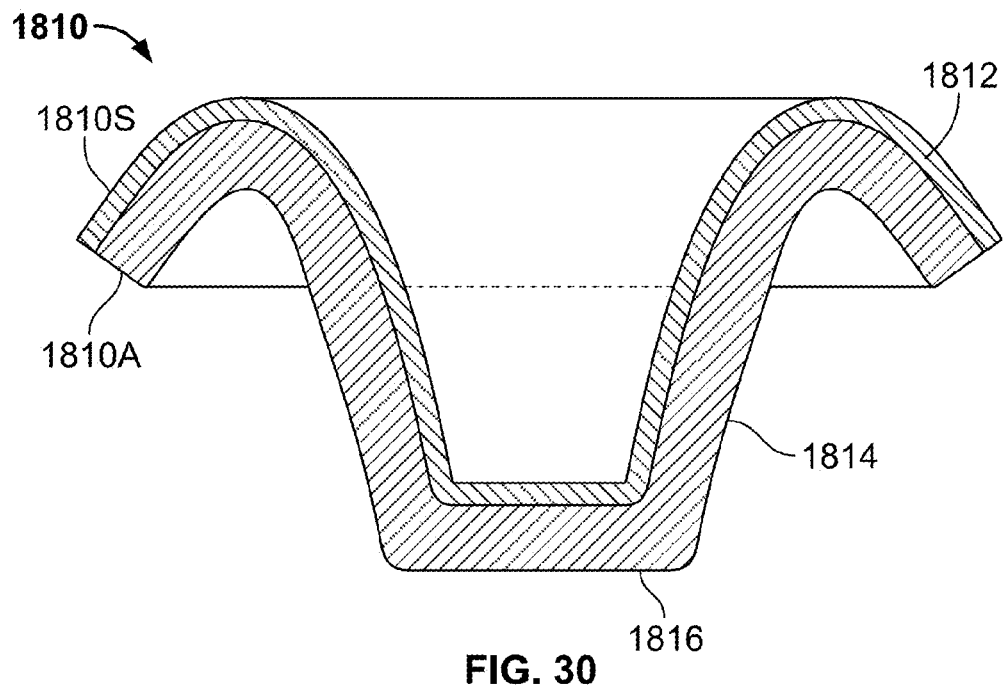
FIG. 30 is a cross-sectional view of a fastener in accordance with an alternative embodiment of the present disclosure.
Figure 31:
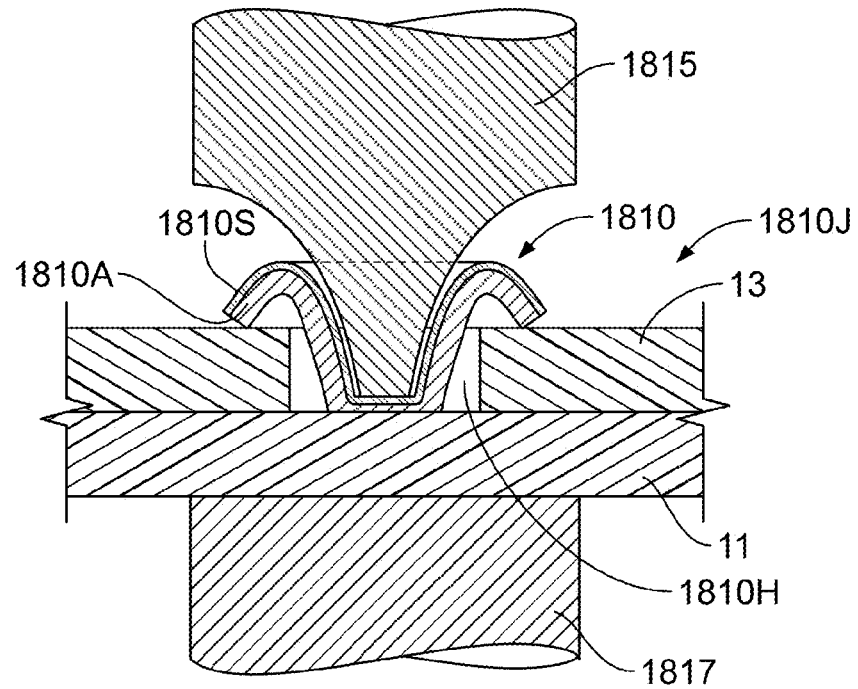
FIG. 31 is a diagrammatic, cross-sectional view of the fastener of FIG. 30 inserted through a first layer for welding to a second layer.

FIGS. 30 and 31 show a cross section of a bi-layer fastener 1810 with a first layer 1810S, e.g., made of steel, titanium, copper or a first aluminum alloy, e.g. 1xxx, and a second layer 1810A, e.g., made of aluminum or a different type of aluminum alloy, e.g., 6xxx. The fastener 1810 may be formed, e.g., stamped, from a bi-layer sheet of multi-alloy (1xxx clad on 6xxx, etc.) or multi-material (aluminum clad steel, aluminum clad copper, etc.). FIG. 31 shows the cross section of a joint 1810J formed with the bi-layer fastener 1810, a first sheet 11, e.g., of aluminum or aluminum alloy and a second sheet 13 of steel, titanium, copper, magnesium or another alloy distinct form the alloy of layer 11. The bi-layer fastener 1810 allows welding to the aluminum member 11, viz., by welding layer 1810A to sheet 11. In this instance, an aperture 1810H is formed in sheet 13, such that the fastener 1810 can be inserted through the aperture 1810H rather than melt through it by resistance heating. One aspect of this approach is that it allows joining a steel sheet or member 13 to an aluminum sheet or member 11, e.g., a tube, from a single side. The bi-layer fastener 1810 allows the welding to occur using low current levels since layer 1810S, which may be, e.g., steel, in contact with the electrode head 1815, provides enhanced heating of layer 1810A and sheet 11 during the welding. In a first approach, the layer 1810A may be made from or include a brazing alloy, allowing a braze joint to the opposing sheet 11 rather than a resistance weld. This would be beneficial to reduce the amount of weld current required. The joint 1810J could be used to join an aluminum or plastic sheet 13 to an aluminum sheet 11 where low heat inputs are required to prevent melting of the sheet 13. In another aspect of this embodiment, a fastener 1810 formed from aluminum clad steel could be used to join a plurality of aluminum sheets. A steel layer 1810S of the fastener 1810 would contact the electrode 1815, while the aluminum side 1810A would contact the aluminum sheets 11 (in this embodiment, sheet 13 would also be aluminum). As the weld heat is applied, the steel layer 1810S would provide enhanced heating, enabling the aluminum portion 1810A of the fastener 1810 to weld with the aluminum sheets 11, 13 at low currents. In another aspect of this embodiment, the layer 1810S may be formed from copper clad to an aluminum portion 1810A. The copper portion 1810S would contact the electrode 1815 and the aluminum portion 1810A would contact and weld to aluminum sheets 11, 13. In this embodiment, the copper portion 1810S of the fastener 1810 would exhibit good heat transfer and low electrode wear.

Figure 32:
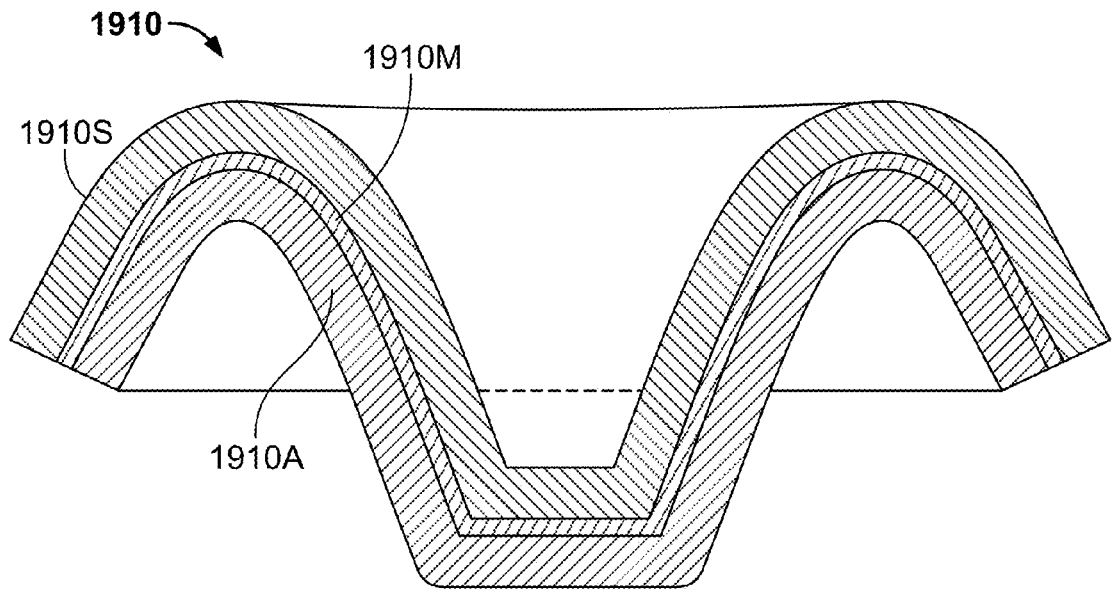
FIG. 32 is a cross-sectional view of a fastener in accordance with an alternative embodiment of the present disclosure.

FIG. 32 shows a tri-metallic fastener 1910, with layers 1910S, 1910M and 1910A. The middle layer 1910M may be selected to prevent diffusion between the outer layers 1910S, 1910A when the fastener 1910 is exposed to elevated temperatures, providing joint strength. The middle layer 1910M may be composed of a variety of materials, including but not limited to, high purity aluminum, titanium, or zinc. In one example, the outer layer 1910S is steel and the root outer layer 1910A is aluminum. The middle layer 1910M may be selected to be a thin layer of titanium, which would prevent the aluminum layer 1910A and steel layer 1910S from diffusing at high temperatures (>200 degree C.).

Figure 33:
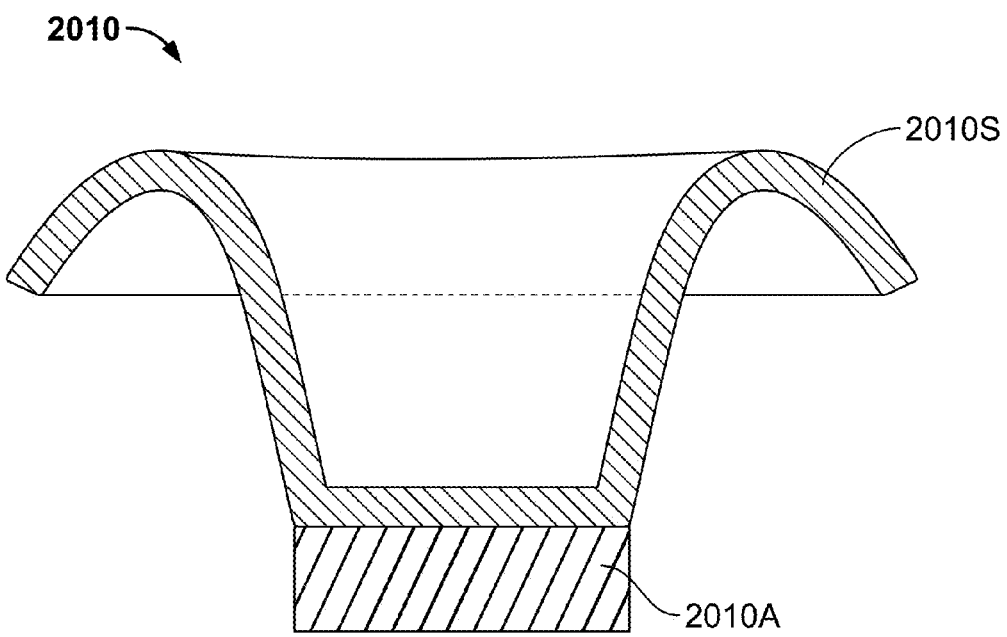
FIG. 33 is a cross-sectional view of a fastener in accordance with an alternative embodiment of the present disclosure.

FIG. 33 shows a bi-layer fastener 2010 having a disc 2010A of aluminum joined to a stamped/cold-formed steel portion 2010S. The aluminum disc 2010A can be joined to the steel portion 2010S through a number of means not limited to cold welding, ultrasonic, friction welding, upset butt welding, high pressure welding, mechanical, or brazing/soldering. Optionally, the aluminum disc 2010A may be joined to the steel portion 2010S in wire form (cold welding, pressure welding) prior to the shaping of the steel portion 2010S into the shape shown. The fastener 2010 may be used in the same fashion as the fastener 1810 shown in FIG. 31 to fasten sheet 13 to sheet 11.

Figure 34:
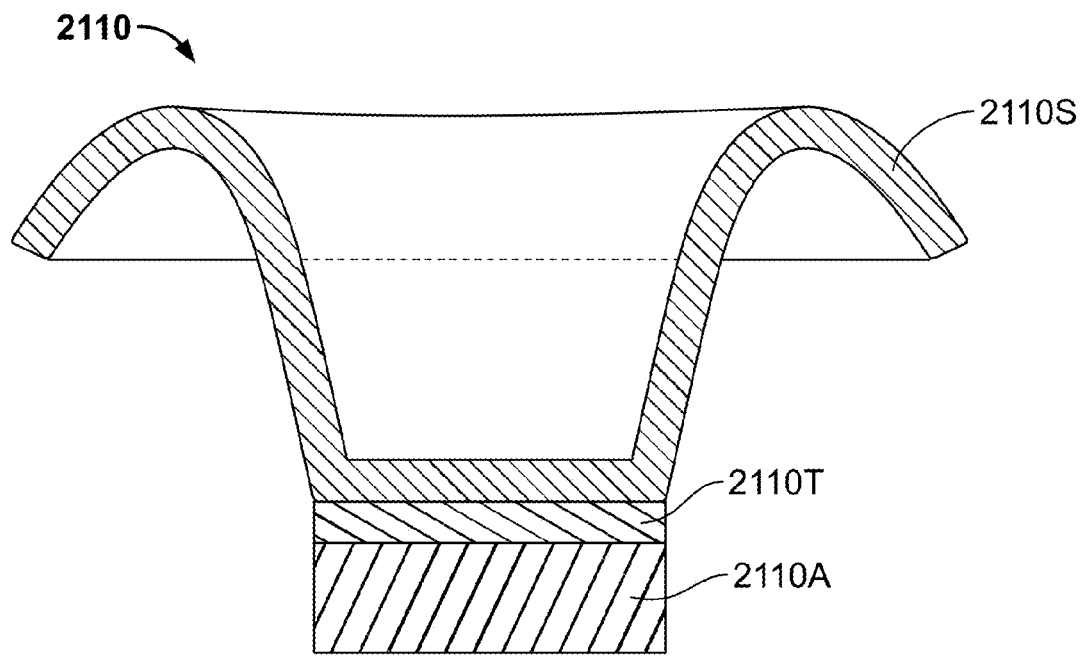
FIG. 34 is a cross-sectional view of a fastener in accordance with an alternative embodiment of the present disclosure.

FIG. 34 shows a tri-layer fastener 2110 like the fastener 2010 of FIG. 33, but having an additional layer 2110T, e.g., made from titanium interposed between layers 2110S, e.g., made from steel and 2110A, e.g., made from aluminum. The fastener 2110 may be used in a similar manner as fastener 1810 of FIG. 31 and fastener 2010 of FIG. 33, but the additional layer 2110T may be used to prevent diffusion between layers 2110A and 2110S and therefore may be useful for high temperature applications in a similar manner as the fastener 1910 with middle layer 1910M shown in FIG. 32.

Figure 35:
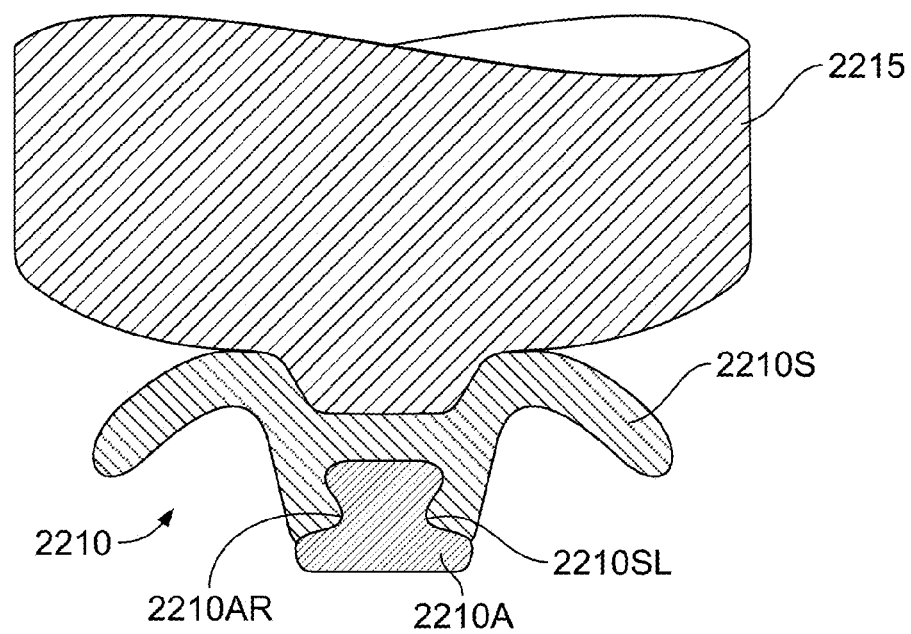
FIG. 35 is a diagrammatic, cross-sectional view of a fastener in accordance with an alternative embodiment of the present disclosure positioned adjacent to a welding electrode tip.

FIG. 35 shows a fastener 2210 having mechanically interlocked portions 2210A, 2210S. The mechanical interlocking may be accomplished by swaging, forging, upsetting or bending. For example, the portion 2210A may be formed with a peripheral recess 2210AR and the portion 2210S may be formed having an inwardly extending peripheral lip 2210SL. The portion 2210A may then be forced into portion 2210S such that the peripheral recess 2210AR and the peripheral lip 2210SL interlock. This may be also be accomplished by a forging die that collapses and compresses portion 2210S about portion 2210A to create an interlocking relationship. In a first aspect, the materials of 2210S and 2210A may be different aluminum alloys (1xxx to 6xxx, 4xxx to 6xxx, 4xxx to Al—Li) or different materials (steel and aluminum, aluminum and magnesium, aluminum and titanium, etc.). The fastener 2210 is shown positioned relative an electrode tip 2215 and may be used similarly to the fastener 1810 shown in FIG. 31.

Figure 36:
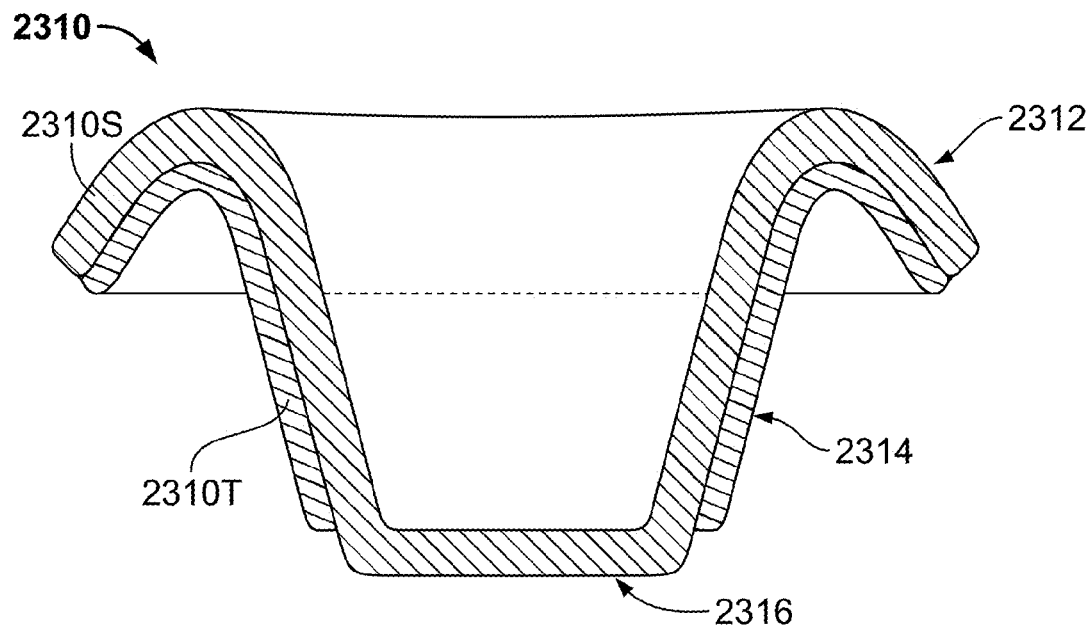
FIG. 36 is a cross-sectional view of a fastener in accordance with an alternative embodiment of the present disclosure.
Figure 37:
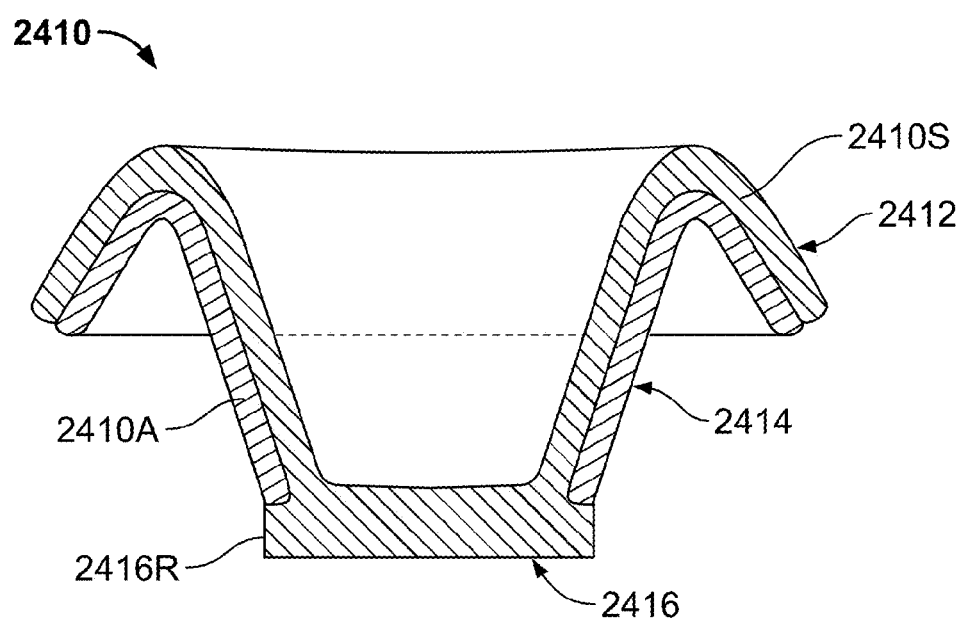
FIG. 37 is a cross-sectional view of a fastener in accordance with an alternative embodiment of the present disclosure.

FIG. 36 shows a fastener 2310 with a protective sleeve 2310T positioned about the portion 2310S proximate the cap 2312 and stem 2314 of the fastener 2310. The protective sleeve 2310T may provide corrosion protection between the fastener 2310 and sheet that is penetrated. For example, where the portion 2310S is steel and passes through an aluminum sheet 11 by resistance heating to weld to a steel sheet 13, as shown in FIGS. 6 and 7, the coating 2310T may be titanium, stainless steel or cold sprayed aluminum. The sleeve 2310T can be mechanically interlocked to the portion 2310S as shown in FIG. 37 (showing sleeve 2410A), applied by cold spray coating, plasma spray coating, etc. The protective sleeve 2310T may be made from metal or from materials having low thermal or electrical conductivity, such as ceramics. In this aspect, the low (thermally/electrically) conductive materials will focus the heat and current though the end 2316 of the fastener 2310, enabling lower current demand to accomplish welding to a layer 13 than if the protective sleeve 2310T were not present. Once welded to a layer 13, e.g., to fasten a layer 11 of aluminum to a layer 13 of steel (see FIGS. 6 and 7), the protective sleeve 2310 may function to isolate the portion 2310S, which may be made from steel, from the aluminum layer 11 through which it passes, preventing corrosion due to contact between dissimilar metals and the galvanic effect.

FIG. 37 shows a fastener 2410 having a protective sleeve 2410A disposed on the portion 2410S in a similar manner to the fastener 2310 described in FIG. 36. The protective sleeve 2410A is retained on the fastener 2410 by a rim 2416R that captures the sleeve 2410A between the rim 2416R and the cap portion 2412. The rim 2416R may be preformed and the sleeve 2410A slipped over the rim 2416R followed by compression by a die, or the sleeve 2410A may be slipped onto the shaft 2414 followed by formation of the rim 2416R, e.g., by upsetting/forging. As with the fastener 2310, the fastener 2410 may exhibit enhanced resistance to corrosion and heat transfer and may be used in a similar manner to couple a first sheet or member 11, e.g., of aluminum to a second sheet or member 13, e.g., of steel (See FIGS. 6 and 7). Since the rim 2416R is the leading element as the fastener is pushed through an intermediate layer 11 (see FIGS. 6 and 7), and may be formed from steel, it will form an aperture through the intermediate layer 11 large enough to accommodate the sleeve 2410A, such that the sleeve itself does not need to play a part in forming the aperture in the intermediate layer 11 and is therefore preserved from distortion or loosening on the shaft 2414 when the fastener 2410 is pressed through the intervening layer 11.

Figure 38:
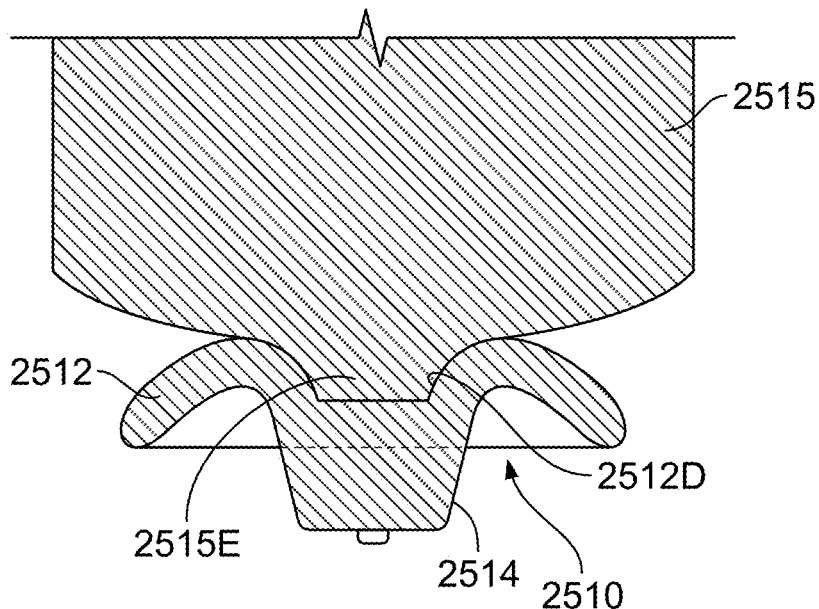
FIG. 38 is a diagrammatic, cross-sectional view of a fastener in accordance with an alternative embodiment of the present disclosure positioned adjacent to a welding electrode tip.

FIG. 38 shows a "semi-solid" fastener 2510 having a solid shaft 2514. The cap 2512 has an electrode depression 2512D matingly accommodating an electrode extension 2515E of electrode 2515. This arrangement may be used to reduce electrode 2515 wear. In one example, the electrode depression 2512D and the electrode extension 2515E each approximate 4-8 mm in diameter and have a depth of 1 to 4 mm. Since the shaft 2514 is solid, it is not as collapsible as a thin wall shaft like shaft 14 of fastener 10 shown in FIGS. 1 and 2. When penetrating an intermediate layer 11 (e.g., made from aluminum) to reach a layer 13 (e.g., made from steel) to weld to (See FIGS. 6 and 7), the shaft 2514 of the fastener 2510 is shorter and does not have to collapse. As a result, the fastener 2515 reaches the layer 13 quicker. This reduces the amount of time that current flows through the electrode 2515 and the fastener 2510, reducing electrode erosion and improving the productivity of the process. The contact area between the electrode extension 2515E and the electrode depression 2512D increases the electrical contact area over that of smooth mating surfaces, reducing electrical resistance and providing a mechanical coupling that preserves the relative position of the fastener 2510 and the electrode 2515 during placement of the fastener 2510.

Figure 39:
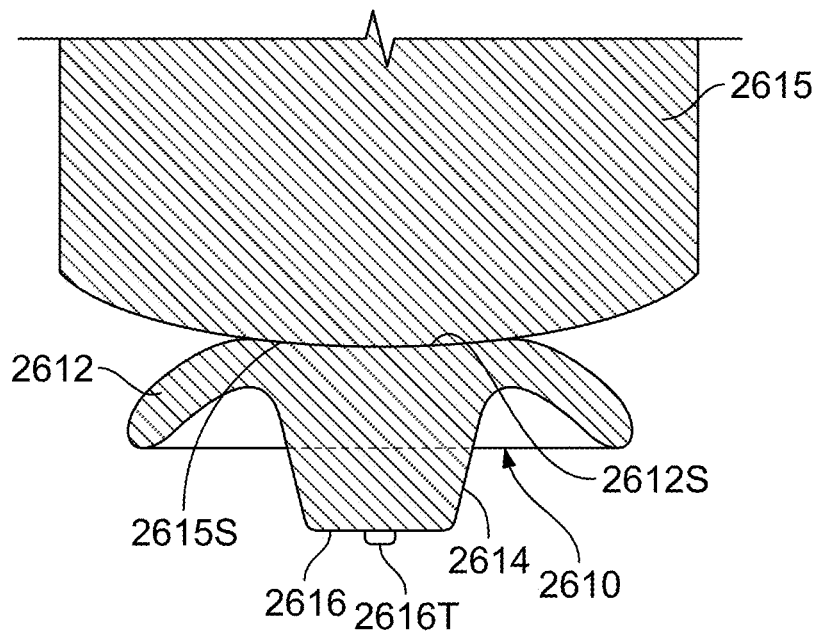
FIG. 39 is a diagrammatic, cross-sectional view of a fastener in accordance with an alternative embodiment of the present disclosure positioned adjacent to a welding electrode tip.

FIG. 39 shows a "solid" fastener 2610 with a solid shaft 2614. The cap 2612 has an upper electrode receiving surface 2612S with a constant radius, of, e.g., 1 to 6 inches, which allows the use of a conventional, radiused spot welding electrode 2615 having a similar radius. This relationship reduces the need for special electrode designs and dressing equipment and also reduces electrode wear. The cap 2612 may be proportioned to allow collapse toward the sheet 11 (see FIGS. 6 and 7) through which the shaft 2614 is pushed during the insertion process, with the cap 2612 flattening against the sheet 11 when fully inserted. A small tip element 2616T can extend from the end 2616 of the fastener 2610, which may be used to concentrate current and heating to help initiate heating/softening of a sheet 11 to be pierced and it initiate welding to a sheet 13.

Figure 40:
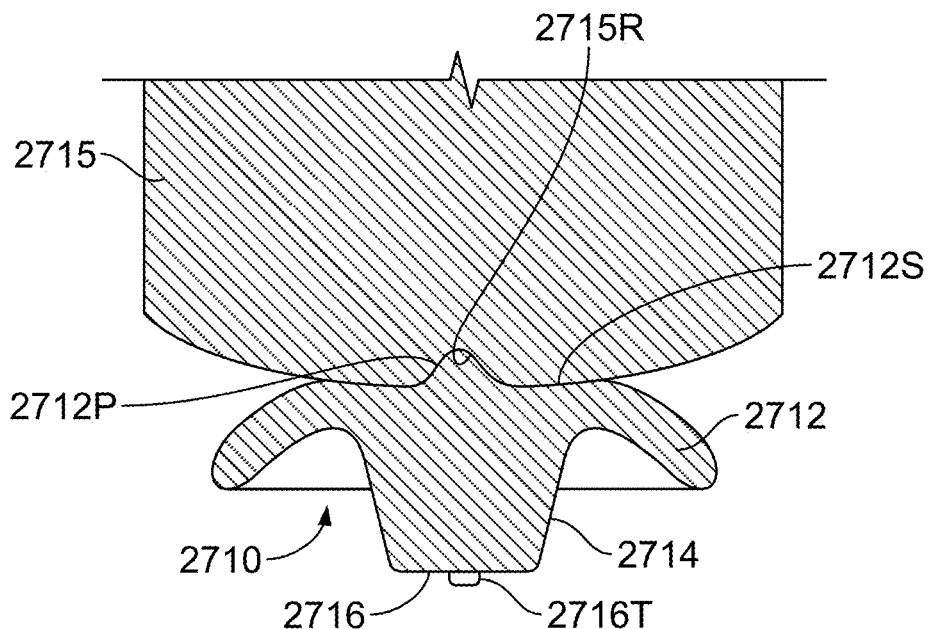
FIG. 40 is a diagrammatic, cross-sectional view of a fastener in accordance with an alternative embodiment of the present disclosure positioned adjacent to a welding electrode tip.

FIG. 40 shows a solid fastener 2710 similar to fastener 2610 but having an electrode alignment projection 2712P extending up from the radiused surface 2712S. The projection 2712P may be received in a mating recess 2715R of the electrode 2715. The mating projection 2712P and recess 2715R may help keep the fastener 2710 aligned with the electrode 2715 during the insertion and welding processes (through a sheet 11 to weld to a sheet 13, as shown in FIGS. 6 and 7). The radius of the projection 2712P may be, e.g., 3/16" to 1/4". While the recess 2715R requires s unique electrode geometry, it is compatible with conventional electrode dressing equipment.

Figure 41:
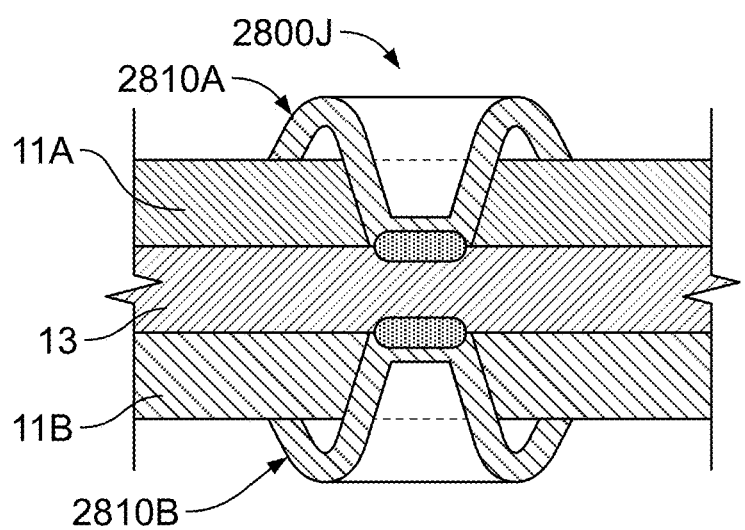
FIG. 41 is a diagrammatic, cross-sectional view of a pair of fasteners in accordance with an alternative embodiment of the present disclosure, each inserted through an associated outer layer and welded to a common central layer.

FIG. 41 shows a joint 2800J wherein a pair of opposing fasteners 2810A, 2810B penetrate through layers 11A, 11B (such as sheets of aluminum), respectively, e.g., by resistance heating and pressure, and weld to a central layer 13, e.g., made from steel. To achieve this configuration, the fasteners 2810A, 2810B may be inserted simultaneously (in a single operation) through the aluminum sheets 11A, 11B and weld to the steel layer 13. Alternatively, the fasteners 2810A, 2810B may be inserted and welded sequentially.

Figure 42:
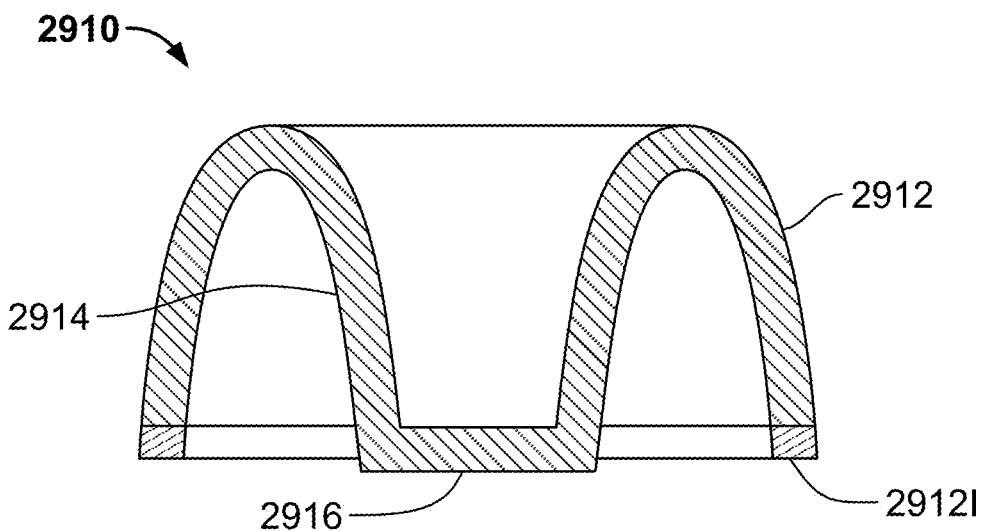
FIG. 42 is a cross-sectional view of a fastener in accordance with an alternative embodiment of the present disclosure.

FIG. 42 shows a cross section of a fastener 2910 having an extended grip range. The cap 2912 extends down to an extent comparable to the shaft 2914. A ring 2912I, of insulating material is attached to the terminal end of the cap 2912, such that the bottom edge of the ring 2912I is approximately co-extensive with the end 2916. In use, the fastener 2910 may be placed on a surface of a sheet 11, e.g., made from aluminum and then heated by electrical resistance by a resistance welder as described above, e.g., in relation to FIGS. 6 and 7, to penetrate the sheet 11 and weld to an underlying sheet 13, e.g., made from steel. Because the ring 2912I is an insulator, the electrical current passes only through the end 2916. As the end 2912 presses through the sheet 11, the ring 2912I abuts against the sheet 11 as the end 2016 passes through the sheet 11. As a consequence, the cap 2912 bends to the degree necessary to allow the end 2916 to reach and weld to sheet 13, while the ring 2912I abuts against sheet 11. As a result, the shaft 2914 can penetrate a variety of thicknesses of sheet 11 and (the ring 2912I thereof) will still press against the sheet 11 urging it into contact with sheet 13.

Figure 43:
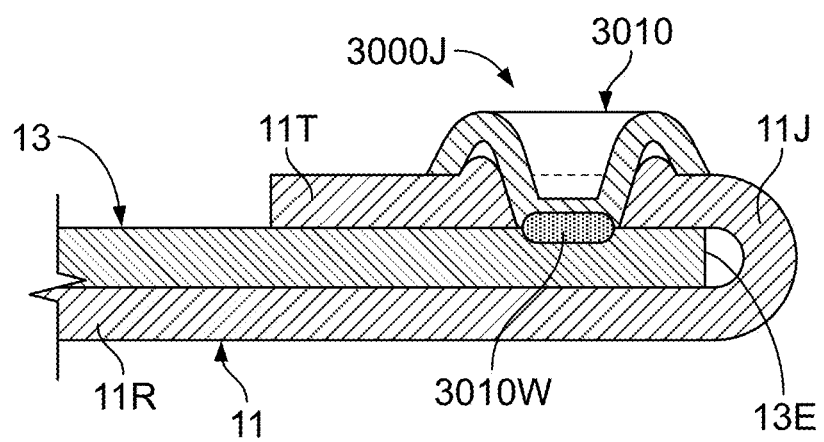
FIG. 43 is a diagrammatic, cross-sectional view of a fastener in accordance with an alternative embodiment of the present disclosure, inserted through a portion of a J-shaped layer and welded to a layer embraced by the J-shape.
Figure 44:
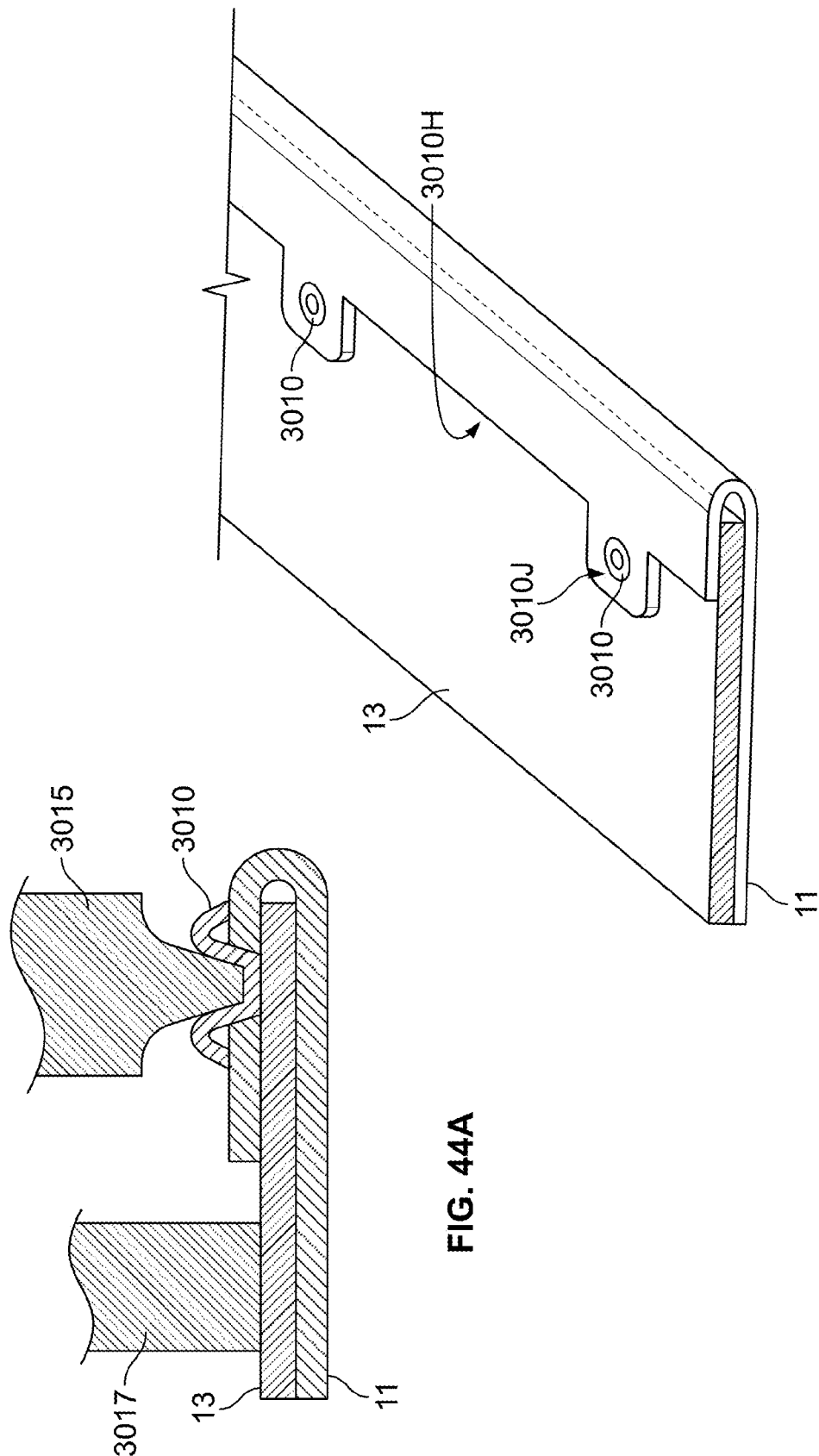
FIGS. 44A and 44B are diagrammatic, cross-sectional views of fasteners and a composite structure in accordance with an alternative embodiment of the present disclosure being applied and after application.

FIGS. 43 and 44 show a first panel 11, e.g., made from an aluminum alloy, positioned against a second panel 13, e.g., made from steel. The first panel 11 is bent to form a J-shape 11J, which embraces an edge 13E of the panel 13. The panel 11 is staked to the panel 13 proximate the J-shape 11J and edge 13E by a fastener 3010 which passes through one thickness 11T of the panel 11 and welds at 3010W to the steel panel 13, forming joint 3000J. As shown, the weld 3010W does not disturb the remainder 11R of the panel 11, such that the joint 3000J is suitable for applications, like an automobile body, requiring a smooth surface appearance on the remainder 11R of the panel. As shown in FIG. 44A, electrodes 3015 and 3017 may approach from the same direction, with 3015 pressing against the fastener 3010 and electrode 3017 contacting the steel panel 13. As resistance heating softens the sheet 11, the fastener 3010 is pressed through the sheet 11 and welds to the sheet 13. As shown in FIG. 44B, a plurality of fasteners 3010 may be used to form a "hem" 3010H along the edge 13E of the sheet 13, with the J-shape 11J wrapped around the edge 13E. The hemmed joint 3010H may employ an adhesive to aid in holding the sheets 11, 13 together.

Figure 45:
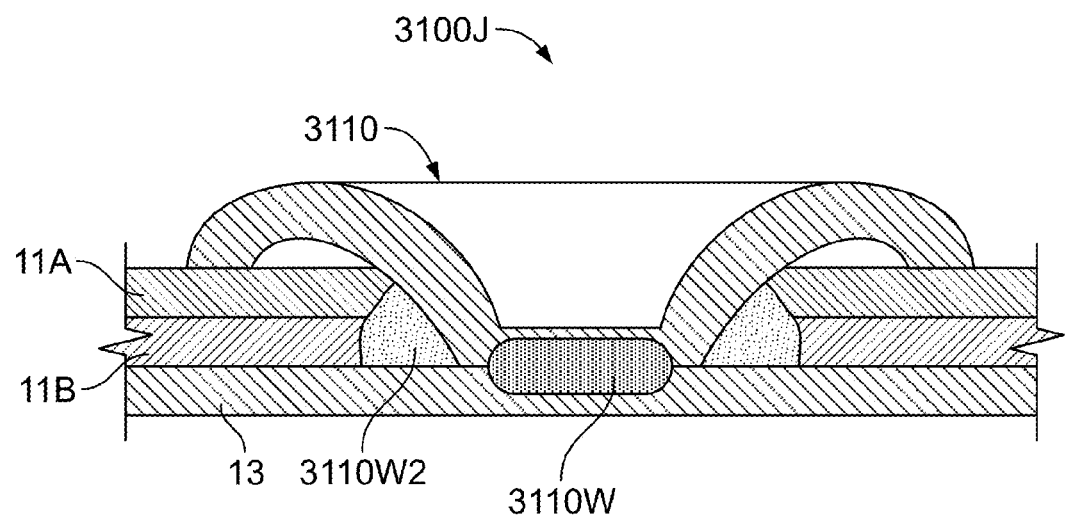
FIG. 45 is a diagrammatic, cross-sectional view of a fastener in accordance with an alternative embodiment of the present disclosure, inserted through a pair of layers and welded to a third layer.

FIG. 45 shows a pair of sheets 11A, 11B, e.g., of aluminum, coupled to a layer 13, e.g., of steel, by fastener 3110. The fastener 3110 has penetrated both aluminum sheets 11A, 11B, e.g., by electrical resistance heating, prior to contacting and subsequently welding to the steel sheet 13 at 3110W and forming joint 3100J. In joint 3100J, the heat from penetrating and welding, e.g., emitted from the fastener 3110, which may be steel, locally melts the aluminum sheets 11A and 11B adjacent to the fastener 3130, producing a weld 3110W2 between the sheets 11A and 11B that partially or completely encircles the fastener 3110. The weld 3110W2 consolidates the aluminum sheets 11A, 11B, and strengthens the joint 3100J. The aluminum sheets 11A, 11B can be of identical or dissimilar thicknesses. An adhesive may be present between one or all the sheet interfaces.

Figure 46:
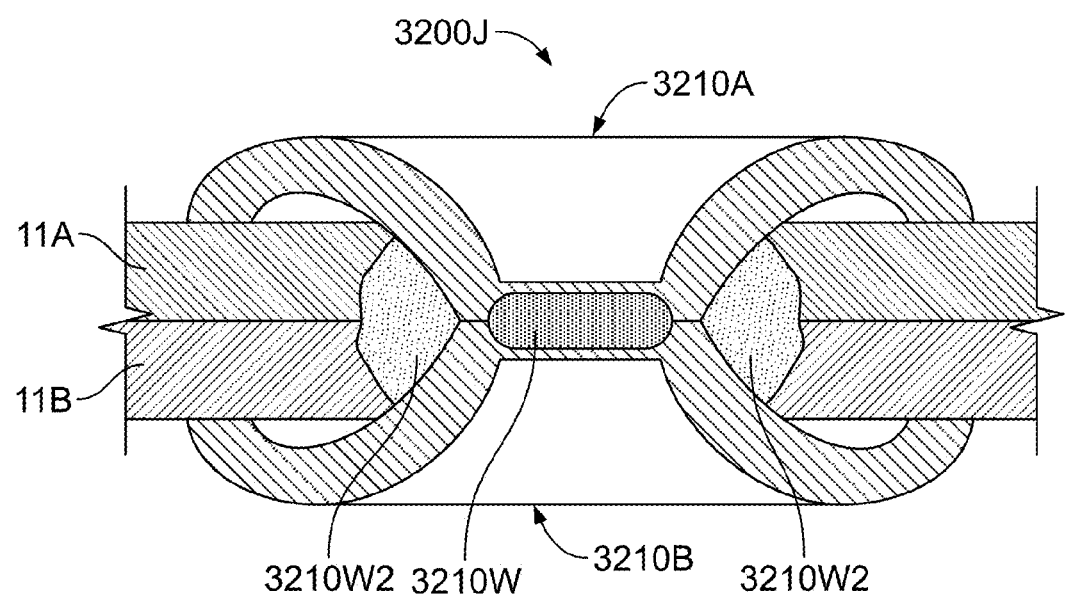
FIG. 46 is a diagrammatic, cross-sectional view of a pair of fasteners in accordance with an alternative embodiment of the present disclosure, inserted through a pair of layers of comparable thickness and welded to one another.

FIG. 46 shows a joint 3200J coupling two sheets 11A, 11B, e.g., made from aluminum, by two opposing fasteners 3210A, 3210B, e.g., made from steel. The fasteners 3210A, 3210B may be installed simultaneously from opposite sides via a pair of opposing welding electrodes in a similar manner to the embodiment shown in FIG. 10. The fasteners 3210A, 3210B are urged together and by resistance heating, penetrate the aluminum sheets 11A, 11B and then weld to each other, forming weld 3210W. As noted above with respect to the embodiment shown in FIG. 45, in passing through the sheets 11A, 11B, the steel fasteners 3210A, 3210B locally heat the aluminum sheets 11A, 11B adjacent thereto and create a weld 3210W2 that partially or completely encompasses the weld 3210W between the fasteners 3210A, 3210B. FIG. 46 shows sheets 11A, 11B of equal thickness, resulting in a symmetric joint 3200J, but as shown below, the process will work for sheets 11A, 11B of different gauges. In another alternative, two different fasteners 3210A, 3210B, with different operational reaches (shaft lengths) may be employed, the greater length being applied to the sheet with the greater thickness and vice-versa.

Figure 47:
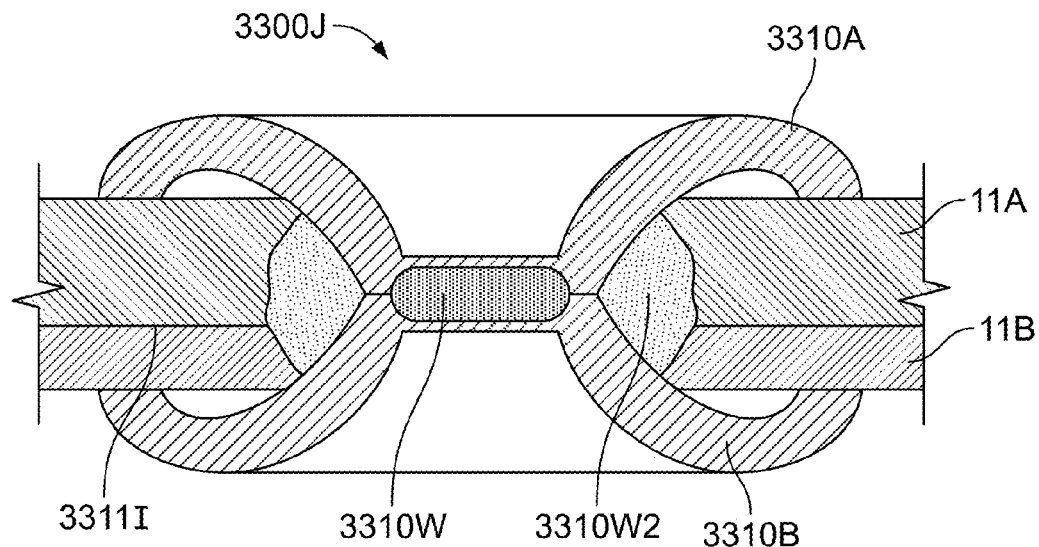
FIG. 47 is a diagrammatic, cross-sectional view of a pair of fasteners in accordance with an alternative embodiment of the present disclosure, inserted through a pair of layers with different thicknesses and welded to one another.

FIG. 47 shows a joint 3300J coupling two sheets 11A, 11B, e.g., made from aluminum, by two opposing fasteners 3310A, 3310B, e.g., made from steel. The fasteners 3310A, 3310B may be installed simultaneously from opposite sides via a pair of opposing welding electrodes in a similar manner to the embodiment shown in FIG. 10. The fasteners 3310A, 3310B are urged together and by resistance heating, penetrate the aluminum sheets 11A, 11B and then weld to each other, forming weld 3310W. As noted above with respect to the embodiment shown in FIGS. 45 and 46, in passing through the sheets 11A, 11B, the steel fasteners 3310A, 3310B locally heat the aluminum sheets 11A, 11B adjacent thereto and create a weld 3310W2 that partially or completely encompasses the weld 3310W between the fasteners 3310A, 3310B. FIG. 47 shows sheets 11A, 11B of unequal thickness, resulting in an asymmetric joint 3300J. As shown the fasteners 3310A, 3310B, have equal operational reaches (shaft lengths) resulting in a weld 3310W that is not at the interface 3311I between the sheets 11A, 11B. An aspect of the joint 3300J is that the load path through the joint 3300J follows several directions (not on the same axis) so it will have enhanced mechanical performance. As noted above, joint 3300J can be employed with or without adhesives, e.g., applied at the interface 3311I. The weld zone 3310W2 between the aluminum sheets 11A, 11B can be selectively made larger or smaller by selecting the weld schedule employed during the welding process. Additional heat cycles can be added to extend the aluminum weld zone 3310W2, and increase the overall performance of the joint 3300J.

Figure 48:
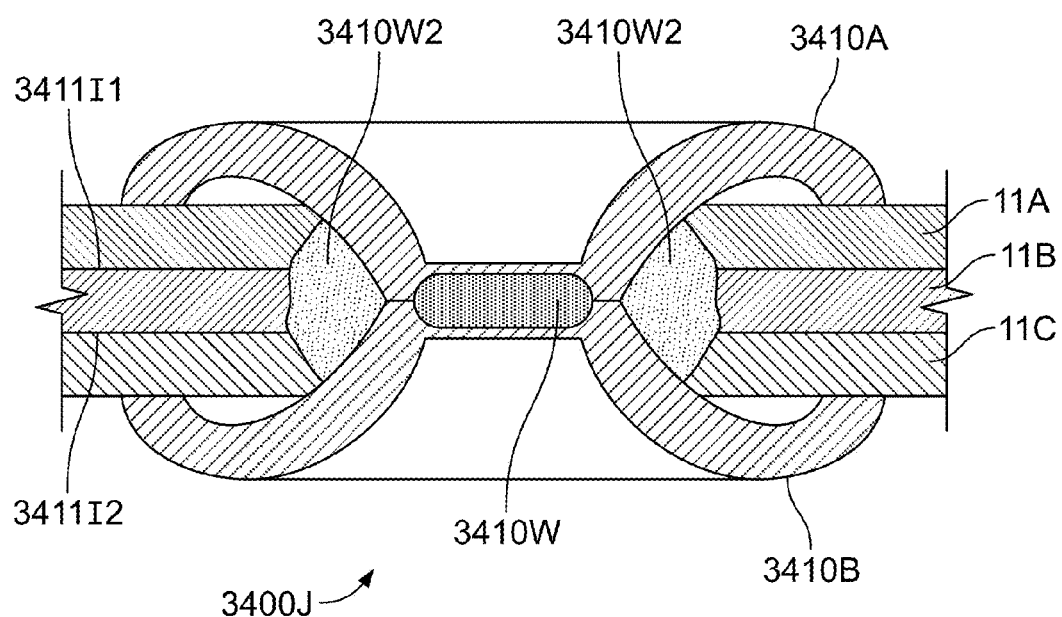
FIG. 48 is a diagrammatic, cross-sectional view of a pair of fasteners in accordance with an alternative embodiment of the present disclosure, inserted through a set of three layers and welded to one another.

FIG. 48 shows a joint 3400J coupling three sheets 11A, 11B, 11C e.g., made from aluminum, by two opposing fasteners 3410A, 3410B, e.g., made from steel. The fasteners 3410A, 3410B may be installed simultaneously from opposite sides via a pair of opposing welding electrodes in a similar manner to the embodiment shown in FIG. 10. The fasteners 3410A, 3410B are urged together and by resistance heating, penetrate the aluminum sheets 11A, 11B, 11C and then weld to each other, forming weld 3410W. As noted above with respect to the embodiments shown in FIGS. 45-47, in passing through the sheets 11A, 11B, 11C, the steel fasteners 3410A, 3410B locally heat the aluminum sheets 11A, 11B, 11C adjacent thereto and create a weld 3410W2 that partially or completely encompasses the weld 3410W between the fasteners 3410A, 3410B. FIG. 48 shows sheets 11A, 11B, 11C of approximately equal thickness, resulting in a symmetric joint 3400J. As shown, the fasteners 3410A, 3410B, have equal operational reaches (shaft lengths), such that when they join to form weld 3410W, they are roughly in the middle of sheet 11B, resulting in a weld 3410W that is not at the interfaces 3411I1, 3411I2 between the sheets 11A, 11B, 11C and therefore has enhanced mechanical performance. As noted above, this joint 3400J can be employed with or without adhesives, e.g., applied at the interfaces 3411I1, 3411I2. The weld zone 3410W2 between the aluminum sheets 11A, 11B, 11C can be selectively made larger or smaller by selecting the weld schedule employed during the welding process. Additional heat cycles can be added to extend the aluminum weld zone 3410W2, and increase the overall performance of the joint 3400J. The sheets 11A, 11B, 11C can be of the same or varying thicknesses and alloy types. The fasteners 3410A, 3410B can be designed to meet in the center of the aluminum sheet 11A, 11B, 11C stackups or at another location which will maximize joint performance and extend the load path.

Figure 49:
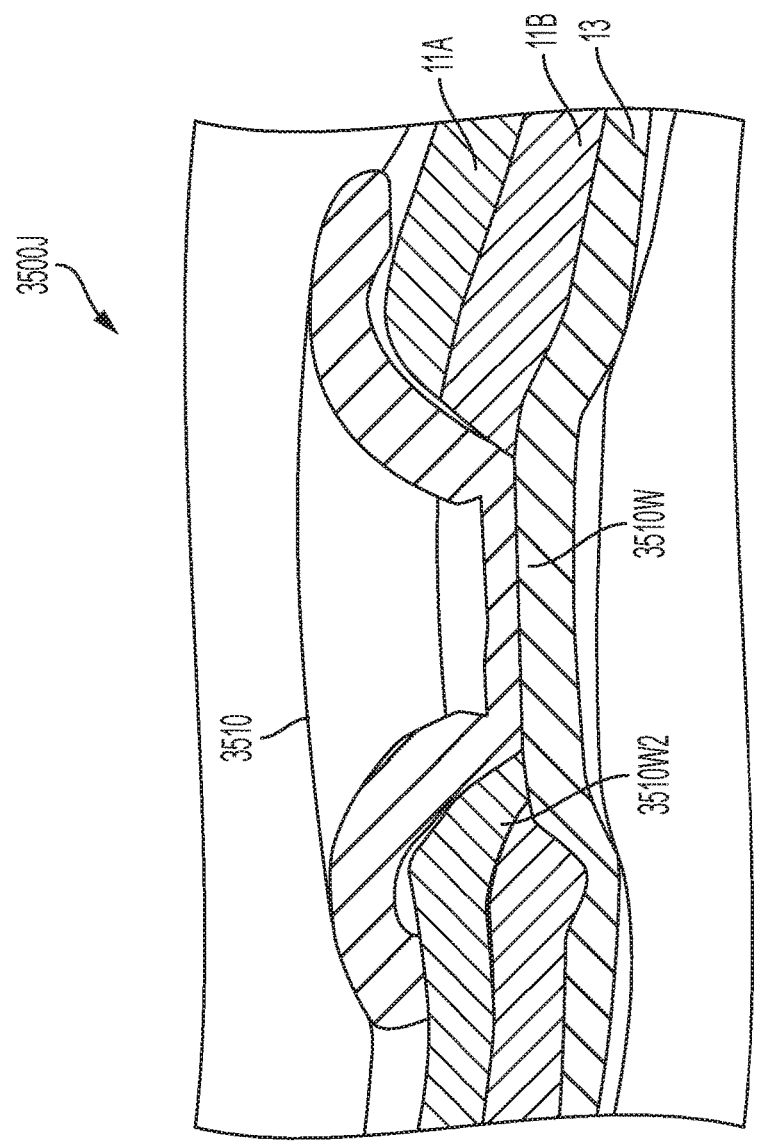
FIG. 49 is a photograph of a cross-section of a fastener in accordance with an alternative embodiment of the present disclosure, inserted through a pair of layers and welded to a third layer.

FIG. 49 is a photograph of a joint 3500J cut to show a cross section thereof. The joint 3500J couples two aluminum sheets 11A, 11B of 1.0 mm C710-T4 aluminum alloy between a fastener 3510 and a steel sheet 13 of 0.9 mm galvanized steel. The fastener 3510 is a G1A rivet. The weld zone 3510W2 shows the merging of the sheets 11A, 11B proximate the fastener 3510. The welding was conducted on the sheets 11A, 11B without a pilot hole. The joint 3500J was created with a weld input of 8 kA @ 400 msec preheat plus 16 kA @ 100 msec weld pulse, 800 lbs. The sample was distorted somewhat while it was being cut for the cross section.

Figure 50:
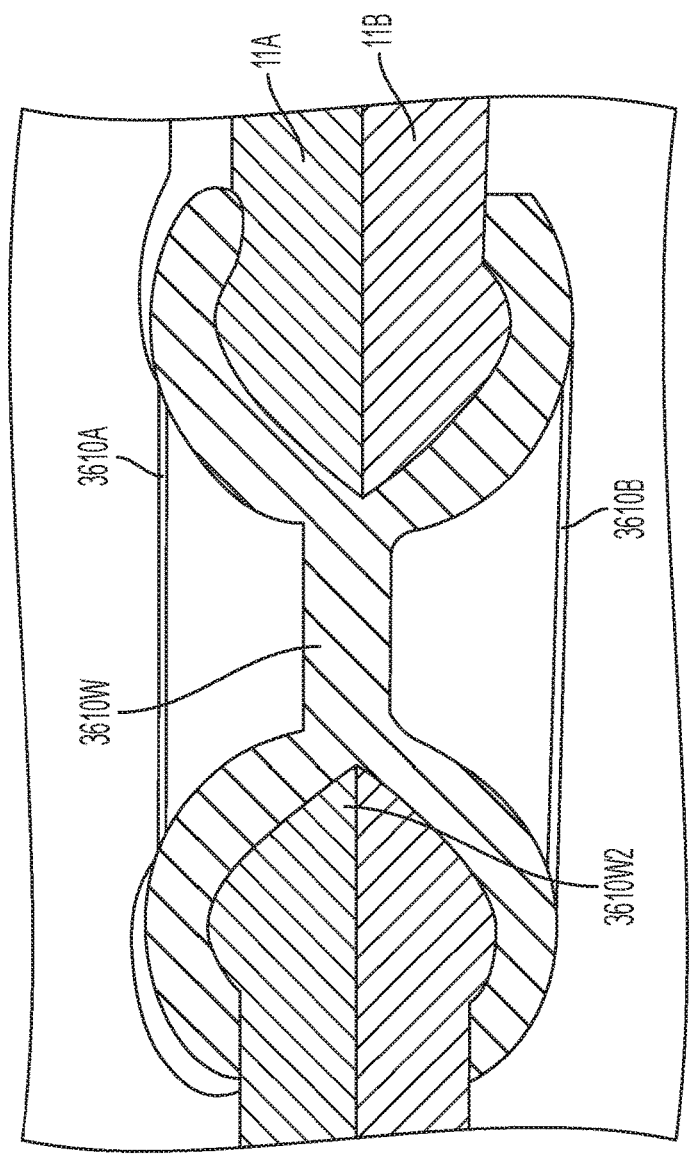
FIG. 50 is a photograph of a cross-section of a pair of fasteners in accordance with an alternative embodiment of the present disclosure, inserted through a pair of layers and welded to one another.

FIG. 50 is a photograph of a joint 3600J cut to show a cross section thereof. The joint 3600J couples two aluminum sheets 11A, 11B of 1.6 mm 7075-T6 aluminum alloy between two fasteners 3610A, 3610B. The fasteners 3610A, 3610B are G1A rivets. The weld zone 3610W2 shows the merging of the sheets 11A, 11B proximate the fasteners 3610A, 3610B. The welding was conducted on the sheets 11A, 11B without a pilot hole. The joint 3500J was created with a weld input of 8 kA @ 400 msec preheat plus 12 kA @ 300 msec weld pulse, 8001b.

FIG. 51 shows an electrode 3715 with a tip 3715T having a standard geometry. The electrode tip 3715T inserts into and is retained in electrode shaft 3715S via mating tapered surfaces 3715TS1, 3715TS2. The tip 3715T has a riveting surface 3715RS having a radius R of about 8 mm. The electrode 3715 is shown in contact with a fastener 3710 with a short, solid shaft 3714 and a wide cap 3712 having a concave surface 3712CS, which may have a radius R1 of curvature approximating that of the riveting surface 371RS of the tip 3715T. The fastener 3710 is in place on stacked sheets 11, e.g., made from aluminum and 13, e.g., made from steel. The "semi-solid" fastener 3710 accommodates a standard electrode radius. The electrode 3715 is in common use in industry and provides excellent electrode wear and dressing capability. Deviations of electrode orientation from perpendicular frequently occur, particularly in high volume production. The radiused contact surface 3712CS allows the electrode to have a small amount of angularity relative to the perpendicular and still function for driving and welding the fastener 3710. For very thick penetration needs (4 mm or greater) the shaft 3714 the fastener 3710 would be very thick as compared to other fastener designs, e.g., shown in FIGS. 1-11, where the electrode, e.g., 15, 115, 215 penetrates relatively deeply into the fastener, e.g., 10, 110, 210. The fastener 3710 may be fed to the welding electrode 3715 via a carrier web or tape or some other means to hold it in place prior to electrode contact, which presses it against the workpiece(s) to be joined.

FIG. 52A shows an electrode tip 3815T having a "bottlenose" geometry. As in FIG. 51, the electrode tip 3815T would insert into and be retained in an electrode shaft like 3715S. The tip 3815T has a riveting surface 3815RS having a radius R of about 4 mm. The electrode tip 3815T is shown in contact with a fastener 3810 with a short, solid shaft 3814, e.g., having a length greater then 1.5 mm. The fastener 3810 has a wide cap 3812 having a concave surface 3812CS, which may have a radius of curvature approximating that of the riveting surface 3815RS of the tip 3815T. The height of the fastener is about 4 to 5 mm overall. The fastener 3810 is positioned on sheet 11, e.g., made from aluminum and 13, e.g., made from steel. The "semi-solid" fastener 3810 accommodates the "bottlenose" tip 3815T. As noted above, deviations of electrode orientation from perpendicular frequently occur and the radiused contact surface 3812CS allows the electrode to have a small amount of angularity relative to the perpendicular and still function for driving and welding the fastener 3810. The smaller radius of surface 3815RS provides increased flexibility to function at an angular offset from the welding electrode and greater electrode penetration inside the fastener 3810, which more closely resembles sheet-to-sheet spot welding. Additionally this type of tip geometry will work with a wider range of fastener shaft lengths since a very thick base is not required when welding sheets 11, 13 having a thickness 4 mm or greater. The smaller radius "nose" of the electrode tip 3815T will have a surface 3815RS that closely matches the radius on the contact surface 3812CS. The transition from surface 3815RS to the outer wall 3815OW of the electrode tip 3815T can be done using a variety of shapes, including: a larger radius, a straight wall at an angle or a double curve, as shown in FIG. 52B. The electrode tip 3815T retains advantages of the standard electrode shown in FIG. 51, such as excellent electrode wear and electrode dressing.

Figure 53:
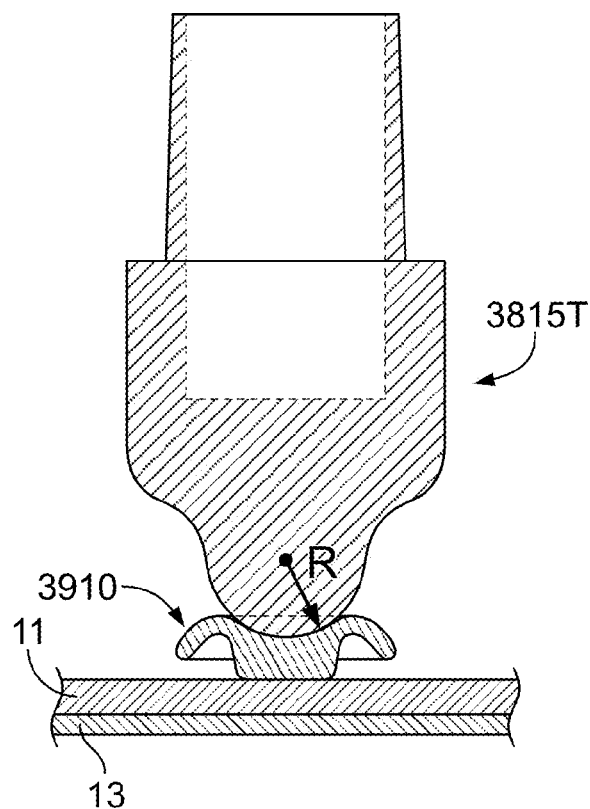
FIG. 53 is a diagrammatic, cross-sectional view of a welding electrode tip and a fastener in accordance with an alternative embodiment of the present disclosure, positioned on a pair of layers.

FIG. 53 illustrates that the bottlenose shape of the tip 3815T can accommodate a variety of fasteners, e.g., 3910 and stack-up thicknesses, making the electrode tip 3815T capable of processing a wide range of stack-up thicknesses with the same electrode tooling.

Figure 54:
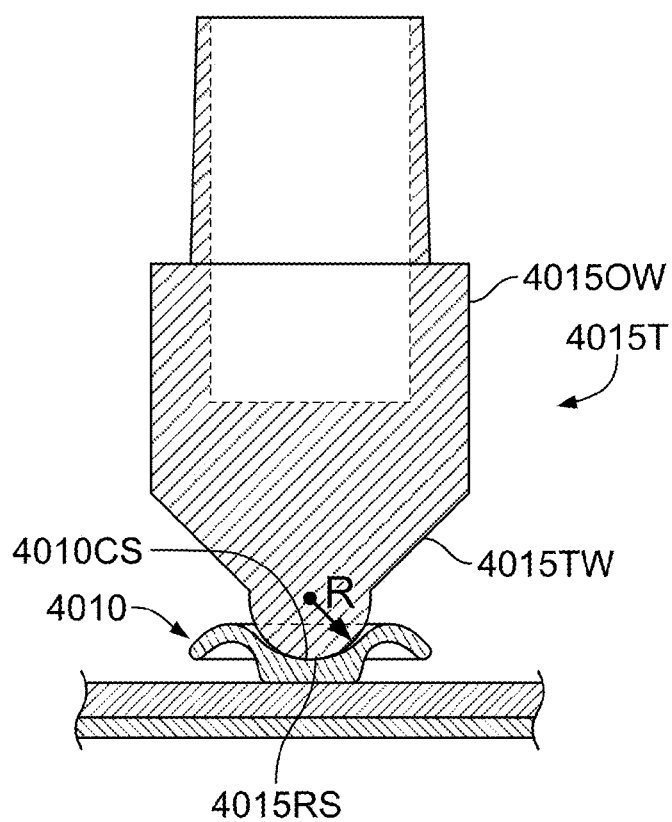
FIG. 54 is a diagrammatic, cross-sectional view of a welding electrode tip and a fastener in accordance with an alternative embodiment of the present disclosure, positioned on a pair of layers.

FIG. 54 shows another type of the bottlenose electrode tip 4015T that may reduce electrode wear. The radius R of the riveting surface 4015RS has a smaller radius than that shown in FIGS. 52 and 53, viz., 3 mm versus 4 mm. In general, the radius of the riveting surface 4015RS should be greater than 2 mm but less than 8 mm, preferably 3 to 6 mm. In FIG. 54, the fastener contact surface 4010CS has a radius of 4 mm, slightly larger than the riveting surface 4015RS. The riveting surface 4015RS transitions to outer wall 4015OW via a straight wall 4015TW disposed at an angle of e.g., 45 degrees relative to the outer wall 4015OW. The electrode tip 401ST exhibits operability despite angular and x, y offsets in orientation and position of the electrode tip 401ST relative to that of the fastener 4010. In some applications, it is preferred that the radius of the contact surface 4010CS be slightly larger than that of the riveting surface 4015RS and in one embodiment, the contact surface 4010CS may be from 3 to 12 mm or 4 to 8 mm.

Figure 55:
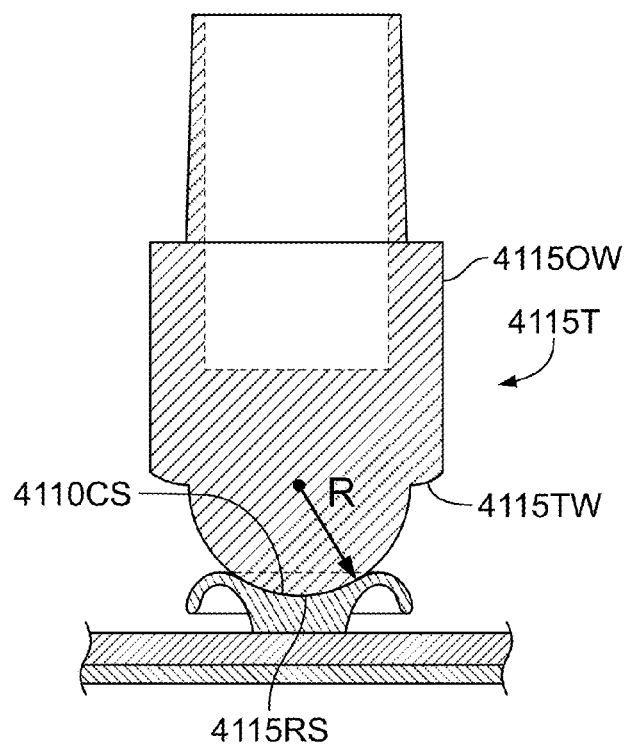
FIG. 55 is a diagrammatic, cross-sectional view of a welding electrode tip and a fastener in accordance with an alternative embodiment of the present disclosure, positioned on a pair of layers.

FIG. 55 shows an electrode tip 4115T that may reduce electrode wear. The radius R of the riveting surface 4115RS may be from 3 to 8 mm. The riveting surface 4115RS transitions to outer wall 4115OW via a curved wall 4115TW with a large radius, e.g., between 50 to 150 mm. This geometry provides enhanced heat transfer and cooling.

Figure 56:
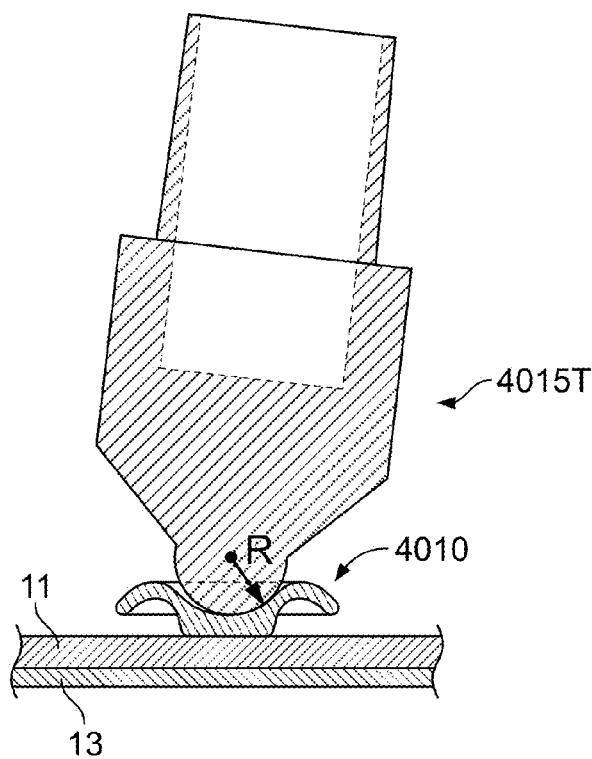
FIG. 56 is a diagrammatic, cross-sectional view of a welding electrode tip and a fastener in accordance with an alternative embodiment of the present disclosure, positioned on a pair of layers.

FIG. 56 shows the bottlenose electrode tip 401ST described above in relation to FIG. 54 at an orientation misaligned with the fastener 4010, e.g., at an angular offset a of up to 30 degrees from an orientation perpendicular to sheets 11, 13. The bottlenose tip 4015T will accommodate angular misalignments up to 30 degrees or more and still provide workable electrical and mechanical contact. If the fastener 4010 has a slightly larger radius R it will enhance the ability of spot welding apparatus with electrode tip 4015T to push the fastener 4010 through the sheet 11 and otherwise accommodate variations from ideal production fit-up. The ability to adjust to angular misalignments is new to projection type welding processes which typically employ large, flat faced electrodes and represents another significant departure of the presently disclosed technology from traditional electrical resistance welding.

Figure 57A:
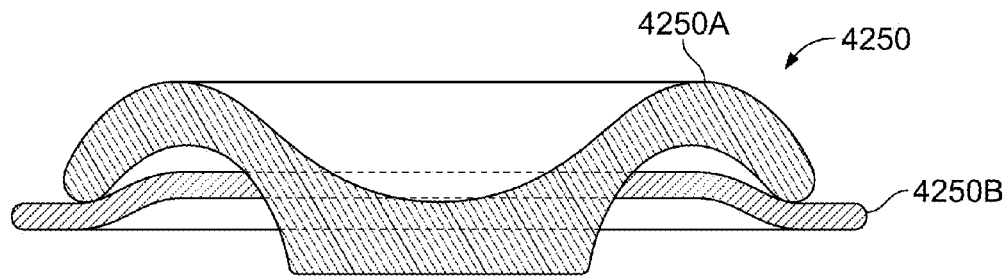
FIGS. 57A, 57B and 57C are diagrammatic, cross-sectional view of fasteners and an associated material layer in accordance with an alternative embodiment of the present disclosure.
Figure 57B:
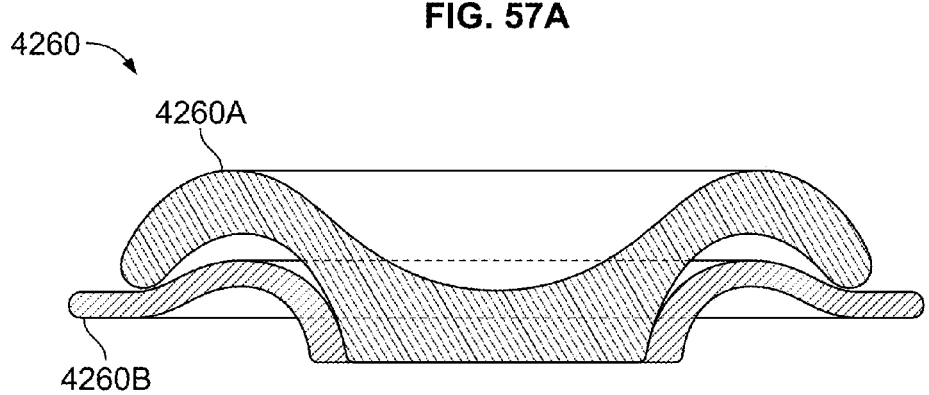
Figure 57C:
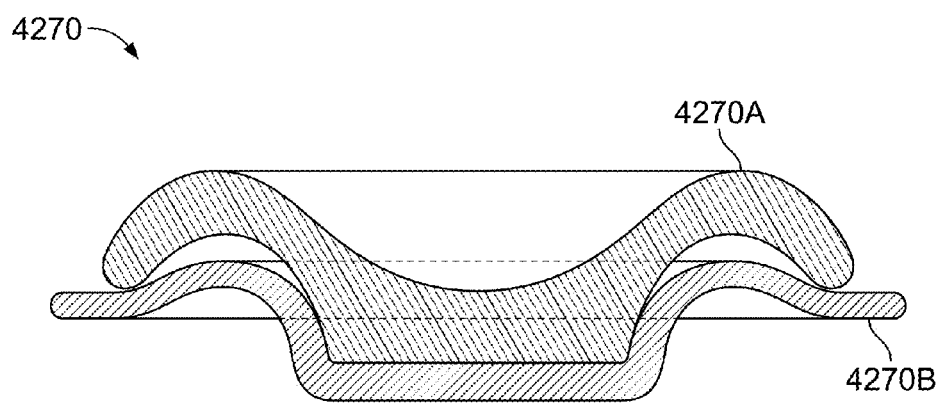

FIGS. 57A, 57B, 57C show composite fasteners 4250, 4260 and 4270, each having a plurality of components 4250A, 4250B, 4260A, 4260B and 4270A, 4270B, respectively. As shown, the components 4250A, 4260A and 4270A may be a fastener like any of the fasteners 10, 110, 210, 310, etc. disclosed above. Components 4250B, 4260B and 4270B may be in the form of a sheet of material that is press fitted or adhered to the fastener component 4250A, 4260A and 4270A. The sheet member 4250B, 4260B and 4270B may be composed of materials including: polymer, resin, adhesive (a and b above) or a metal (a, b, and c). The sheet member 4250B, 4260B and 4270B may be integral with and severable from a larger web that serves as a transport or holding mechanism for positioning fasteners 4250, etc. relative to materials to be fastened, e.g., sheets 11, 13 of FIGS. 4-7, during the process of applying the fasteners 4250, 4260, etc. via electrical resistance heating and welding as described above. Components 4250B, 4260B, 4270B may be selected to remain captured in the joint formed by the fasteners 4250A, 4260A, 4270A. For example, the sheet members 4250B, 4260B and 4270B may be a plastic/polymer sealant for sealing and protecting a joint formed by the fastener from corrosion.

If the sheet members 4250B, 4260B and 4270B are metallic and are integral with a larger structure, e.g., a tape or web employed as a transport/positioning mechanism, the attachment to the tape or web may be by a perforated or an otherwise frangible connection, permitting the sheet members 4250B, 4260B and 4270B to be disconnected from the greater structure when the associated fastener 4250A, 4260A, 4270A is used. The sheet members 4250B, 4260B and 4270B can be made from a variety of materials, e.g., stainless steel, aluminum brazing alloys, high purity aluminum, etc., in order to reduce the galvanic corrosion potential and/or extend joint bond between the fastener 4250A, 4260A, 4270A and all surfaces, e.g., sheets, 11, 13, it may come into contact with. If a brazing alloy is employed, it may be prefluxed to offer improved wetting along the contact surfaces and improved bonding performance. The sheet members 4250B, 4260B and 4270B may be associated with the corresponding fasteners 4250A, 4260A, 4270A mechanically, e.g., an interference fit, or other means, such as adhesion via surface attraction or use of an adhesive. The composition and function of the sheet members 4250B, 4260B and 4270B may be similar or the same of the sleeves 2310T and or 2410A of FIGS. 36 and 37. The fasteners 4250A, 4260A, 4270A and sheet members 4250B, 4260B and 4270B may be assembled prior to performing a fastening operation and different combinations of fasteners 4250A, 4260A, 4270A and sheet members 4250B, 4260B and 4270B may be selected based upon the requirements and objectives of the fastening task.

Figure 58:
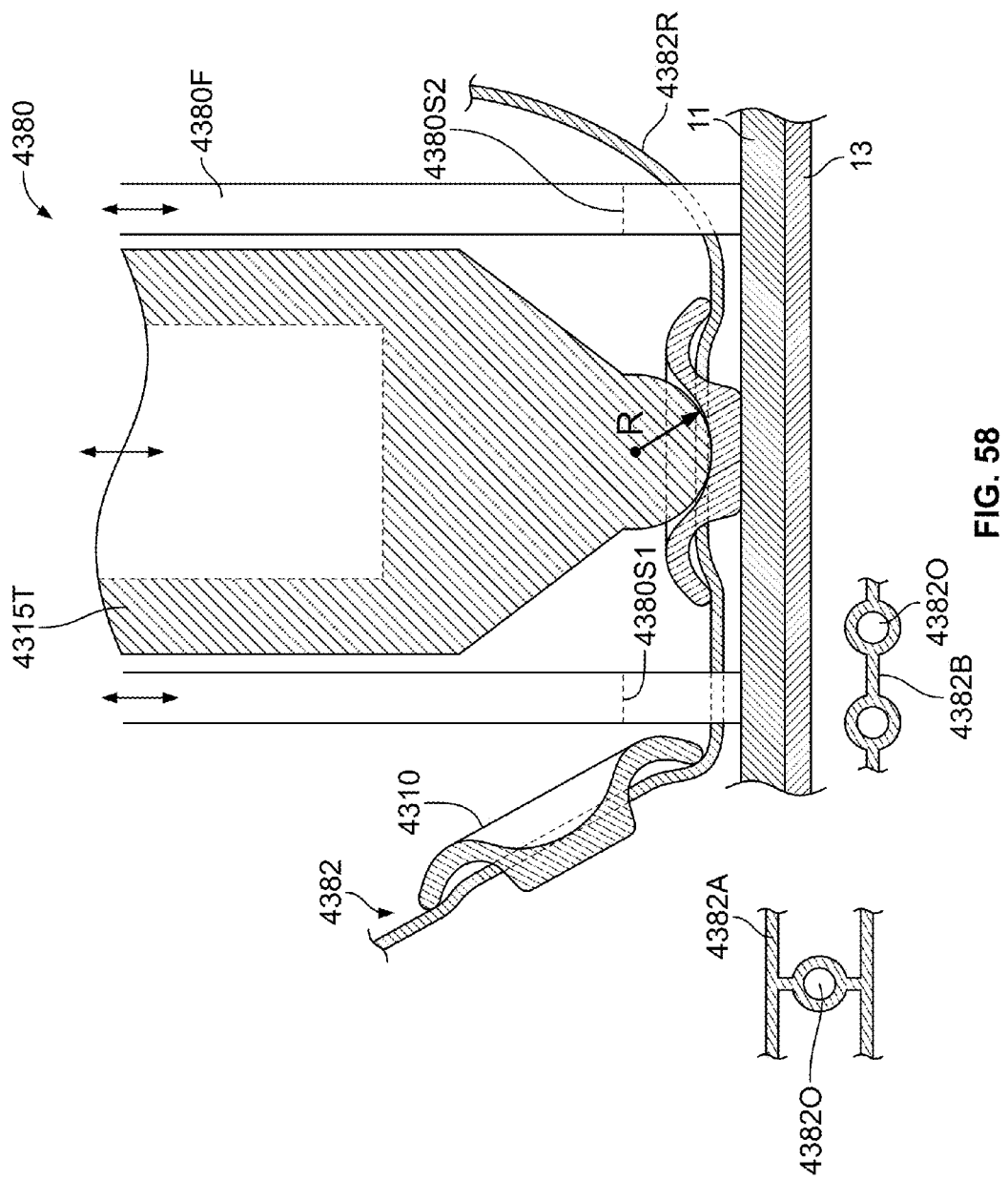
FIG. 58 is a diagrammatic, cross-sectional view of fasteners and an associated carrier for positioning the fasteners relative to an electrical resistance welding tip and material layers to be fastened.

FIG. 58 shows a feeding mechanism 4380 and media 4382 for loading fasteners 4310 between the tip 4315T of a welding electrode and a workpiece, e.g., sheets 11, 13 to be fastened together by resistance welding with fasteners 4310, in accordance with an embodiment of the present disclosure. The fasteners 4310 are mounted and carried by the media 4382, which may be in the form of a belt or tape that runs between coils on the left L and right R of the feeding mechanism 4380. The media may be guided by guide rolls or another form of guide, such as a chute or guide surfaces 4380S1, 4380S2 through frame 4380F, such that the fasteners 4310 carried by the media are presented periodically between the electrode tip 431ST and the sheet 11. The electrode tip is periodically moved up and down to perform a penetration/welding operation as described above in this disclosure by electrical resistance heating and welding. The feeding mechanism 4380 may also move up and down relative to the sheet 11. The media 4382 may be partially or fully consumed when the fastener 4310 is applied to the sheets 11, 13. In the alternative, a remnant portion 4382R of the media 4382 may pass beyond the applied fastener 4310 and be taken up by a wind-up roll or other take-up mechanism, for disposal or reuse. As described above in relation to FIG. 57, the media 4382 may be selected to provide a beneficial attribute to the joint formed by the fastener 4310, e.g., the media 4382 may be a sealant or corrosion reducing film, an adhesive or brazing media. Two forms of media 4382A and 4382B with openings 4382O for receiving the fastener 4310.

Aspects of the fasteners 10, 110, 210, etc. and fastening methods of the present disclosure include the following. The process for applying the fasteners is associated with low part distortion since the layers of material, e.g., 11, 13 and the fastener 10, 110, etc. are held in compression during the weld and the heat affected zone is captured below the cap, e.g., 12. The cap 12 may have a pre-formed recess or bend to form a recess to accommodate and trap melted metals, intermetallics etc. displaced by the welding operation. Because a given fastener, e.g., 10, 110, etc., can deform, e.g., melt and collapse during the penetration and welding phases, it can handle a range of thicknesses of sheets, e.g., 11, 13 to be fastened. During the fastener penetration and welding, as the fastener 10, 110, etc., collapses and expands along the weld zone, intermetallics are displaced from the weld zone. When the fastener 10, 110, etc. (i.e., the cap 12 thereof), compresses against the top sheet, e.g., 11, under the influence of the electrode 15, 115, 215, etc., it will come to a stop with the cap 12 sealing against the top sheet 11. The fastener 10, 110, etc., can be applied through adhesives applied between the sheets, 11, 13. Since the fastener 10, 110, 210, etc., is welded or brazed to one side of the second sheet 13, the other side of the sheet 13 is not pierced and remains water-tight. The welding process of the present disclosure is compatible with conventional RSW equipment developed for steel sheet resistance welding, e.g., as used in automobile manufacture.

The fastener 10, 110, 210, etc., may be made from a variety of materials such as different steel grades (low carbon, high strength, ultra high strength, stainless), titanium, aluminum, magnesium, and copper and may be coated (galvanized, galvaneal, hot-dipped, aluminized) to improve corrosion resistance. The fastener 10, 110, 210, etc., may be applied via single-sided or two-side access welding techniques. In one approach, no pilot hole is used and the fastener pierces through a first layer 11 softened by resistance heating. In another approach, a pilot hole may be provided in the top sheet 11, which may be aluminum, plastic, or in the instance of a fastener having an aluminum shaft end 16, the first sheet may be steel, titanium, or copper and the second sheet aluminum. In the instance where the fastener is inserted through a pilot hole in the first sheet, the first sheet need not be electrically conductive and need not have a lower melting temperature than the second sheet (since the fastener does not penetrate the first sheet by electric resistance heating. Quality assurance measurements may be conducted on the cavity left from destructive disassembly of the weld securing a fastener to a second sheet, e.g., to inspect the dimensions, e.g., depth, volume, etc. of the weld. Ultrasonic NDE techniques may be utilized on the opposite side of the sheet to which the fastener is welded to monitor the weld quality.

The equipment used to apply the fastener of the present disclosure 10, 110, 210, etc., has a much smaller footprint than FDS (EJOTS), SPR, and SFJ, allowing access to tighter spaces. The insertion forces used to drive the fastener of the present disclosure are lower compared to those used in SPR, since the aluminum sheet 11 is either heated or apertured, facilitating fastener insertion, enhancing the ability to join high strength aluminums which are sensitive to cracking during SPR operations. The approaches of the present disclosure also facilitate joining to high and ultra-high strength steels since there is no need to pierce the steel metal with a fastener, instead, the fastener is welded to the sheet metal. The methods of the present disclosure do not require rotation of the fastener or the workpiece facilitate parts fit-up, since the process is similar to conventional RSW in terms of how the parts to be joined are fixture. The fasteners 10, 110 may be applied at processing speeds approximating those of conventional RSW and the process can be used on both wrought and cast aluminum. Since welding of aluminum to steel is avoided, the low joint strength associated with bimetallic welds is also avoided. The process of the present disclosure permits multiple sheets of aluminum and steel and other metals, e.g., 2 layers of aluminum and 1 layer of steel; 1 layer of aluminum and 2 layers of steel; or 1 layer of aluminum, 1 layer of magnesium and 1 layer of steel to be fastened.

During the application of the fastener 10, 110, 210, etc., the first sheet 11 or sheets 11A, 11B that are penetrated by the fastener may also be melted and welded together, increasing the weld zone and overall joint strength. The fastener may be fabricated from a variety of materials for welding to compatible sheets 13 and may be multi-layered, such that the fastener may have mechanical and galvanic properties that are a combination suitable for welding and for the avoidance of corrosion. For example, a fastener may be fabricated having an end that is aluminum and compatible to weld to an aluminum second sheet 13, but have a layer of steel, titanium or copper to improve its mechanical properties. Multi-layer fasteners may be useful in high temperature applications and may include a layer or layers of material to prevent diffusion across multi-material interfaces.

A film, adhesive, or coating may be applied to the fastener or introduced between the fastener and the first sheet 11 to improve the sealing of the cap 12 to the sheet 11. The process of the present disclosure may be used to join a wide range of sheet thicknesses by incorporating a retrograde cap that curls back toward the end of the shaft, which may be coated with an insulator to avoid conducting electricity through the cap/sheet 11 interface, the cap bending during the heating penetrating phase to accommodate different thicknesses in stack-ups. The present disclosure contemplates fasteners made from a variety of materials including aluminum, steels, stainless steel, copper, and titanium. The fastener can be made up of two or more different types of aluminum to enable both resistance welding and lower heat processes such as resistance brazing or soldering. Joints made with the fasteners and methods of the present disclosure can exhibit improved fatigue performance due to parts being held in compression during the welding process.

Figure 59:
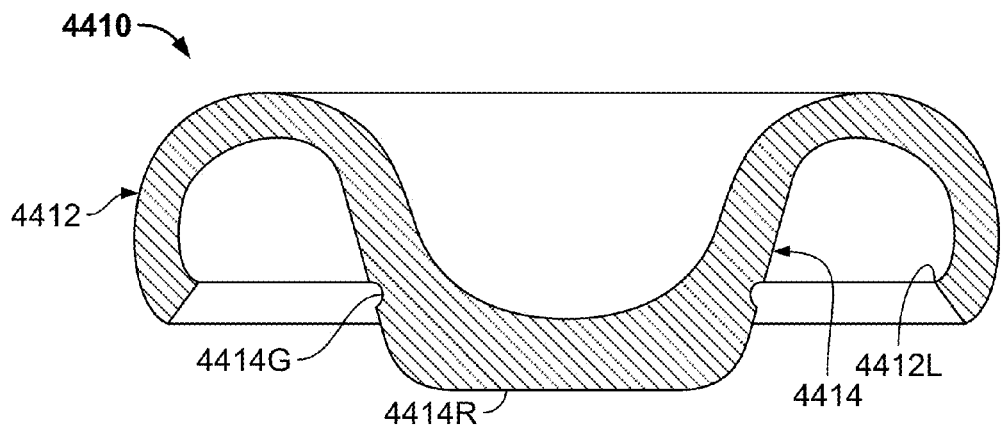
FIG. 59 is a cross-sectional view of a fastener in accordance with an alternative embodiment of the present disclosure.
Figure 60:
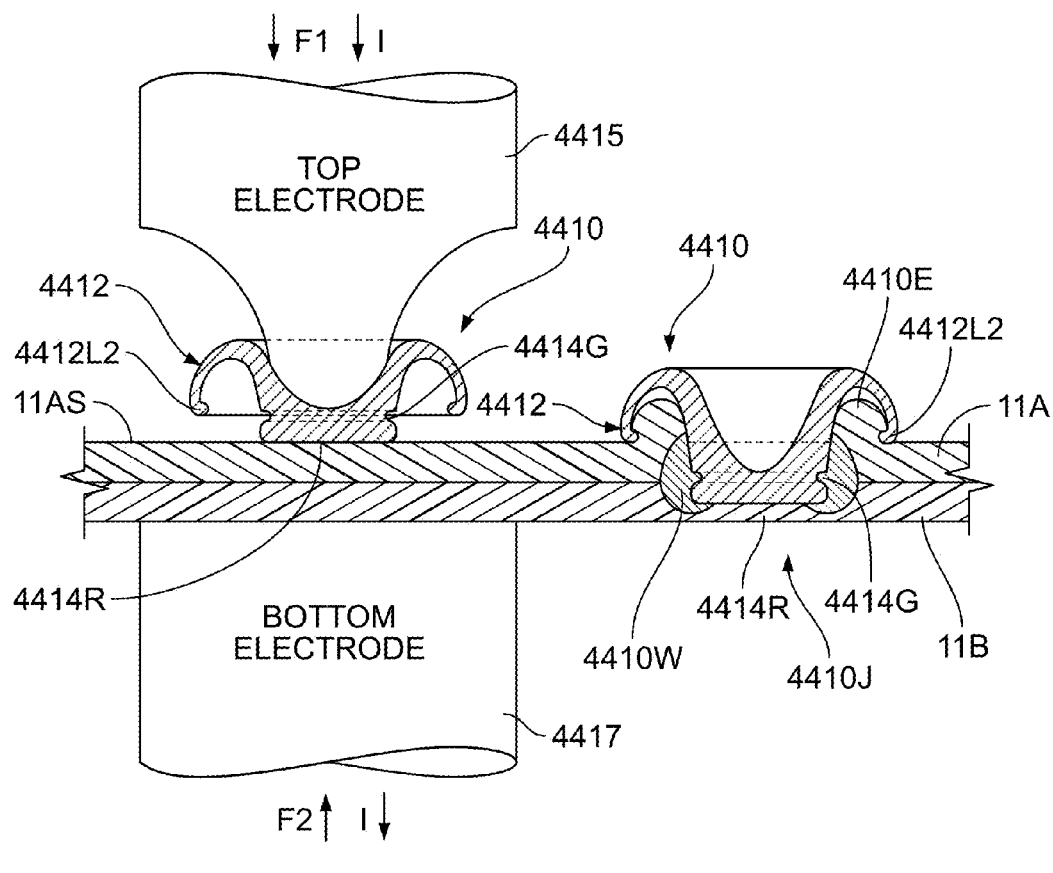
FIG. 60 is a diagrammatic cross-sectional view sequentially showing the insertion of a fastener in accordance with an alternative embodiment of the present disclosure through a first layer and partially into a second layer.

FIG. 59 shows a fastener (resistance rivet) 4410 which enables not only aluminum-to-steel joining as disclosed above, but also the joining of a first aluminum sheet 11A to a second aluminum sheet 11B (FIG. 60). In one alternative embodiment, one or both sheets 11A, 11B may be a non-ferrous metal other than aluminum/aluminum alloy, e.g., magnesium/magnesium alloy or copper. The fastener 4410 has an annular groove 4414G in the shaft 4414 near the root (or bottom) 4414R of the fastener 4410. The fastener 4410 also features a lip 4412L disposed around a peripheral edge of the cap 4412.

Figure 70:
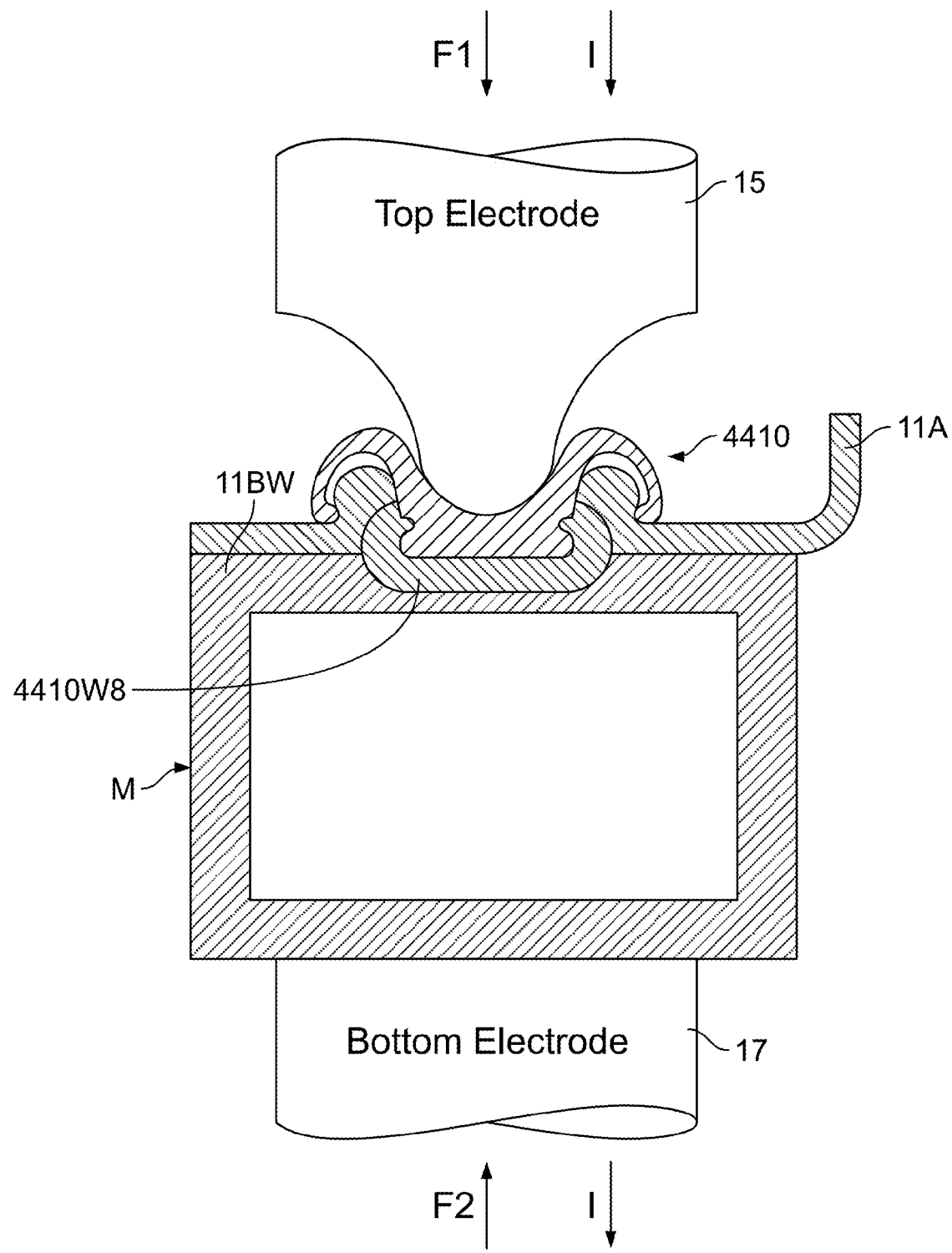
FIG. 70 is a diagrammatic, cross-sectional view of the fastener of FIG. 60 inserted into bi-layer stack-up including a wall of a hollow member.
Figure 71:
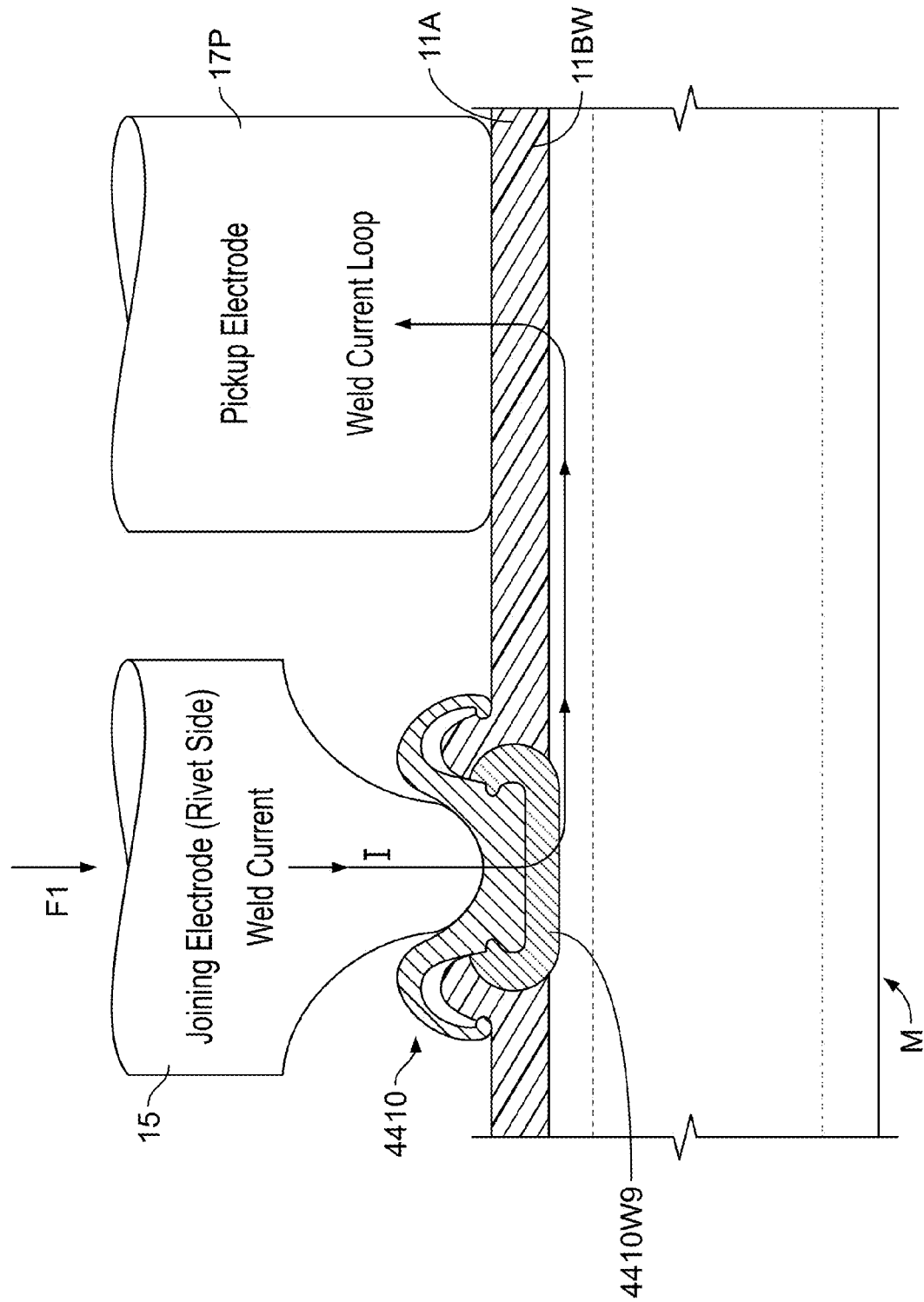
FIG. 71 is a diagrammatic, cross-sectional view of the fastener of FIG. 60 inserted into bi-layer stack-up including a wall of a hollow member as achieved by indirect welding.

In FIG. 60, the fastener 4410 has a more pronounced lip 4412L2 and is shown in two stages of use, viz., pre-weld (stage A) and post-weld (stage B). The material from which the fastener 4410 is formed may have a lower thermal and electrical conductivity than the aluminum sheets 11A, 11B and a higher melting point, such as various grades of steel, stainless steels, and titanium. While the term "sheet" is used to identify layers 11A, 11B, it is understood that another form of metal layer could be applicable, such as a sidewall of a structural beam, plate, tube, etc. In addition to aluminum, other sheets of conductive material, such as magnesium or copper, may be joined by the fastener 4410. In one alternative, a sheet of aluminum 11A, may be joined to a sheet of magnesium or magnesium alloy in the position of sheet 11B. The relative positions of sheets 11A, 11B could also be reversed, e.g., a magnesium sheet on top (11A) and an aluminum sheet on the bottom (11B). In another alternative, one of the sheets 11A, 11B may be a brazing sheet. When the fastener 4410 is positioned between the electrode tips 4415, 4417, as shown in stage A, and an electric current and converging forces F1, F2 applied, the fastener 4410 and the intervening layers 11A, 11B are heated and localized softening of layers 11A, 11B occurs, allowing the fastener 4410 to penetrate the surface 11AS of layer 11A and then into layer 11B. The electrodes of FIGS. 60, 70 and 71 are diagrammatically depicted as solids of revolution for ease of illustration, but could also be depicted in cross-section as in FIGS. 4 and 22. The amount of time that current I and force F1, F2 is applied and the magnitude of the current I and forces F1, F2, may be controlled to allow the root 4414R to come to a stop at a position intermediate layers 11A, 11B. The molten metal of layers 11A, 11B comingle as a weld zone 4410W, which surrounds the fastener 4410 and flows into the groove 4414G. When the weld 4410W cools and hardens, the layers 11A, 11B are welded and the fastener 4410 is embedded therein at an intermediate position, as shown in stage B of FIG. 60. In one embodiment, the groove 4414G may be in the form of a spiral groove, e.g., a spiral thread or another type of feature that makes the exterior surface of the shaft 4414 rough and that allows the weld 4410W to flow about and grip ("key") to the feature when cool. The shaft 4414 may be provided with a ring (not shown) that is the protruding equivalent to the groove 4414G, that protrudes out from the stem 4414. A variety of indentation or prominence features, may be utilized on the shaft 4414 to inter-digitate with/key to the molten metal of the weld 4410W to increase the resistance of the fastener 4410 from being pulled out once inserted into the layers 11A, 11B. The fastener 4410 also features a lip 4412L (FIG. 59)/4412L2 (FIG. 60) disposed around a peripheral edge of the cap 4412 that may be driven into the surface of layer 11A and/or 11B when the layer 11A, 11B is softened by current I and urged into the softened surface 11AS by forces F1, F2. Molten metal 4410E may be extruded from the sheet 11A and/or 11B as the fastener 4410 is pushed through the sheets 11A, 11B, such that it flows under the lip 4412L, locking the fastener 4410 onto the layer 11A, and/or 11B, when metal 4410E cools and solidifies. The weld zone 4410W is annular and creates an annular weld between sheets 11A, 11B while simultaneously creating an annular interlocking relationship with groove 4414G. The extruded/softened metal 4410E also "hooks" into/interlocks with lip 4412L2 around the periphery of the cap 4412, thereby creating an annular interlocking relationship between the lip 4412L2 and the extruded/softened metal 4410E. The hooking lip 4414L2 holds the fastener 4410 in compression while the layers 11A, 11B shrink after expansion and/or melting and then solidifying. The aluminum sheets 11A, 11B will be joined by a fused weld zone 4410W in conjunction with the fastener 4410 bridging layers 11A, 11B. This endows the resultant joint 4410J with strength in both the lap shear and cross tension load directions.

As can be appreciated from a review of the embodiments described above, the fastener 4410 may be driven through a pair of aluminum sheets 11A, 11B to weld to a third sheet, e.g., of steel, e.g., as shown in FIG. 11. While only one annular groove 4412G is shown, a plurality of grooves or other features may be provided along the shaft 4414 to be suitably positioned to interact with different layers of aluminum 11A, 11B as the fastener penetrates to a selected depth. While only two layers 11A, 11B are shown, a greater number may be fastened with fastener 4410.

FIGS. 61A and 61B show that during the application of forces F1, F2 and current I (FIG. 60), the fastener 4410 can be pushed into the sheets 11A, 11B (which cumulatively can be called a "stack-up" S1, S2) to various degrees of penetration. Depending upon the stack-up S1, S2 orientation and thickness of the sheets 11A, 11B, the fastener 4410 could fully or partially penetrate one or both sheets 11A, 11B. In the event that the fastener 4410 penetrates both thicknesses (FIG. 61A), in joint 4410J1, the shear load path will be through both the welded zone 4410W1 and the steel fastener 4410. In the event the fastener 4410 only penetrates one of the thicknesses (FIG. 61B), in joint 4410J2, the lap shear may be entirely through the weld zone 4410W2. This provides a high degree of flexibility, since a joint 4410J2 can be fully formed between multiple sheets 11A, 11B, etc., in a stack-up S2, even though the fastener 4410 does not fully penetrate each layer 11A, 11B. The penetration can be controlled by adjusting the amount of force F1, F2 applied, as well as the current I (FIG. 60). By adjusting the intensity and duration of the heating current, the user can increase the amount of welding (the volume of the molten weld zone 4410W1, 4410W2) around the fastener 4410 in the sheets 11A, 11B. These control factors enable the user to join a variety of sheet 11A, 11B stack-ups S1, S2 with a single fastener 4410, by adjusting the intensity and duration of the current I and/or the force F1, F2 applied. In some applications, the force applied F1, F2 may be a constant, so that control variability is provided by varying the magnitude of current I and time of application.

FIG. 62 shows a cross section of a stackup S3 of three sheets/layers 11A, 11B, 11C (also called a "3T stack-up") joined by fastener 4410 applied from one direction. As with the two-layer (2T) stackup, e.g., as shown in FIGS. 61A (S1) and 61B (S2), the fastener 4410 may penetrate none, one, or a plurality of the sheets 11A, 11B, 11C. In FIG. 62, the weld current intensity and duration was selected to melt the sheets 11A, 11B, 11C along the shaft 4414 and root 4414R of the fastener 4410, enabling a weld joint 4410W3 that joined all three sheets/layers 11A, 11B, 11C. While a three layer (3T) joint is shown, the fastener 4410 could be used to join four or more sheets/layers 11A, 11B, 11C to form a 4T joint.

FIG. 63 shows a three layer stack-up S3 welded together by a pair of fasteners 4410A, 4410B. In some industries, e.g., in automobile manufacture, stack-ups for conventional aluminum joints are typically no thicker than 10 mm (see reference T in FIG. 63) and are more generally around 4 to 8 mm. In cases where a stack-up (joint) is thick, e.g., greater than 10 mm, it may be of benefit to have two fasteners 4410A, 4410B used in conjunction and applied from opposite sides of the stack-up S3. The fasteners 4410A, 4410B can be applied in an opposing orientation, such that the heat from both fasteners contribute to melting the layers 11A, 11B, 11C. In FIG. 63, a three layer stack-up S3 (joint) is shown. The two fasteners 4410A, 4410B melt the layers 11A, 11B, 11C to consolidate all three sheets. In FIG. 63, neither fastener 4410A, 4410B fully penetrates the outer two sheets 11A, 11C, but the heat generated by the welding process creates a weld zone 4410W4 that extends through and joins sheets 11A, 11B, 11C. In an alternative approach, the fasteners 4410A, 4410B can completely penetrate the sheets 11A, 11B, 11C, contact and weld to one another, as in the embodiments shown in FIGS. 46-48, but this may not be necessary to achieve a given target joint strength if the fasteners 4410A, 4410B have features, such as groove 4410G, which allow interlocking with the weld zone 4410W4.

Figure 64:
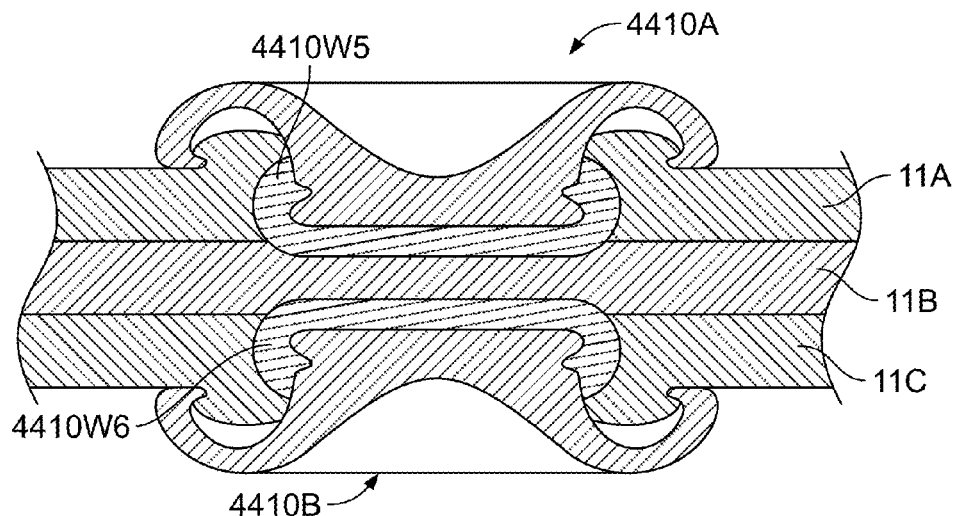
FIG. 64 is a diagrammatic, cross-sectional view of a pair of the fasteners of FIG. 60, inserted in a converging direction through the opposing sides of a tri-layer stack-up with two separate weld zones.

FIG. 64 shows an alternative approach wherein two fasteners 4410A, 4410B are employed as in FIG. 63, but the intensity and duration of the current I is such that two independent weld zones 4410W5 and 4410W6 are produced between the outer sheets 11A, 11C and the inner sheet 11B, separately. The current required is less for producing the two separate weld zones 4410W5, 4410W6 than for a weld zone 4410W4 that penetrates through all three sheets 11A, 11B, 11C, as in FIG. 63. This reduced current requirement may result in savings by reducing energy use, reduce distortion due to welding and improve cycle time.

Figure 65:
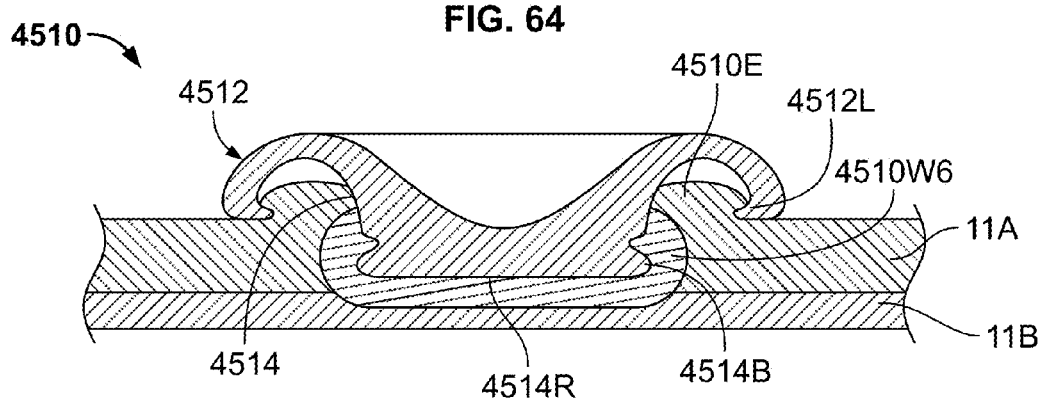
FIG. 65 is a diagrammatic, cross-sectional view, sequentially showing the insertion of a fastener in accordance with an alternative embodiment of the present disclosure through a first layer and partially into a second layer.

FIG. 65 shows a fastener 4510 having a cap 4512 and shaft 4514 similar to those of the fastener 4410 described above, but instead of a groove 4414G, a peripheral bead 4514B proximate the root 4514R is utilized as a feature that "keys" with the weld zone 4510W6 to lock the fastener 4510 to the weld zone 4510W6, which extends between and couples layers 11A, 11B. In this embodiment, a region R of molten and extruded metal is captured between lip 4512L and bead 4514B.

Figure 66:
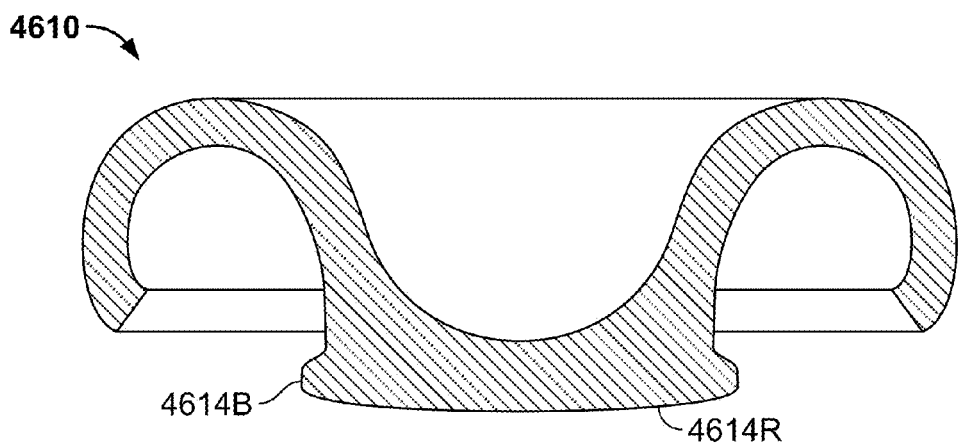
FIGS. 66 and 67 are cross-sectional views of two different fasteners in accordance with alternative embodiments of the present disclosure.

FIG. 66 shows a fastener 4610 wherein the root 4614R has a slight crown shape that may facilitate pushing the fastener 4610 through a sheet, e.g., 11A. Like fastener 4510, fastener 4610 has a peripheral bead 4514B.

Figure 67:
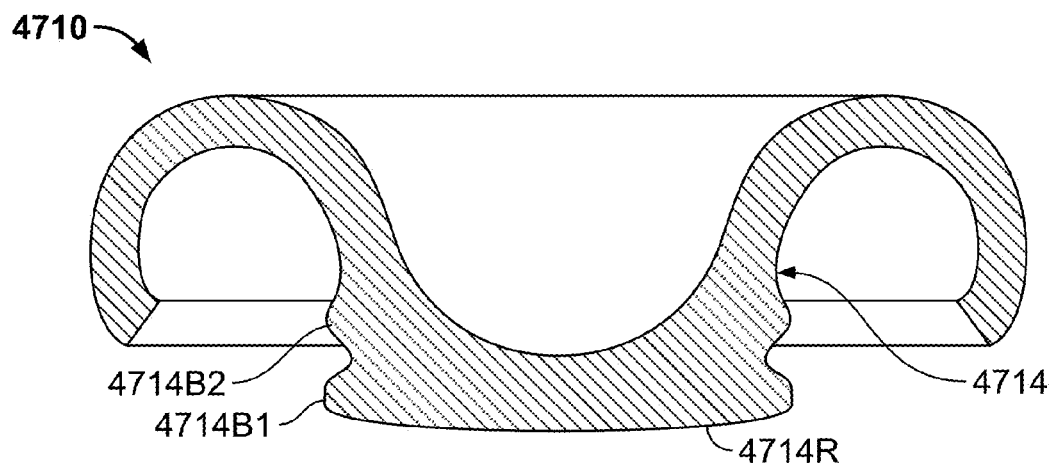

FIG. 67 shows a fastener 4710 that is similar to fastener 4610, but has a second bead 4714B2 on the shaft 4714 in addition to the bead 4714B1 proximate the root 4714R. The root 4714R has a slight crown or outward curvature.

Figure 68:
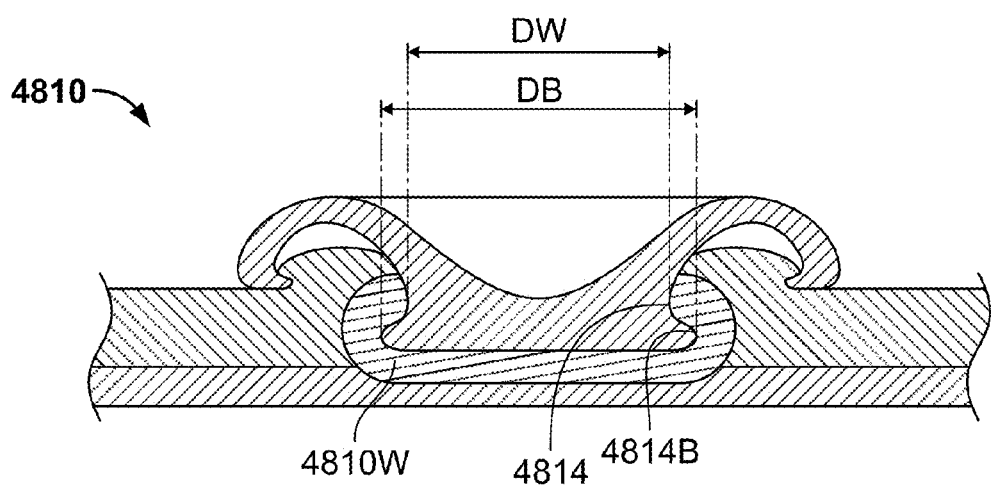
FIG. 68 is a diagrammatic cross-sectional view of a fastener in accordance with an alternative embodiment of the present disclosure inserted into a bi-layer stack-up.

FIG. 68 shows a fastener 4810 with a bead 4814B that is formed along a continuous curve with the shaft 4814, like the bottom portion of an hourglass. This "hour glass" shape may lower the overall insertion forces needed to penetrate the layers 11A and/or 11B, relative to more abruptly diverging interlock features of the shaft 4814. In one alternative, the fastener can be designed to deform during penetration to form the annular bead 4814B to improve the strength of the joint formed by interlocking with the weld region 4810W. The diameter DW of the shaft 4814 is less than the diameter DB of the bead 4814B, e.g., the shaft diameter DW may be ≤0.9*DB. In another alternative, instead of the shaft 4814 having a prominence like bead 4814B, an inwardly curving feature could be employed to key with the weld zone 4810W. For example, instead of curving out, the shape of the bead 1814B could curve inwardly, forming a groove, like grove 4414G of fastener 4410 shown in FIG. 59.

Figure 69A:
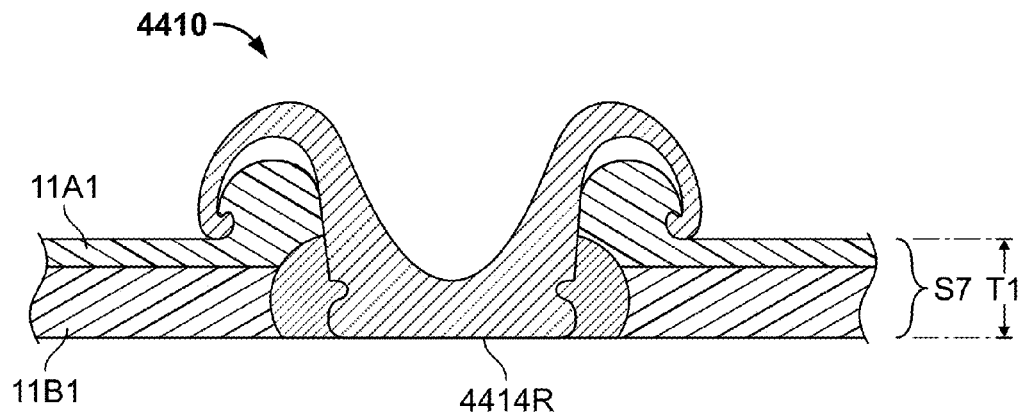
FIGS. 69A, 69B and 69C are a series of diagrammatic cross-sectional views of the fastener of FIG. 60 inserted into three different bi-layer stack-ups.
Figure 69B:
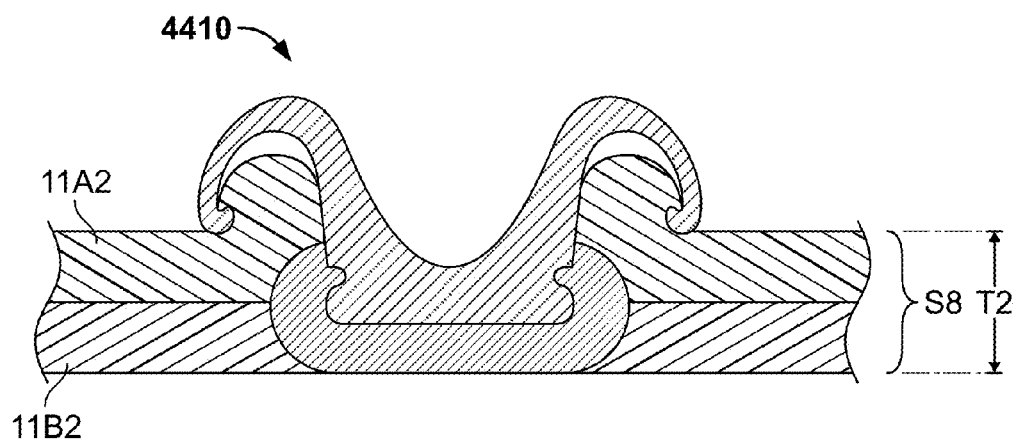
Figure 69C:
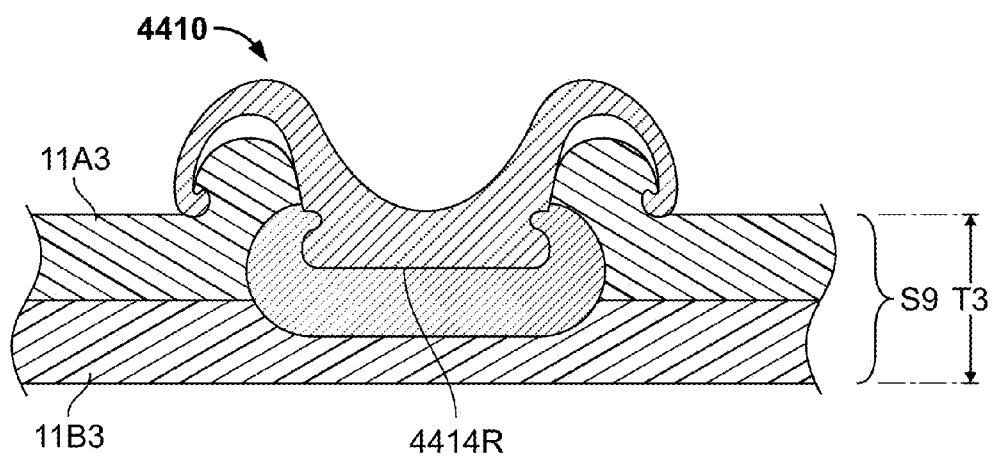

FIGS. 69A, 69B and 69C show a variety of stack-ups S7, S8, S9 with sheets 11A1, 11B1 shown in FIG. 69A, 11A2, 11B2 of FIG. 69B and 11A3, 11B3 of FIG. 69C, having different thicknesses (gauges) that can be joined with a single type of fastener 4410 having a single dimensional/geometric configuration. The same multi-use attribute applies to the other fasteners described above, e.g., 4510, 4610, 4710, 4810, etc. More particularly, the fastener 4410, etc., can be used in thin stack-ups like S7 of FIG. 69A, where the root 4414R of the fastener 4410 can penetrate or almost penetrate all layers 11A, 11B. The same fastener 4410 can be used in stack-up S8, where the penetration of layer 11B2 is partial, as in FIG. 69B. The same fastener 4410 can be used where only a small amount of penetration occurs (only part of 11A3), as in stack-up S9 of FIG. 69C, but a weld zone 4410W3 is formed that extends well beyond the root 4414R, bridging between the layers 11A3, 11B3, if sufficient weld current I of adequate intensity and duration is applied. An aspect of the present disclosure is the use a single fastener type, e.g., 4410, for a variety of all-aluminum stack-ups, e.g., S7, S8, S9 of different thicknesses. In FIG. 69, T1<T2<T3 and T1 may be, e.g., ≥1 mm. In addition, the same fastener 4410, can be used in stack-up combinations including non-ferrous layers 11A, 11B, 11C other than aluminum, which optionally may be joined to steel or other materials as described above, e.g., with respect to FIGS. 4-11 in the present application or FIGS. 1-45 of Application No. 61/839,478, which is incorporated herein by reference above. The fastener 4410 therefore has a wider range of operation than fasteners used in other joining technologies, such as self-pierce riveting (SPR), which requires different length rivets and different tooling to accommodate different stack-up thicknesses.

FIG. 70 shows a fastener 4410 connecting a sheet/layer 11A, e.g., of aluminum or non-ferrous alloy, to a wall 11BW of a closed, hollow member M, which may be, e.g., a hollow, extruded beam made from aluminum or a non-ferrous alloy, by resistance welding. In FIG. 70, the welding process may be conducted by direct means, i.e., a first electrode 15 is placed in contact with sheet 11A under force F1 and an opposing electrode 17 is placed in contact with enclosed member M to provide an opposing force F2 and return the current I to the transformer (not shown). The fastener 4410 and welding process work in the same manner as described above relative to joining two or more sheets 11A, 11B, e.g., as explained relative to FIGS. 59-69, with the exception that the weld joint 4410W8 is between the sheet 11A and the wall 11BW of an enclosed member M. This type of joint differs from other joining technologies, such an EJOTs, which typically requires a pilot hole in the sheet 11A. Technologies such as SPR typically require placing a tool on the back side of the joint, which is not readily accessible due to the member M having a closed cross-section. Conventional resistance spot welding (RSW) presents challenges in an application like that shown in FIG. 70, since the weld currents required are such that the electrodes will collapse the joint under the intense heat.

FIG. 71 shows an alternative electrode set-up to that shown in FIG. 70, for conducting an indirect resistance welding process of a sheet 11A to the wall 11BW of a closed member M by fastener 4410 forming weld zone 4410W9. In the event that an opposing electrode 17 cannot be used in the position shown in FIG. 70, the welding process can also be done by indirect means, i.e., the return current I can be picked up by a pick-up electrode 17P from a location that is not directly in line with the riveting electrode 15, as shown in FIG. 71.

Figure 72:
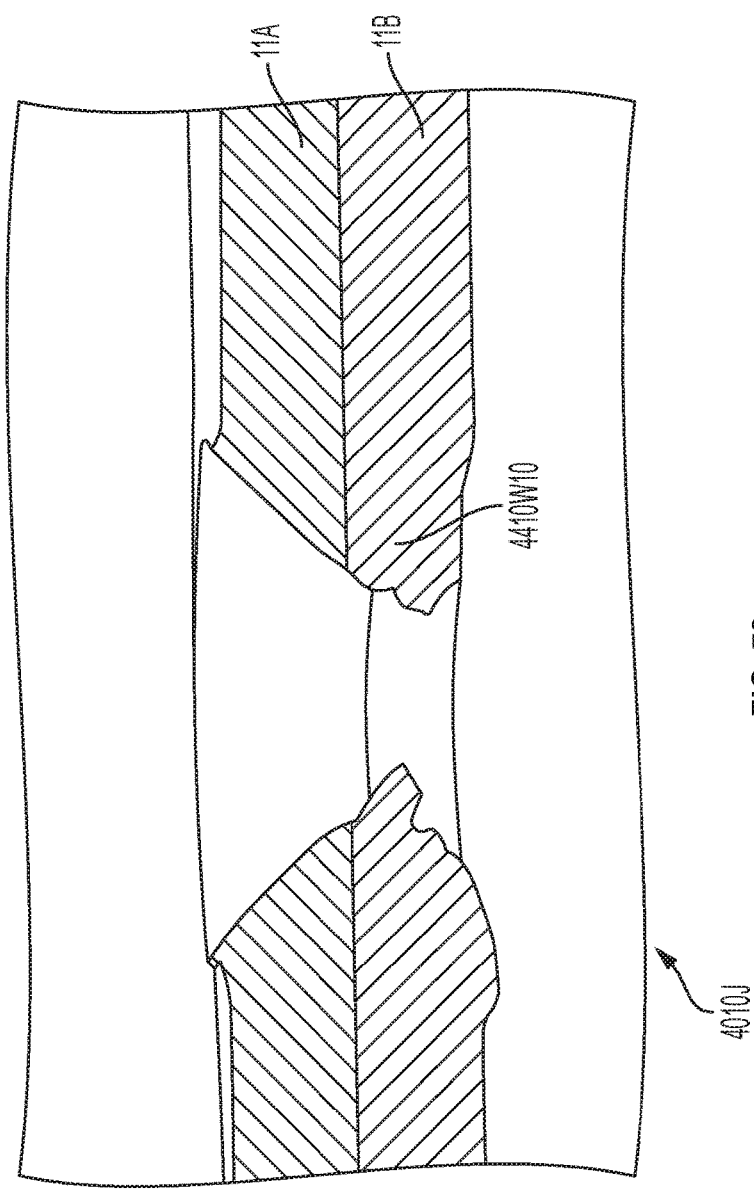
FIG. 72 is a photograph of a cross-section of a pair of layers welded in accordance with one embodiment of the present disclosure.

FIG. 72 shows the a cross section of a weld joint 4410J produced in sheets 11A, 11B, each of 1.6 mm 7075-T6 aluminum alloy, made with a fastener 10 like that shown in FIG. 2 above, which was removed after welding and is not shown. In this experiment, the fastener 10 extruded through sheet 11A and through a large portion of sheet 11B towards a backer sheet of steel (not shown but was proximate to sheet 11B, distal to sheet 11B.). The fastener 10 was not long enough to fully penetrate the sheets 11A, 11B, so there was no weld to the steel sheet. The experiment confirmed that the fastener 10 was capable of melting and welding the aluminum sheets 11A, 11B together in the weld zone 4410W10. The fastener 10 was removable from the welded sheets 11A, 11B since it did not have interlocking features, such as 4412L, 4414G, 4414B, etc. as described above, but would not have been easily removable if it was provided with these features, which would have inter-digitated with the weld zone 4410W10.

Aspects of the present disclosure include use of a special fastener, e.g., 4410, 4510, etc. that is applied to a stack-up S1, S2, S3 through a conventional resistance spot welding station. The fastener can be applied to join the stack-up, providing a mechanical interlock between the fastener and the stack-up, while simultaneously providing welding heat, such that the layers 11A, 11B, etc., in contact with the fastener can locally melt and form a cast joint or weld. The fastener 4410, 4510, etc. may be used to join layers of a single type of non-ferrous material, i.e. aluminum to aluminum, magnesium to magnesium, copper to copper, or layers of different types of material, e.g., aluminum to copper, aluminum to magnesium, etc. The fastener 4410, 4510, etc. can be applied through an adhesive at the interfaces of the layers 11A, 11B, 11C, etc. The fastener 4410, 4510, etc. may also be used to join layers 11A, 13 of dissimilar materials, e.g., aluminum and steel. The present disclosure therefore enables the joining of a wide variety of material and gauge combinations.

The fasteners and processes of the present disclosure should be cost effective and logistically compatible with existing manufacturing infrastructure utilizing resistance spot welding, e.g., in automobile manufacturing, and is compatible with conventional RSW equipment developed for steel sheet resistance welding. The fasteners and processes of the present disclosure may result in certain desirable attributes, such as, low part distortion attributable to the layers 11A, 11B, 11C being held in compression during welding and the capture of the heat affected zone within the cap 4412, 4612, etc. of the fastener 4410, 4610, etc. The space formed between the cap 4412, 4612, etc. and the sheet 11A, provides a receptacle to trap intermetallics or displaced materials which are formed/displaced due to the welding process. The intermetallics are sealed between the cap 4412 and the top sheet 11A once the electrode 15 has come to a complete stop during welding. While fasteners 4410, 4510, etc. having a pre-defined geometry are described above, various portions of the fastener may be designed, e.g., by varying the thickness of the portion, to allow deformation during the welding process. This is described above relative to bead 4814B of FIG. 68, but could be extended to the cap 4812 and shaft 4814, as well and to others of the fasteners described in FIGS. 1-71. Deformable fasteners 10, 110, 4410, etc. can enable use with a variety of sheet 11A, 11B, 11C, etc. thicknesses, since the fastener 10, 4410, etc. can deform during the welding process to accomplish a given penetration. In some embodiments, the fastener 10, 110, 4410, 4610, 4810, etc. will continually collapse and expand in diameter along the weld zone, pushing out intermetallics from the weld zone during the fastener penetration and welding phases.

The fastener 10, 110, 4410, 4510, etc. can be applied through adhesives between the layers/sheets 11A, 11B, 11C, 13, etc. and on the surface of the layers/sheets, if conductive or readily displaced by the fastener prior to the application of welding current I. The fastener 10, 110, 4410, 4610, etc. is capable of forming a water-tight joint on one side of the joined sheets 11A, 11B, 11C, 13, in that the fastener need not penetrate the most distal sheet, e.g., 11C or 13.

The fastener 10, 110, 4410, 4510, etc. can be made from a variety of materials such as various steel grades (low carbon, high strength, ultra high strength, stainless), titanium, aluminum, magnesium, and copper and can be coated (galvanized, galvaneal, hot-dipped, aluminized) to improve corrosion resistance and can be used via a single-sided or two-side access welding process. The fastener 10, 110, 4410, 4510, etc. requires no pilot hole to be formed in any sheet/layer 11A, 11B, 11C or 13, although it can also be used with a pilot hole in one or more of the non-ferrous layers 11A, 11B, 11C.

A joint formed in accordance with the present disclosure may be inspected and classified or graded by quality assurance measurements applied to the cavity formed in the stack-up S1, S2, S3, etc. after the weld, i.e., by inspecting the depth, diameter and volume of the weld. Ultrasonic NDE techniques can be applied on the side of the stack-up S1, S2, etc., or to a final steel side layer distal to the fastener 10, 110, 410, 4410, 4610, etc. to monitor the weld quality.

The fastener 10, 110, 4410, 4510, etc. and process of the present disclosure utilizes a smaller equipment footprint than FDS (EJOTS), SPR, and SFJ, allowing access to tighter spaces defined by an assembly to be welded and uses lower insertion forces as compared to SPR since the sheets/layers 11A, 11B, 11C etc. are heated during the fastener insertion phase. The fastener and process of the present disclosure provides an methodology for joining high strength aluminums which are sensitive to cracking during SPR operations and to joining non-ferrous sheets/layers 11A, 11B, 11C, etc. to high and ultra high strength steels since there is no need to pierce the steel with the fastener, which is instead welded to it.

The process and apparatus of the present disclosure does not require rotating parts and the capacity to address part fit-up issues is similar to conventional RSW in terms of how parts are fixtured. The disclosed process and fastener 10, 110, 4410, 4510, etc. exhibits processing speeds similar to conventional RSW and can be used on both wrought and cast aluminum products. The process and fastener of the present disclosure does not depend upon low joint strength bimetallic welds and is applicable to joining multiple sheets of aluminum and steel, i.e. 2 layers of aluminum, to 1 layer of steel; 1 layer of aluminum to 2 layers of steel; 1 layer of aluminum to 1 layer of magnesium or multiple layers of aluminum 11A, 11B, 11C to one another. Because the layers 11A, 11B, 11C melt as the fastener 10, 110, 4410, 4510, etc. penetrates, this increases the weld zone and overall joint strength.

Multi-layer fasteners 1910, 2110, such as are shown in FIG. 32 or 34, which may or may not include the inter-digitating features like 4414G or 4614B shown in FIGS. 60 and 66, respectively, may be used in high temperature applications to prevent diffusion across multi-material interfaces. In addition, self-sealing joints attributable to a film, adhesive or coating 1728 (FIG. 28, 29) or 4250B, 4260B, 4270B (FIGS. 57A-C or 4382R (FIG. 58), may be employed to improve the sealing of the cap 4412, 4512, etc. of the fastener 4410, 4510, etc. against the outer sheet 11A, in the stackup S1, S2, S3, etc. The fastener 4410, 4510, 4610, etc. may be used to join non-ferrous layers/sheets 11A, 11B, etc. or non-ferrous sheets 11A, 11B, 11C, etc. to a ferrous sheet 13 by a single-sided interlocking process that can make the joint without distorting the outer show surface of the outermost sheet, e.g., 11C or 13. The fastener 4410, 4510, 4610, etc. of the present disclosure may be adaptable to join a range of sheet/layer 11A, 11B, 11C, etc. thicknesses by incorporating extra material in the fastener cap 4412, 4512, etc., which compresses during the welding process, like the fastener 2910 of FIG. 42.

The fastener 4410, 4510, 4610, etc. of the present disclosure may be made from aluminum, an aluminum alloy, steels, stainless steel, copper, and/or titanium. The fastener 4410, 4510, 4610, etc. of the present disclosure may have two or more different types of material composition, e.g., two types of aluminum alloy, e.g., in bi-layer or tri-layer laminate as shown in FIGS. 32-37 to enable both resistance welding and lower heat processes such as resistance brazing or soldering. The resultant welded stack-up S1, S2, S3, may exhibit improved fatigue performance due to the fastener 4410, 4510, 4610, etc. and layers 11A, 11B, 11C, etc. being held in compression during the welding process.

Figure 73:
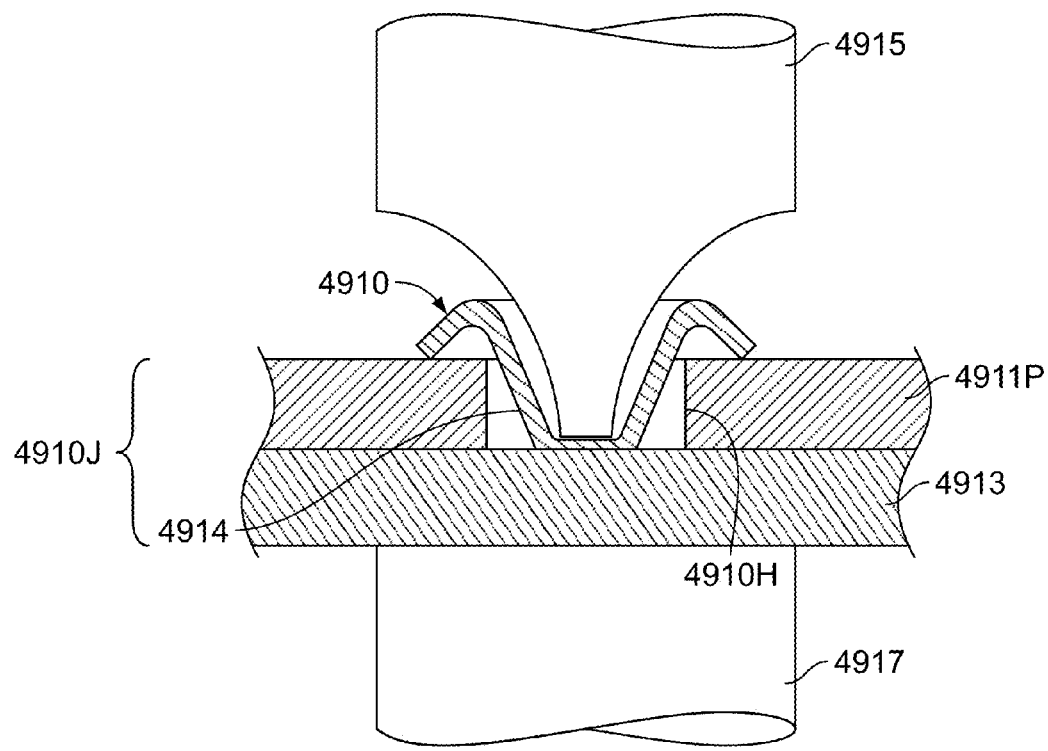
FIG. 73 is a diagrammatic, cross-sectional view of a fastener in accordance with another embodiment of the present disclosure inserted through a pilot hole in a first layer for welding to a second layer.

FIG. 73 shows a cross section of a fastener 4910, e.g., made of steel, titanium, or a bi or tri-metallic and/or coated or electroplated fastener 4910 and a second layer 4913, e.g., made of steel, titanium, copper or an aluminum alloy which is capable of being compatibly welded to the fastener 4910 via electrical resistance welding. For example, in the instance where the sheet 4913 is steel, a steel fastener 4910 may be welded to it. In another example, if the sheet 4913 is an aluminum alloy, then the fastener 4910 may be made at least partly from aluminum alloy. The fastener 4910 may be formed in a manner and a shape as described above in relation to FIGS. 1-72. FIG. 73 shows the cross section of a stack-up of a joint 4910J formed with the fastener 4910, a first sheet/layer 4911P, e.g., of non-conductive plastic, ceramic, glass, non-conductive metal or a composite material, and a second conductive sheet/layer 4913 of steel, titanium, copper, aluminum, magnesium or another conductive alloy to which the fastener 4910 may be welded. An aperture or pilot hole 4910H is formed in sheet 4911P, such that the fastener 4910 can be inserted through the aperture 4910H rather than melt through it by resistance heating. One aspect of this approach is that it allows joining a conductive, weldable sheet or member 4913 to a non-conductive sheet or member 4911P from a single side, via resistance welding, the pilot hole 4910 allowing electrical contact between the fastener 4910 and the sheet 4913 and electrical flow through dielectric/non-conductive layers. Electrical current may flow between the electrode 4915 and the electrode 4917 through the fastener 4910 and sheet 4913 to produce a weld between the fastener 4910 and the sheet 4913. In addition, dielectric/insulator materials, such as plastic composites, including carbon fiber reinforced plastics, metal-to-plastic laminates, e.g., of aluminum, magnesium or steel and plastic, such as Reynobond® available from Alcoa Architectural Products of Eastman, Ga., fiberglass, SMC, thermoset, thermoplastics and ceramics, which would include glass, may be attached to conductive metals, such as steels, aluminum, magnesium, etc. via a compatible metal fastener 10 . . . 4910 that passes through a pilot hole in a layer of these types of materials and is welded by electrical resistance welding to the conductive metal layer. The materials from which the fastener 4910, the conductive sheet 4913 and the non-conductive sheet 4911P are made may be selected to prevent melting of the sheet 4911P during welding. For example, In the case of a plastic sheet 4911P, a low temperature weld could be made by a bimetallic steel-aluminum fastener 4910 and aluminum sheet 4913 combination. The foregoing illustrates that a variety of non-conductive layers 4911P (either single or plural layers of the same or dissimilar materials) may be fastened to a conductive layer 4913 made from a variety of different materials using a fastener 4910 made from a material that compatibly welds to the conductive layer 4913, as illustrated by the following examples: plastics/composite layers 4911P (including carbon fiber reinforced plastics, fiberglass, SMC, and thermo set to a steel layer 4913, using a steel fastener 4910; a ceramic layer 4911P to a steel layer 4913 using a steel fastener 4910; plastics/composites or ceramic layers 4911P to an aluminum layer 4913 using an aluminum or bilayer aluminum/steel fastener 4910 (see fastener 1810 of FIG. 31); plastics/composites or ceramic layers 4911P to a magnesium layer 4913 using an aluminum, magnesium or composite bilayer fastener 4910; plastics/composites or ceramic layers 4911P to a titanium layer 4913 using a titanium fastener 4910.

Figure 74:
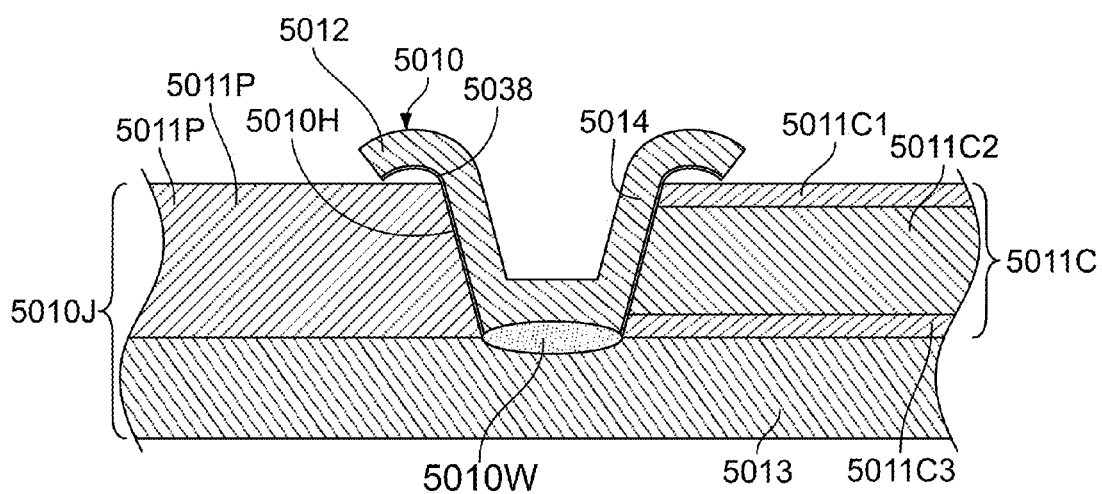
FIG. 74 is a diagrammatic, cross-sectional view of a fastener in accordance with another embodiment of the present disclosure inserted through a pilot hole in a first layer for welding to a second layer.

FIG. 74 shows a fastener 5010 similar to fastener 4910 of FIG. 73 after welding to sheet 5013 by forming weld 5010W and capturing sheet 5011P (left side) and 5011C (right side) between the sheet 5013 and the fastener cap 5012. The sheet on the left side 5011P and right side 5011C are shown in the same figure for convenience of illustration and to show that a sheet having diverse cross-sectional composition could be used. Typically, a sheet having a single type of cross-sectional composition, e.g., 5011P or 5011C would be fastened at joint 5010J. The sheet 5011P is a single thickness of plastic, such as polycarbonate or acrylic. Sheet 5011C is a composite sheet having a layer of polymer 5011C2 laminated to two outer layers 5011C1, 5011C3 of metal, such as aluminum or steel. Composite panels of this type are commercially available, e.g., Reynobond® available from Alcoa Architectural Products, mentioned above. Plastics, plastic composites and ceramics may also be joined to a layer of conductive metal, such as aluminum, steel, magnesium, Inconel, titanium 5013 via a fastener 10 . . . 5010 made in whole or part from a compatible material.

Since the composite sheet 5011C has an intermediate layer of non-conductive polymer, it is not electrically conductive through the thickness thereof, such that a pilot hole 5010H is required in order to attach fastener 5010 to sheet 5013 by electrical resistance welding. Unlike hole 4910H of FIG. 73, which extends straight through layer 4911P, leaving a clearance between the fastener shaft 4914 and the sheet 4911P, hole 5010H of FIG. 74 has a taper approximating that of the fastener shaft 5014, establishing a close-fit, or, alternatively, a contact fit when the weld 5010W is completed. An adhesive or sealant 5028 is shown on the left side of the cap 5012 sealing the junction between the cap 5012 and the sheet 5011P. This sealant 5028 would typically be applied around the entire periphery of the cap 5012 but is shown only on the left side of the fastener 5010 for illustration purposes.

Figure 75:
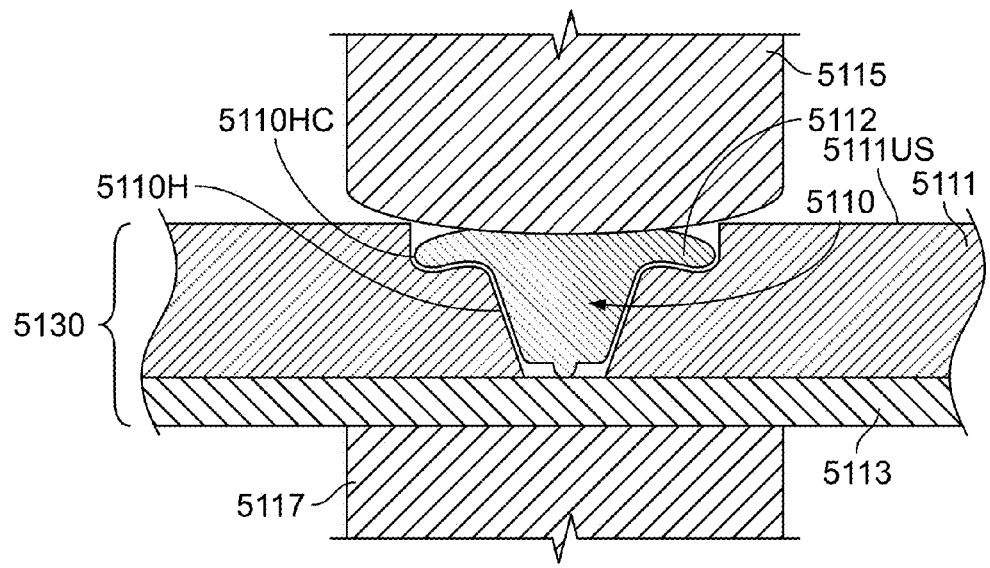
FIG. 75 is a diagrammatic, cross-sectional view of a fastener in accordance with another embodiment of the present disclosure inserted through a countersunk pilot hole in a first layer for welding to a second layer.

FIG. 75 shows a fastener 5110 in accordance with another embodiment of the present disclosure inserted through a pilot hole 5110H in a first layer 5111 for welding to a second layer 5113. FIG. 75 shows the stack-up 5130 of the fastener 5110, first and second layers 5111, 5113 positioned between electrodes 5115 and 5117 prior to welding. The pilot hole 5110H has a portion 5110HC that is countersunk, such that the cap 5112 of the fastener 5110 sits approximately flush with the upper surface 5111US when the weld is complete. Various shaped pilot holes 5110H with various countersunk portions 5110HC may be used to accommodate a variety of caps 12 . . . 5112 of fasteners 10 . . . 5110. The sheets 5111, 5113 that are joined with a fastener 5110 using a pilot hole 5110H with a countersunk portion 51150HC may include either a conductive or non-conductive upper sheet 5111 or a plurality of upper sheets.

Figure 76:
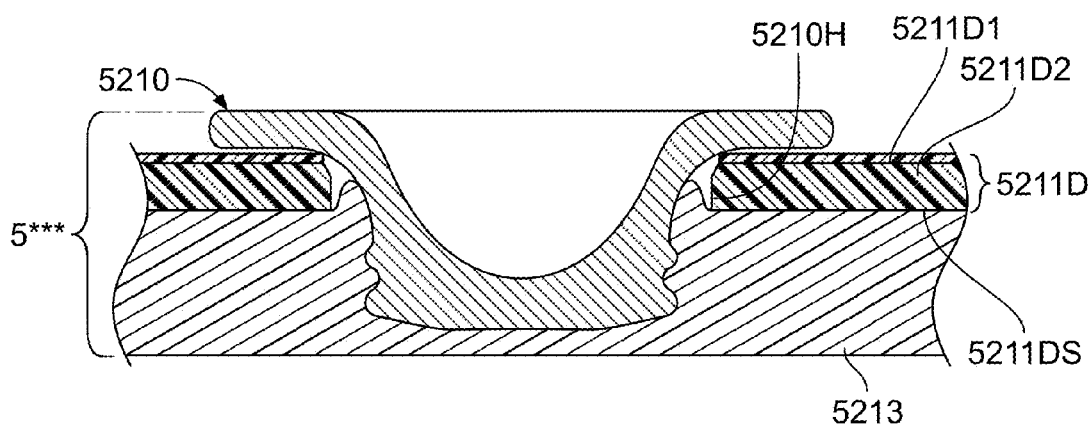
FIG. 76 is a diagrammatic, cross-sectional view of a fastener in accordance with another embodiment of the present disclosure inserted through a pilot hole in a first layer for welding to a second layer.
Figure 77:
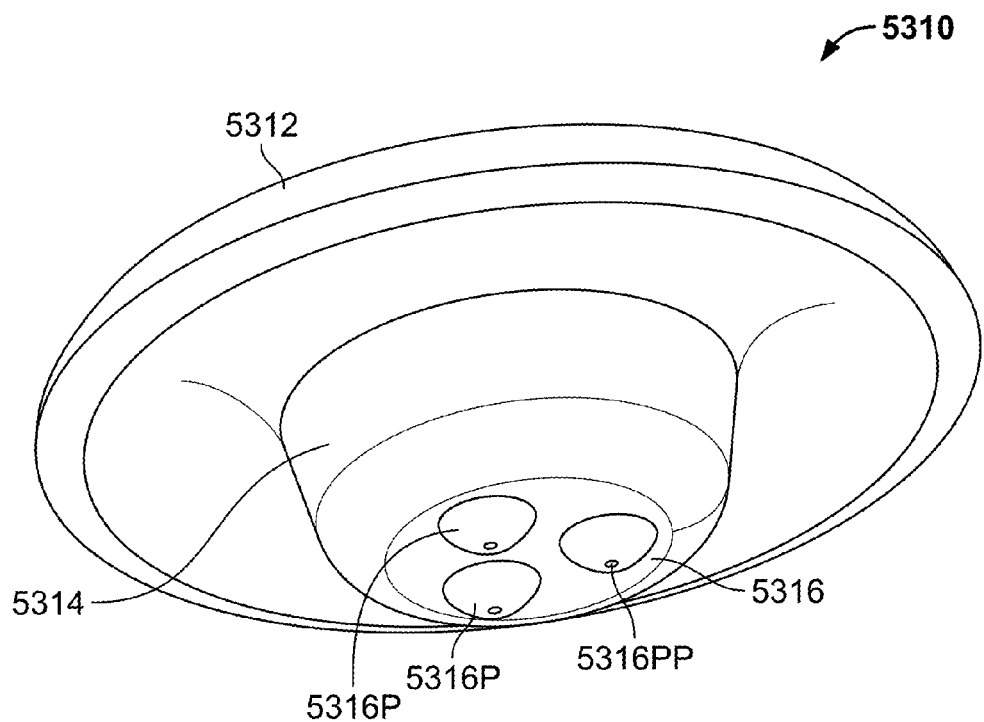
FIG. 77 is a perspective view of a fastener in accordance with another embodiment of the present disclosure.

FIG. 76 shows a fastener 5210 in accordance with another embodiment of the present disclosure inserted through a pilot hole 5210H formed in a first layer 5211D for welding to a second layer 5213. The layer 5211D has a coating 5211D1 on the surface thereof, which may be a layer of paint, adhesive or a metalized coating. The major portion 5211D2 is shown as plastic, but could alternatively be any nonconductive material, such as ceramic, a plastic composite, glass or plastic laminate. The layer 5211D2 may also be a conductive material, such as aluminum, magnesium or steel that is coated with a non-conductive coating 5211D1, like paint, adhesive, anti-corrosive coatings/layers, such as primers, rust-proofing coatings, and anodized layers. In an alternative another layer of non-conductive paint, adhesive, etc., may be provided on the surface 5211DS, i.e., intermediate layers 5211D and 5213, so long as the pilot hole extends through the paint to allow electrical contact between the fastener 5210 and layer 5213. In yet another alternative, layer 5213 may be coated with a non-conductive or paint layer intermediate layers 5211D and 5213, so long as there are apertures or clean areas on the sheet 5213 that allow the fastener 5210 to establish electrical contact with the sheet 5213. The approach depicted in FIG. 76 is applicable to those industries, processes and manufactures where the layer (s) 5211D to be joined to the layer 5213 is pre-painted. Pre-painting is common when joining dissimilar materials, such as aluminum and steel, to prevent galvanic corrosion. Allowing one of the two sheets 5211D, 5213 to be coated prior to assembly would increase corrosion protection as compared to both sheets being uncoated or bare sheets.

The pilot hole 5210H extending through the sheet 5211D allows the fastener 5210 to extend through and join to conductive layer 5213. As shown in FIG. 76, the type of joining may be if the type described above with respect to FIGS. 59-72 wherein a fastener 5210 having a higher melting point than layer 5213, e.g., a steel fastener 5210 is driven into the layer 5213, e.g., made from aluminum, when softened by an electric current. In another alternative, the layer 5213 may be made from a conductive material with a melting point comparable to that of the fastener 5210, which may be welded thereto by electric resistance welding. The foregoing approach may allow various materials that are painted or coated with a non-conductive coating, like an anodized coating, to be joined to conductive metals via a fastener 5210 using electric resistance welding. For example, a painted or non-conductively coated layer 5211D made from aluminum, magnesium, titanium may be joined to a steel layer 5213 using a steel fastener 5210. A painted or non-conductively coated layer 5211D made from magnesium, steel, titanium may be joined to an aluminum layer 5213 using a composite steel-aluminum fastener 5210. A painted or non-conductively coated layer 5211D made from aluminum, steel, titanium may be joined to a magnesium layer 5213 using a composite steel-aluminum or magnesium fastener 5210. A painted or non-conductively coated layer 5211D made from aluminum, steel, or magnesium may be joined to a titanium layer 5213 using a titanium fastener 5210.

Figure 78:
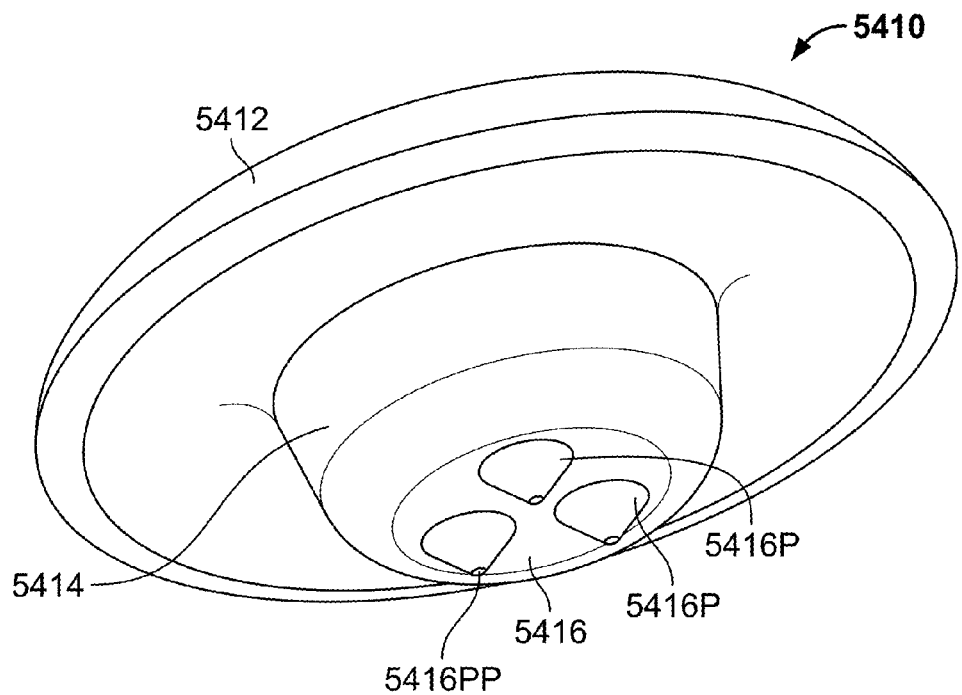
FIG. 78 is a perspective view of a fastener in accordance with another embodiment of the present disclosure.
Figure 79:
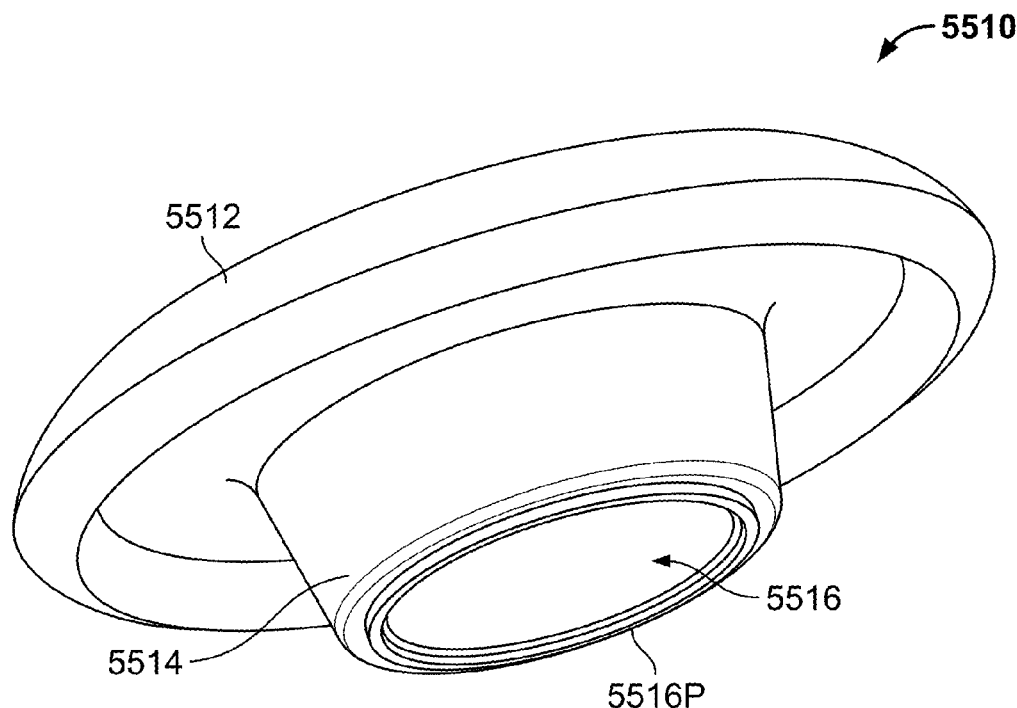
FIG. 79 is a perspective view of a fastener in accordance with another embodiment of the present disclosure.
Figure 80:
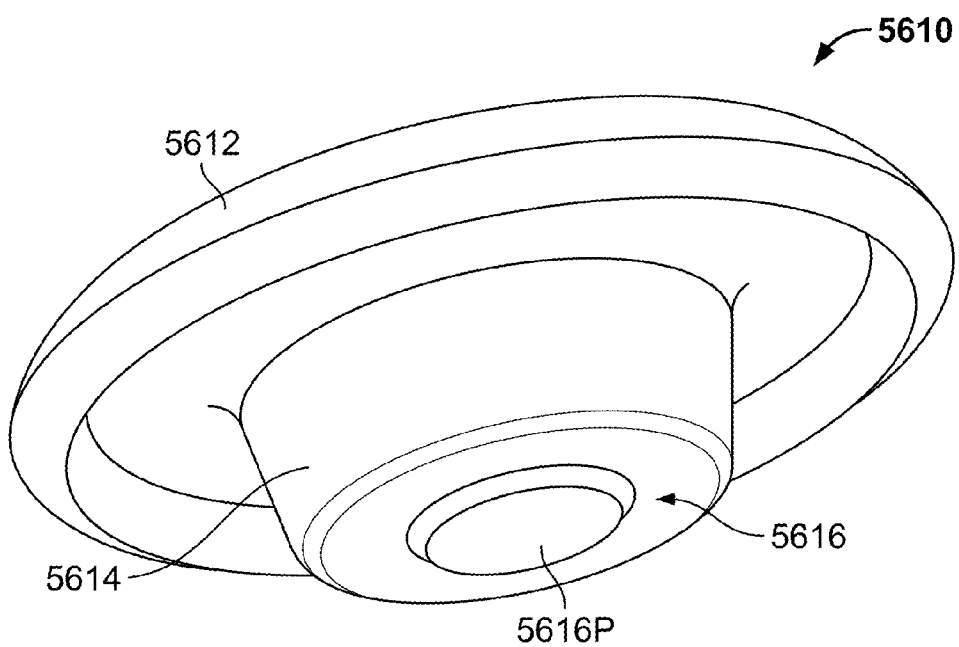
FIG. 80 is a perspective view of a fastener in accordance with another embodiment of the present disclosure.

FIGS. 77, 78, 79 and 80 are perspective views of fasteners 5310, 5410, 5510 and 5610, respectively, in accordance with alternative embodiments of the present disclosure, showing different projections 5316P, 5416P, 5516P, 5616P on the ends 5316, 5416, 5516, 5616, respectively. The projections 5316P are hemi-spherically shaped. While three projections 5316P are shown, more or less than three could be employed. Because the hemispheric projections 5316P make a small area of contact 5316PP with a given surface against which they are placed when pressed against the surface by a welding electrode, the projections 5316P concentrate the down force and resistance heating associated with the current flowing through the fastener 5310 when welding is conducted. That is, the force and electrical current through the fastener 5310 must pass through the small contact areas 5316PP that the projections 5316P make with a first layer of a welding stack-up, as shall be described more fully below. In the case of hemispheric projections 5316P, a group of three defines a reference plane to orient the fastener 5310 relative to a surface against which the fastener is pressed, e.g., prior to welding, to hold the fastener 5310 at a desired orientation relative to the surface, e.g., perpendicular. Projections 5416P shown in FIG. 78 are in the form of cones which may have a sharp or flattened point 5416PP. FIG. 79 shows a projection 5516P in the form of a ring that projects from the end 5516 of fastener 5510. In FIG. 80, the projection is in the form of a button 5616P projecting from the end 5616 of fastener 5610. The button 5616P may be of a selected diameter relative to the diameter of the end 5616. For example, a single button 5616P can range in size from 0.5 to 1.0 mm in diameter or up to three quarters of the underside of the end 5616. With respect to the cap portions 5312, 5412, 5512 and 5612 and shafts 5314, 5414, 5514 and 5614, the fasteners 5310, 5410, 5510 and 5610 are similar to those described above, e.g., in FIGS. 14A, 17A-20, 28-37, but it should be apparent that any fastener disclosed herein, e.g., 10, 20, 30 . . . 5610 could incorporate projections like projections 5316P, 5416P, 5516P, 5616P. For a given application, the projections 5316P, 5416P, 5516P, 5616P may provide advantages over a smooth or radiused end, such as: i) allowing welds to be initiated at lower currents as compared to a fastener with a larger, single contact area; ii) Lower currents reduce the overall joint heat and enable high strength alloys to maintain better mechanical and corrosion properties; iii) Projections 5316P, 5416P, 5516P, 5616P also facilitate joining plastics and composite materials to metals since the lower process currents create less heat in the fastener 5310, 5410, 5510, 5610. Fastening processes which generate excessive heat in the fastener can damage the resins in composites; iv) compared to fasteners with smooth, radiused ends 16, e.g., like fastener 10 of FIG. 1, projections 5316P, 5416P, 5516P, 5616P allow the fastener to have improved alignment with the surface, e.g., of a layer 11 against which it is positioned; v) Projections with a sharp pointed end, e.g., like 5416PP shown in FIG. 78, can be used to break through/pierce non-conductive coatings (paint, e-coat, powder coat, conversion coatings, and polymer film) during the initial fit-up to establish electrical contact with an underlying metal in a stack-up to initiate heating, penetration and welding. Optionally, the fasteners 5310, 5410, 5510, 5610 may be used in conjunction with a sheet/layer of material to be joined like, e.g., layer 11 of FIG. 4 or 5011P of FIG. 74 with or without a pilot hole (5010H) and may be made from a variety of materials, such as steel, titanium, Inconel, copper, aluminum or magnesium, depending upon the application and the materials to be joined.

Figure 81:
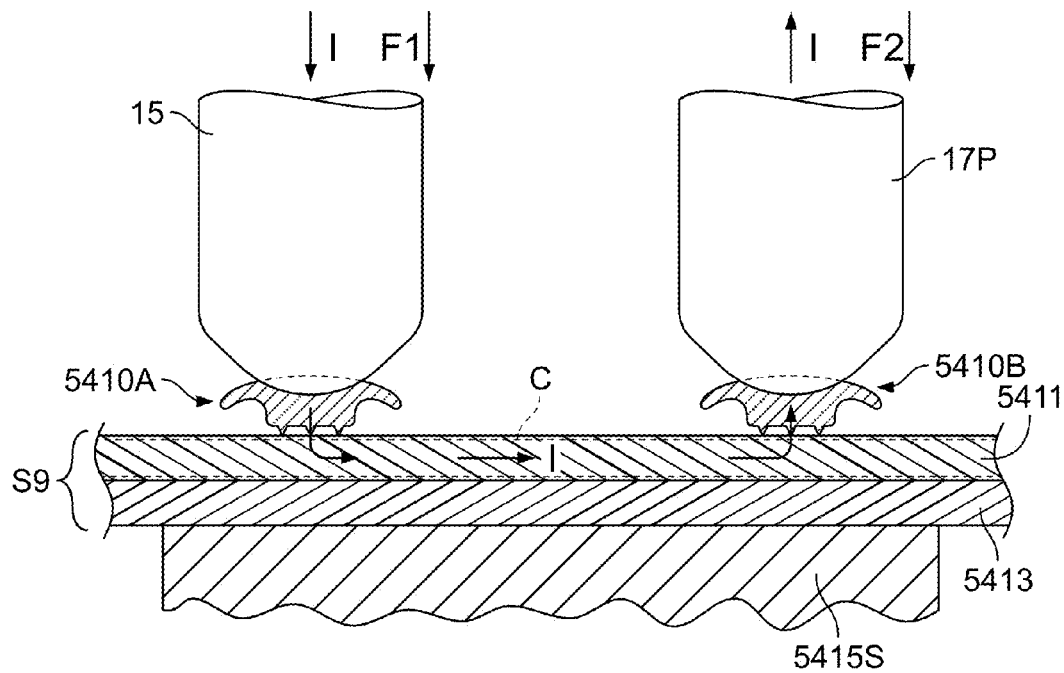
FIG. 81 is a diagrammatic, cross-sectional view of a pair of fasteners like those of FIG. 78 placed on a bi-layer stack-up at an initial stage of series welding.

FIG. 81 shows a diagrammatic, cross-sectional view of a pair of fasteners 5410A, 5410B like those of FIG. 78 placed on a stack-up S4 with a first metal layer 5411 and second metal layer 5413 at an initial stage of series welding. The two fasteners 5410A, 5410B are simultaneously driven during the same cycle from the same side of the stack-up S4 in the course of series welding. In the case where the layer 5411 has a coating C, e.g., of paint (shown by dashed lines), as down force F1, F2 is applied to electrodes 15, 17P, the fasteners 5410a, 5410b break through the coating C on sheet 5411, allowing the current I to travel through the coated sheet 5411. Once the fasteners 5410A, 5410B fully penetrate the coating, the bottom coated surface of sheet 5411, i.e., the surface in contact with the lower sheet 5413 is disrupted and current can flow into and through the bottom sheet 5413. In this figure, the upper coated sheet 5411 can be aluminum or magnesium. The lower sheet 5413 can be also aluminum, magnesium, steel or titanium. A support 5424S made from a variety of materials, such as copper, aluminum, and steels may be provided to support pliable layers 5411, 5413. If the bottom layer 5413 is sufficiently stiff by virtue of part geometry, e.g., a tube, or thickness, the support 5415S may not be needed. The current flow I through the coated upper layer 5411 and bottom layer 5413 will change over time as the fastener(s) 5410A, 5410B penetrate the upper layer 5411, as shown in FIG. 82.

Figures 82A, 82B, 82C:
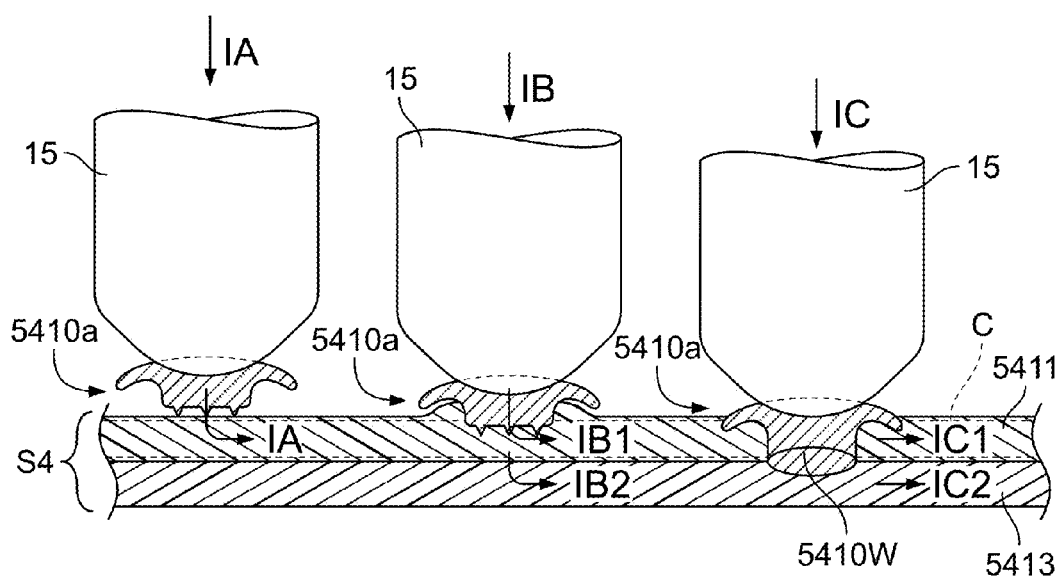
FIGS. 82A, 82B, 82C are a series of diagrammatic cross-sectional views of the fastener of FIGS. 78 and 81 as it is inserted into a bi-layer stack-up.

FIGS. 82A, 82B and 82C show a series of diagrammatic cross-sectional views of the fastener 5410a of FIG. 78 as it is inserted into the bi-layer stack-up S4 of layers 5411, 5413. Layer 5411 may be coated with a non-conductive coating C, e.g., paint, or be uncoated. FIG. 82 assumes a set-up like that of FIG. 81, i.e., having a pick-up electrode 17P into which the current IA, IB, IC flows, but the pick-up electrode 17P is not shown for simplicity of illustration. As the fastener 5410a transitions from a position on top of layer 5411, as shown at stage A, and begins to penetrate the layer 5411 at stage B and finally welds to layer 5413 at stage C, there are corresponding changes in current levels at each stage. The current levels IA, IB and IC may be expressed as a function of the distance between the electrode 15 and pick-up electrode 17P, but also of the pathway through the fastener 5410a and the stack-up S4. At stage A, the current IA is restricted to passing through the tips of the fastener 5410a and then through the first layer 5411 to the pick-up electrode 17P. At stage B, a significantly greater portion of the fastener 5410a is in contact with the layer 5411 reducing the resistance across the junction of the fastener 5410a and the layer 5411, due to the penetration of the fastener 5410a into the layer 5411. This increases the current IB relative to IA. In the case of a coated layer 5411, the heating occurring at stage B may be sufficient to break down the coating on layer 5411 such that a conductive pathway may be opened between layer 5411 and 5413, allowing a portion of the current IB to pass through the second layer 5413, since it is in contact with the first layer 5411. The current IB then has two components, IB1 flowing through layer 5411 and IB2 flowing through layer 5413. Since the first layer has a substantial cross-sectional area and intimate contact with fastener 5410a, IB1 is much greater than IB2 at stage B. Finally, when the fastener 5410a comes into contact with layer 5413 at Stage C, the contact between the fastener 5410a and both layers 5411, 5413 is extensive, such that the combined surrent paths IC1 and IC2 cause the current IC to be greater than IB, with IC1 remaining greater than IC2, but IC2 growing greater than IB2. With the resistance bewteen the electrode 15 and the take-up electrode 17U being reduced over that existing at stages A and B, the weld forms at the conjunction of the fastener 5410a and the layer 5413. The use or absence of a backer support 5415S, as in FIG. 81 would also influence the amount of current at stages B and C. A high conductivity support 5415S made from a material such as copper or a copper alloy will support greater current IB, IC flow, since the support represents another current pathway, reducing the overall resistance to current flow. Poorer conductors for the support 5415S, such as steel would have less effect.

Figure 83:
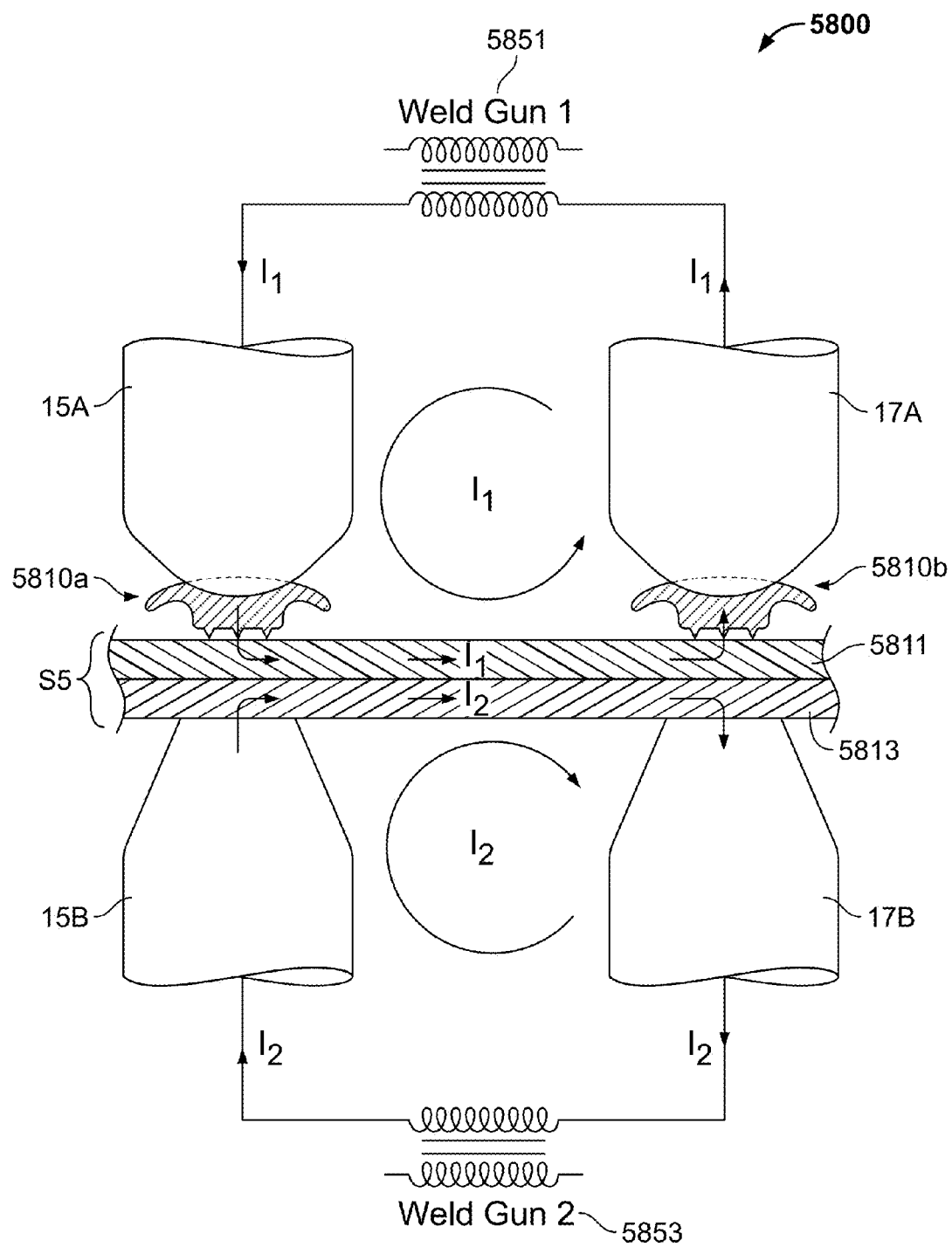
FIG. 83 is a diagrammatic view of a pair of fasteners positioned on a bilayer stack-up and about to be driven into the bilayer stack-up by a pair of welding guns.

FIG. 83 shows a welding set-up 5800 with a pair of fasteners 5810a, 5810b, like fasteners 5410a, 5410b positioned on a bilayer stack-up S5 having layers 5811, 5813 and about to be driven into the bilayer stack-up S4 by a pair of welding guns/transformers 5851, 5853. The welding guns 5851, 5853 may be fired simultaneously to heat up the respective layers 5811, 5813 with which they are in contact and through which they drive current loops I1, 12, respectively. In set-up 5800, the welding gun 5851 functions in the manner of welding illustrated in FIGS. 81 and 82, i.e., the current loop I1 flowing between electrodes 15A and 17A performs the serial welding described above relative to FIGS. 81 and 82. The welding gun 5853 may be used to heat layer 5813 to promote the process. For example, in the event that layer 5811 and/or 5813 are coated with a non-conductive coating on one or more surfaces, heating the layer 5813 may promote the disruption of the coating(s) to enable current flow, heating, penetration and welding to occur quicker.

Figure 84:
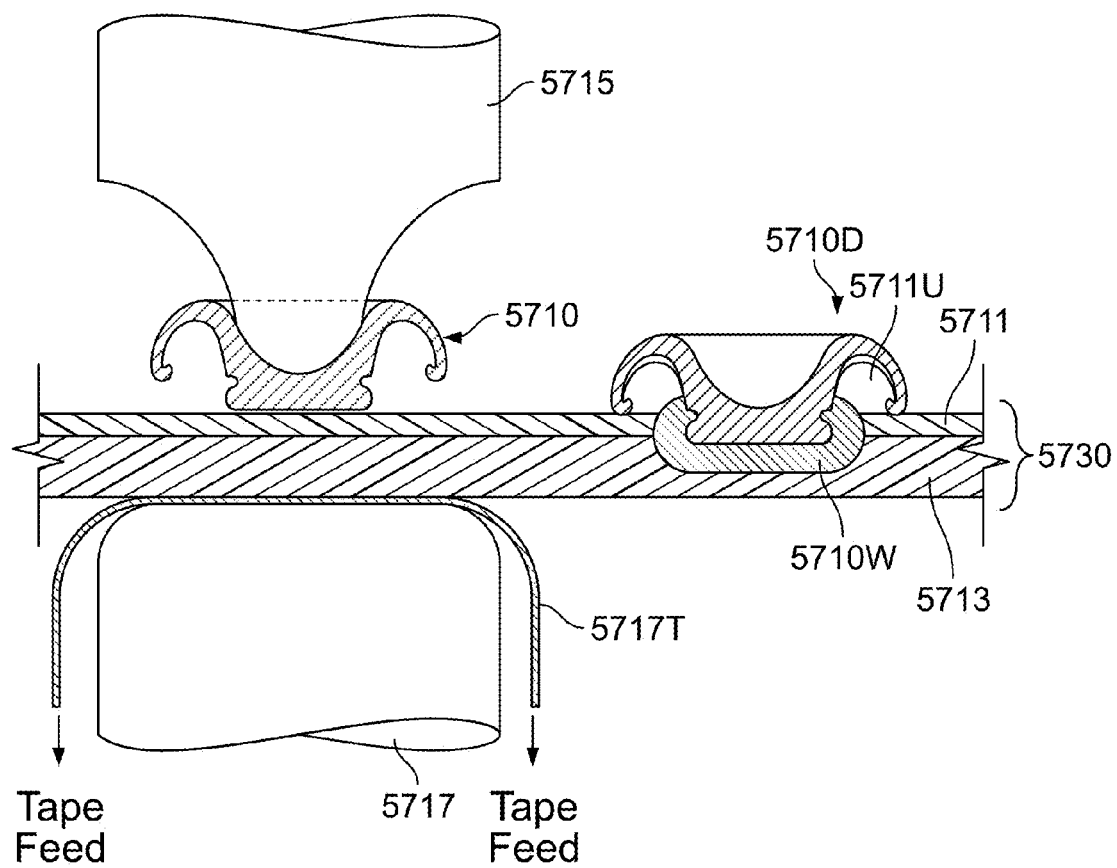
FIG. 84 is a diagrammatic view of a pair of fasteners, one positioned on a bilayer stack-up and about to be driven into the bilayer stack-up by a pair of opposed welding electrodes and the other already driven into the bilayer stack-up.

FIG. 84 shows a fastener 5710 positioned on a bilayer stack-up 5730 and about to be driven into the bilayer stack-up 5730 by a pair of opposed welding electrodes 5715, 5717. The fastener 5710D has been driven into the bilayer stack-up 5730 by the electrical resistance welding processes described above, creating a weld zone 5710W. If welding is conducted with conventional copper alloy electrodes 5715, 5717, welding thicker stack-ups 5730 of non-ferrous sheets 5711, 5713, e.g., greater than 1.5 mm thick, may require excessive current to reach the melting/welding stage. A process tape 5717T made from thin gauges of steel or other relatively low conductivity material may be utilized to increase the electrical resistance and the heating that occurs for a given welding current. Commercially available welding systems, such as DeltaSpot resistance welding guns available from Fronius International of Pettenbach, Austria are capable of feeding and handling process tape. The use of process tape 5717T may allow the joining current to be kept under 20 kA, which is similar to current levels used by welding equipment for conventional resistance welding of steel.

FIG. 85 shows a fastener 5810 with a curled cap portion 5812 and a shaft 5814 having a straight portion 5814S. FIG. 86 similarly shows a fastener 5910 with a curled cap portion 5912 and a shaft 5914 having a straight portion 5914S. Comparing the fasteners 5810 and 5910, one can see the straight portions 5814S and 5914S are of different lengths, leading to a difference in grip range for the fasteners 5810, 5910, with the longer straight portion 5914S providing a longer grip range, allowing it to be used to join thicker stack-ups. One benefit of the incorporation of a straight portion 5814S, 5914S on the shaft 5814, 5914, respectively, is that it allows for simpler tooling to produce the respective fasteners 5810, 5910. More particularly, a tool and die arrangement similar to FIGS. 15 and 16, may utilize a compound die with a first portion used for shaping the cap portion 5812, 5912 and a second portion used for shaping the shaft 5814, 5914. Since the cap portions 5812 and 5912 of the fasteners 5810, 5910 are identical, the tooling may use the same die portion for the cap portions 5812 and 5912 and only the die portion used to shape the straight shaft portions 5814S, 5914S would need to be unique.

FIG. 87 shows a fastener 6010 in accordance with another embodiment of the present disclosure, which features a plurality of ribs 6012R that reinforce the cap portion 6012. The ribs 6012R may be formed with a selected thickness and width to control the flexibility and deformability of the cap portion 6012 for a given application. The ribs 6012R may also provide resistance to joint twisting or rotation. In one example, the ribs 6012R may interact with upwelled material 5711U (See FIG. 84) to prevent rotation. The shaft 6014 also features a straight shaft portion 6014S.

It will be understood that the embodiments described herein are merely exemplary and that a person skilled in the art may make many variations and modifications without departing from the spirit and scope of the disclosed subject matter and claims. For example a fastener 5410a with end projections 5416 may also feature gripping features like groove 4414G of fastener 4410 (FIG. 59) for use in fastening two sheets of aluminum or magnesium alloy. All such variations and modifications are intended to be included within the scope of the disclosure and claims.

We claim:

1. A method for fastening a first electrically conductive layer to a second electrically conductive layer using electrical resistance welding, comprising:
    placing the first and second layers together in physical and electrical contact;
    placing an electrically conductive fastener which has a higher melting point than the first layer and the second layer in physical and electrical contact with the first layer to form an electrically conductive stack inclusive of the fastener, the first layer and the second layer;
    applying an electrical potential across the stack, inducing a current to flow through the stack and causing resistive heating, the resistive heating causing a softening of the first layer;
    urging the fastener into the softened first layer toward the second layer forming a molten weld zone in the first layer that extends beyond the fastener and includes at least a portion of the second layer;
    allowing the weld zone to cool and solidify, joining the first layer and the second layer.

2. The method of claim 1, wherein the fastener is retained in the weld zone after the step of allowing the weld zone to cool and solidify.

3. The method of claim 2, wherein the fastener has a shaft with a projection extending from the surface of the shaft, the projection extending into the weld zone during the steps of urging and cooling, the projection increasing the resistance of the fastener from being withdrawn from the weld zone after the step of cooling.

4. The method of claim 2, wherein the fastener has a shaft with a depression extending into the surface of the shaft, the depression allowing molten metal of the weld zone to extend therein during the steps of urging and cooling, the depression increasing the resistance of the fastener from being withdrawn from the weld zone.

5. The method of claim 1, wherein the fastener has a cap with a downwardly depending lip capable of receiving material upwelled from the first layer during the steps of urging, the upwelled material engaging the lip during the step of cooling, providing a mechanical connection between the cap and the first layer.

6. The method of claim 5, wherein the cap is capable of receiving material extruded from the weld zone during said step of urging.

7. The method of claim 1, wherein the first layer and the second layer are formed from at least one of aluminum, magnesium, copper or alloys thereof.

8. The method of claim 1, wherein the first layer and the second layer are formed from aluminum alloy.

9. The method of claim 1, wherein the fastener is made from at least one of a steel or titanium alloy.

10. The method of claim 1, wherein the electrical potential is applied by welding electrodes and further including the step of inserting a material having greater electrical resistance than the electrodes between at least one of the electrodes and the stack.

11. The method of claim 1, wherein a third layer of steel alloy is placed in contact with the second layer distal to the first layer during the step of placing and wherein the fastener is urged through the first layer and the second layer during the step of urging, and further including the step of welding the fastener to the third layer.

12. The method of claim 1, further including placing at least one additional layer of a non-ferrous alloy in electrical contact with the second layer distal to the first layer, the weld zone extending into the additional layer during the step of urging and cooling to join the additional layer to the first and second layers.

13. The method of claim 1, wherein the layers are sheet metal.

14. The method of claim 1 wherein the second layer is a portion of a structural member.

15. A method for fastening a first electrically conductive layer to a second electrically conductive layer using electrical resistance welding, comprising:
    placing the first and second layers together in physical and electrical contact;
    placing an electrically conductive fastener which has a higher melting point than the first layer in physical and electrical contact with the first layer to form an electrically conductive stack inclusive of the fastener, the first layer and the second layer;
    placing a second fastener opposite to the first fastener in the stack applying an electrical potential across the stack, inducing a current to flow through the stack and causing resistive heating, the resistive heating causing a softening of the first layer;

urging the fastener into the softened first layer toward the second layer forming a molten weld zone that extends to and includes at least a portion of the second layer, such that at least one weld zone is formed in the stack intermediate the first and second fasteners and the second fastener is urged into the softened second layer during the step of applying; and allowing the weld zone to cool and solidify, joining the first layer and the second layer.

16. The method of claim 15, wherein the weld zone extends through the first layer and the second layer between the first and second fasteners.

17. The method of claim 15, further including the step of inserting a third layer between the first and second layers during the step of placing, the at least one weld zone extending through the first and second layers to a portion of the third layer.

18. The method of claim 17, wherein the weld zone extends through the third layer.

19. A method for fastening a first electrically conductive layer to a second electrically conductive layer using electrical resistance welding, comprising:

placing the first and second layers together in physical and electrical contact;

placing an electrically conductive fastener which has a higher melting point than the first layer in physical and electrical contact with the first layer to form an electrically conductive stack inclusive of the fastener, the first layer and the second layer;

applying an electrical potential across the stack, inducing a current to flow through the stack and causing resistive heating, the resistive heating causing a softening of the first layer;

urging the fastener into the softened first layer toward the second layer forming a molten weld zone that extends to and includes at least a portion of the second layer;

allowing the weld zone to cool and solidify, joining the first layer and the second layer, wherein the fastener is made from an aluminum alloy.

* * * * *